US012143941B1

(12) United States Patent
Duong

(10) Patent No.: US 12,143,941 B1
(45) Date of Patent: Nov. 12, 2024

(54) WIRELESS SYSTEM

(71) Applicant: Khue Duong, Saratoga, CA (US)

(72) Inventor: Khue Duong, Saratoga, CA (US)

( * ) Notice: Subject to any disclaimer, the term of this patent is extended or adjusted under 35 U.S.C. 154(b) by 0 days.

(21) Appl. No.: 18/607,526

(22) Filed: Mar. 17, 2024

(51) Int. Cl.
*H04W 4/40* (2018.01)
*F21S 8/08* (2006.01)
*G06N 3/04* (2023.01)
*G06N 3/08* (2023.01)
*G10L 25/51* (2013.01)
*H04B 7/024* (2017.01)
*H04B 7/06* (2006.01)
*H04W 4/44* (2018.01)
*H04W 16/02* (2009.01)
*H04W 16/28* (2009.01)
*H04W 24/02* (2009.01)
*H04W 52/16* (2009.01)
*H04W 52/22* (2009.01)
*H04W 52/24* (2009.01)
(Continued)

(52) U.S. Cl.
CPC ........... *H04W 52/243* (2013.01); *F21S 8/086* (2013.01); *G06N 3/04* (2013.01); *G06N 3/08* (2013.01); *G10L 25/51* (2013.01); *H04B 7/024* (2013.01); *H04B 7/0617* (2013.01); *H04W 4/40* (2018.02); *H04W 4/44* (2018.02); *H04W 16/02* (2013.01); *H04W 16/28* (2013.01); *H04W 24/02* (2013.01); *H04W 52/16* (2013.01); *H04W 52/221* (2013.01); *F21W 2131/103* (2013.01); *G06V 40/172* (2022.01); *G06V 40/25* (2022.01); *H04B 17/309* (2015.01); *H04L 67/10* (2013.01); *H04L 67/12* (2013.01)

(58) Field of Classification Search
CPC ....... H04W 52/243; H04W 4/40; H04W 4/44; H04W 16/02; H04W 16/28; H04W 24/02; H04W 52/16; H04W 52/221; F21S 8/086; G06N 3/04; G06N 3/08; G10L 25/51; H04B 7/024; H04B 7/0617; H04B 17/309; F21W 2131/103; G06V 40/172; G06V 40/25; H04L 67/10; H04L 67/12
See application file for complete search history.

(56) References Cited

U.S. PATENT DOCUMENTS 5,100,229 A    3/1992   Lundberg
6,624,845 B2   9/2003   Loyd
(Continued)

*Primary Examiner* — Chuong A Ngo
(74) *Attorney, Agent, or Firm* — PatentPC

(57) ABSTRACT

A method of optimizing communication network operations by: transmitting traffic data to a network on a first type of channel and control information on a second type of channel and wherein the control information is transmitted during specific time periods that do not coincide with the transmission of traffic data on the first type of channel; employing artificial intelligence (AI) to dynamically determine timing for transmitting control information on the second type of channel to minimize interference and optimize network capacity; transmitting a quality level indicator on the second type of channel, utilizing AI to dynamically adjust the quality level indicator based on real-time network performance data to accurately reflect link quality; and receiving first power commands for the first type of channel and second power commands for the second type of channel, with AI algorithms analyzing the received power commands to optimize transmission power levels for both channels.

35 Claims, 10 Drawing Sheets

(51) Int. Cl.
*F21W 131/103* (2006.01)
*G06V 40/16* (2022.01)
*G06V 40/20* (2022.01)
*H04B 17/309* (2015.01)
*H04L 67/10* (2022.01)
*H04L 67/12* (2022.01)

(56) References Cited

U.S. PATENT DOCUMENTS

| | | |
|---|---|---|
| 8,503,412 B2 | 8/2013 | Zhang |
| 8,896,497 B1 | 11/2014 | Kullman |
| 9,087,451 B1 | 7/2015 | Jarrell |
| 9,560,573 B2 | 1/2017 | Ryu |
| 10,095,888 B1 | 10/2018 | Lee |
| 10,708,879 B2 | 7/2020 | Kumar |
| 11,711,789 B2 | 7/2023 | Abedini |
| 11,832,111 B2 | 11/2023 | Lei |
| 11,877,192 B2 | 1/2024 | Faccin |
| 2012/0081265 A1 | 4/2012 | Kennedy |
| 2017/0019297 A1 | 1/2017 | Rakib |
| 2017/0054776 A1 | 2/2017 | Dao |
| 2017/0064616 A1 | 3/2017 | Park |
| 2017/0358041 A1 | 12/2017 | Forbes, Jr. |
| 2018/0035255 A1 | 2/2018 | Kordybach |
| 2018/0167131 A1 | 6/2018 | Liu |
| 2018/0189238 A1 | 7/2018 | Lau |
| 2018/0199309 A1 | 7/2018 | Islam |
| 2018/0287255 A1 | 10/2018 | Zimmerman |
| 2018/0337769 A1 | 11/2018 | Gleichauf |
| 2018/0348343 A1 | 12/2018 | Achour |
| 2019/0074600 A1 | 3/2019 | Bily |
| 2019/0121988 A1 | 4/2019 | van de Ruit |
| 2019/0229776 A1 | 7/2019 | Cao |
| 2019/0305413 A1 | 10/2019 | Henry |
| 2020/0259896 A1 | 8/2020 | Sachs |
| 2022/0109524 A1 | 4/2022 | Wang |
| 2022/0286885 A1* | 9/2022 | Wang .................. G01S 5/0278 |
| 2023/0388836 A1* | 11/2023 | Zhou .................. H04B 17/336 |

\* cited by examiner

FIG. 4B

| |
|---|
| Identifying a specific sector from multiple sectors, where the identified sector covers a subset of the transceiver's total coverage area. |
| Transmitting a set of random beams towards user equipment (UE) located within the identified sector, where the random beams are generated through spatial filtering of a random beam pattern, enhanced by AI algorithms for optimized beam pattern generation. |
| Generation of Random Beams Using AI-Optimized Spatial Filter Coefficients: the AI generation of random beams based on spatial filter coefficients that are optimized using AI techniques to improve the efficiency and accuracy of beam generation. |
| AI-Based Pilot Subcarrier Allocation for Random Beams - allocate different random beams to distinct pilot subcarriers, ensuring that each random beam is uniquely associated with a specific pilot subcarrier, thereby enhancing the multiplexing capabilities and reducing interference. |
| Aggregation of Random Beams in OFDM Symbols - AI algorithms aggregate the random beams into a single orthogonal frequency-division multiplexing (OFDM) symbol, optimizing the spectral efficiency and reducing the overhead associated with transmitting multiple beams separately. |
| AI-Controlled Spatial Spectrum Utilization for Random Beams - AI techniques determine the portion of the spatial spectrum that the random beams should occupy, maximizing coverage and minimizing interference within the identified sector. |
| Sector Formation Based on AI-Analyzed FDD Reciprocity - sectors are formed and adjusted based on frequency division duplex (FDD) reciprocity, analyzed through AI algorithms to enhance sector definition and improve system performance. |
| AI-Driven Sector Determination via Uplink Sounding Signals - AI algorithms analyze uplink sounding signals from the UE to dynamically determine the most appropriate sectors for beam transmission, enhancing the adaptability of the system to changing conditions. |
| Sector Determination Using AI to Analyze Out-of-Band Information - AI algorithms process out-of-band information to assist in the determination of sectors, enabling more accurate and efficient sector selection based on external data sources. |

| |
|---|
| receiving, from the base station, control signaling comprising control information, in association with traffic relayed through the repeater device between a first wireless communication device and a second wireless communication device; |
| utilizing artificial intelligence (AI) to analyze the control information and predict communication parameters, including: |
| obtaining a time division duplex (TDD) state from the control information; |
| obtaining a fronthaul-link transmission control indicator (TCI) state index from the control information, wherein the fronthaul-link TCI state index is indicative of at least one fronthaul-link beams between the repeater device and the first wireless communication device; |
| obtaining an access-link TCI state index from the control information, wherein the access-link TCI state index is indicative of at least one access-link beams between the repeater device and the second wireless communication device; |
| obtaining a time domain resource allocation from the control information; and |
| configuring a relay unit of the repeater device to communicate the traffic between the first wireless communication device and the second wireless communication device using at least one of: the time division duplex state, the fronthaul-link TCI state index, the access-link TCI state index, or the time domain resource allocation, as optimized by the AI analysis. |

FIG. 6A

| |
|---|
| A method for optimizing beamforming in a wireless communication network: |
| collecting data from a plurality of user equipments (UEs) and base stations (BSs) within a Radio Access Network (RAN), the data including at least Received Signal Strength Indicator (RSSI), channel state information (CSI), and synchronization signals; |
| processing the collected data using an artificial intelligence (AI) algorithm to extract relevant features for beamforming; |
| training a machine learning model based on the extracted features to predict optimal beamforming parameters for multiple-input multiple-output (MIMO) communication; |
| validating the trained machine learning model using a set of validation data to ensure accuracy of the beamforming parameter predictions; and |
| Implementing the predicted beamforming parameters in real-time to direct communication beams between the BSs and UEs, thereby enhancing signal quality and network efficiency. |

FIG. 6B

| |
|---|
| A system for AI-assisted beamforming in a wireless communication network: |
| A data collection module configured to gather RSSI, CSI, and synchronization signals from UEs and BSs within a RAN; |
| A data processing module equipped with an AI algorithm to preprocess and extract features relevant to beamforming from the collected data; |
| A machine learning module containing one or more trained models that predict optimal beamforming parameters based on the extracted features; |
| A validation module to test the accuracy of the machine learning model's predictions; and |
| A beamforming control module that dynamically adjusts communication beams in the RAN based on the machine learning model's predictions to optimize network performance. |

FIG. 6C

| A method for enhancing MIMO communication in a wireless network: |
|---|
| Utilizing an AI-based system to analyze synchronization signals transmitted by BSs, including Primary Synchronization Signal (PSS) and Secondary Synchronization Signal (SSS), to facilitate UE synchronization; |
| Applying spatial multiplexing techniques informed by AI predictions to transmit different data streams simultaneously on the same time-frequency resource to one or more UEs; |
| Determining the rank of transmission and the number of data streams to be assigned to a particular UE based on a rank indicator (RI) transmitted from the UE, as analyzed by the AI-based system; and |
| Configuring transmit and receive antennas for beamforming based on AI-optimized amplitude and phase offsets to shape or steer antenna beams along a spatial path between the transmitter and receiver. |

FIG. 6D

| A wireless communication device configured for AI-assisted beamforming: |
|---|
| A plurality of transmit and receive antennas designed to support beamforming and spatial multiplexing; |
| An AI processing unit configured to receive and analyze data related to beamforming, including but not limited to RSSI, CSI, and synchronization signals; |
| A beamforming optimization module that utilizes predictions from the AI processing unit to adjust beam widths and directions for communication with UEs, wherein the adjustments are based on the mobility and stationarity of the UEs; and |
| A feedback mechanism that provides performance data to the AI processing unit to continuously refine the beamforming predictions and adjustments. |

FIG. 6E

| A method for managing beamforming in a 5G New Radio (NR) system: |
|---|
| Broadcasting synchronization signals and system information from a BS to UEs using beam-sweeping techniques, wherein the beam-sweeping is optimized by an AI algorithm; |
| Selecting downlink and uplink transmit and receive beams for communication with UEs based on reference signal received power (RSRP) measurements, as processed by an AI system; |
| Implementing beamforming for uplink and downlink channels, including physical uplink control channel (PUCCH) and physical downlink shared channel (PDSCH), based on AI-determined beamforming parameters; and |
| Adjusting the beamforming parameters in response to changes in channel conditions and UE mobility, as determined by continuous AI analysis, to maintain optimal communication quality and network throughput. |

FIG. 6F

| |
|---|
| determining resource block allocations and subcarrier spacing for terminal devices |
| encoding the predicted resource block allocations into resource indication information and indicating whether a resource block set belongs to the frequency domain resources of the data channel |
| sending, by a network device, resource indication information to a terminal device, wherein the resource indication information indicates frequency domain resources of a data channel; and |
| sending, by the network device, data on the data channel to the terminal device, or receiving, by the network device, data on the data channel from the terminal device |
| communicating S-bits, wherein S is a positive integer, a most significant bit (MSB) in the S bits indicates whether a resource block set belongs to the frequency domain resources of the data channel, the resource block set indicated by the MSB consists of at least one resource block starting from a start resource block of a bandwidth part (BWP), a quantity of the at least one resource block is n, and n is less than or equal to m, m is a resource block group (RBG) size corresponding to a bandwidth of the BWP, y2 is equal to a quantity of resource blocks offset from a start resource block of a common index area to the start resource block of the BWP mod m, wherein when y2 is unequal to 0, n is less than m, and n is equal to m minus y2; and when y2 is equal to 0, n is equal to m, the quantity of resource blocks offset from the start resource block of the common index area to the start resource block of the BWP is an integer multiple of m |

FIG. 6G

| |
|---|
| collecting data related to network conditions and terminal device requirements |
| applying a machine learning model to predict resource block allocations for terminal devices |
| encoding the predicted resource block allocations into resource indication information |
| sending, by a network device, resource indication information to a terminal device, wherein the resource indication information indicates frequency domain resources of a data channel |
| sending, by the network device, data on the data channel to the terminal device, or receiving, by the network device, data on the data channel from the terminal device |

| |
|---|
| detecting available WLANs by the user terminal, wherein the user terminal is within the coverage of one or more WLANs, each inter-working with a 3GPP system comprising multiple Public Land Mobile Networks (PLMNs), with one functioning as the HPLMN of the user terminal and others functioning as Visited PLMNs (VPLMNs) |
| evaluating the detected WLANs based on a set of dynamic criteria, which may include real-time network conditions including signal strength, bandwidth, latency, user preferences, or historical connection success rates in the current geolocation of the user terminal, or predictions made by a machine learning model based on historical data and user behavior |
| selecting a WLAN for connection from the evaluated WLANs based on the dynamic criteria, wherein the selection does not rely on pre-stored identifications of WLANs directly connecting with the HPLMN but on the optimal match with the dynamic criteria; |
| accessing the HPLMN via the selected WLAN, wherein the user terminal utilizes the selected WLAN to establish a connection with its HPLMN, facilitating dynamic and efficient network access based on current conditions, preferences, or predictive analytics. |

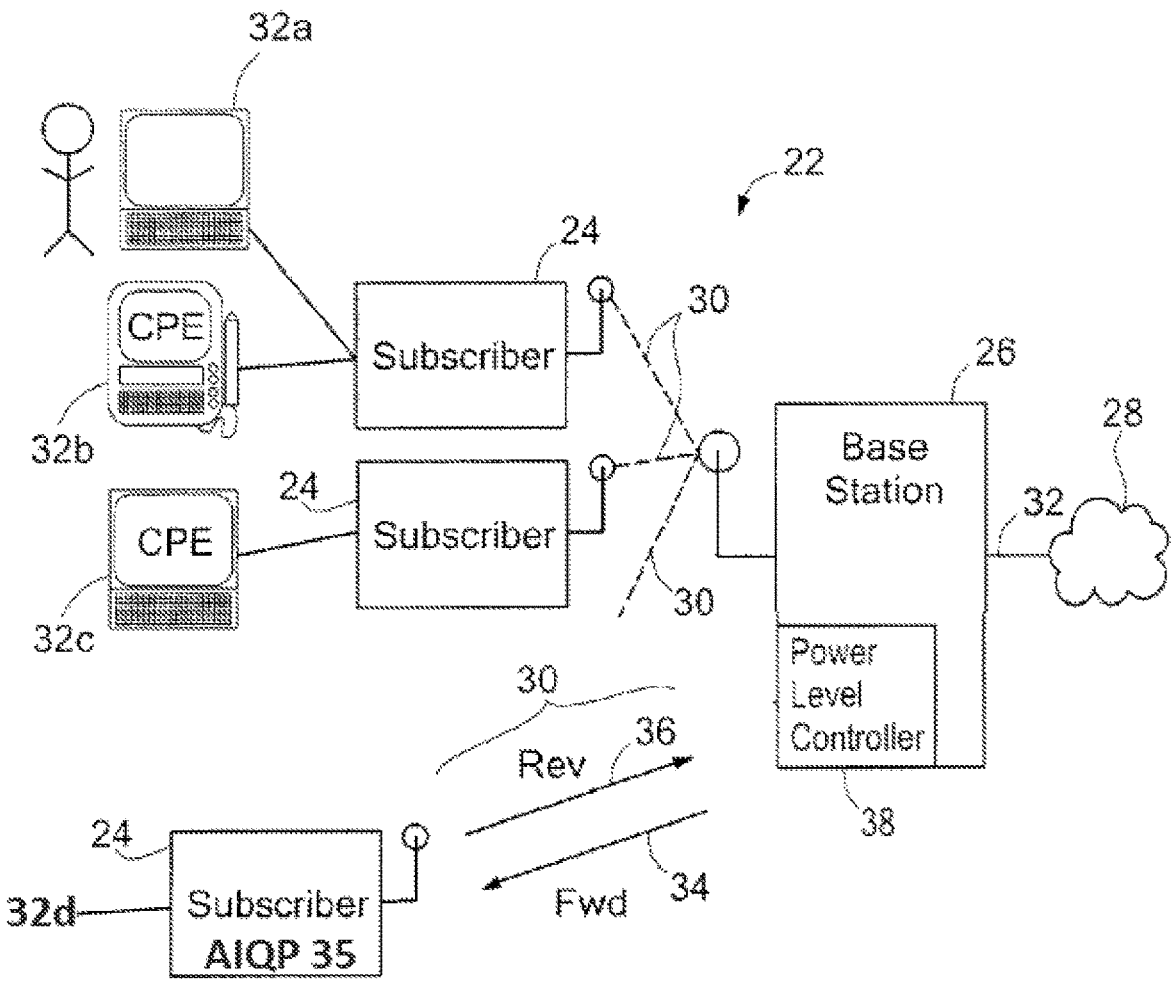

FIG. 8

WIRELESS SYSTEM

BACKGROUND

The present application is related to commonly filed, co-pending Prov. Ser. 63/566,334 filed Mar. 17, 2024, the content including pseudo-code for various processes discussed below, is incorporated by reference.

The evolution of wireless communication systems has progressed through several generations, starting with the first-generation (1G) analog wireless phone service, followed by the second-generation (2G) digital wireless phone service, which also saw the introduction of interim technologies like 2.5G and 2.75G networks. The third-generation (3G) brought high-speed data and Internet capabilities to wireless services, succeeded by the fourth-generation (4G) technologies such as Long Term Evolution (LTE) and WiMax. The advancement continued with the fifth-generation (5G) service, among others. Currently: the wireless communication landscape is diverse, encompassing various systems like Cellular and Personal Communications Service (PCS) systems. Notable examples of cellular systems include the Analog Advanced Mobile Phone System (AMPS) and digital systems utilizing technologies like Code Division Multiple Access (CDMA), Frequency Division Multiple Access (FDMA). Time Division Multiple Access (TDMA), and the Global System for Mobile Communications (GSM).

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the system leverages machine learning algorithms to enhance the efficiency of wireless communication protocols, aiming to optimize network performance for users and increase throughput and applications to heterogenous wireless systems that includes 4G/5G/WiFi, stationary as well as mobile vehicles (satellite/ships/blimps/planes/trailers/trucks, ect.) and unlicensed band communication devices. By training on data related to network resource usage, signal quality; and traffic patterns, the machine learning models can predict future network conditions and dynamically adjust network parameters. For example, this includes managing caching resources, utilizing Dynamic Spectrum Sharing (DSS) for coexistence of different network services, and implementing energy-efficient strategies. The system also incorporates feedback mechanisms to continuously refine its predictions and adjustments, ensuring optimal Quality of Service (QOS) and maximizing throughput in real-time deployment.

The above aspect is only one part of the various inventive aspects herein. As discussed below, the inventor envisions a modular approach to the discussion of various concepts/claims within the application, where individual claim sets or concepts described are not confined to operate independently but can be interchanged or combined with one another. In another aspect, a method for allocating communication resources in a wireless network includes collecting data related to network conditions and terminal device requirements: applying a machine learning model to predict resource block allocations for terminal devices: encoding the predicted resource block allocations into resource indication information: sending, by a network device, resource indication information to a terminal device, wherein the resource indication information indicates frequency domain resources of a data channel; and sending, by the network device, data on the data channel to the terminal device, or receiving, by the network device, data on the data channel from the terminal device.

In another aspect, a method for allocating communication resources in a wireless network, comprising: determining resource block allocations and subcarrier spacing for terminal devices: encoding the predicted resource block allocations into resource indication information and indicating whether a resource block set belongs to the frequency domain resources of the data channel: sending, by a network device, resource indication information to a terminal device, wherein the resource indication information indicates frequency domain resources of a data channel; and sending, by the network device, data on the data channel to the terminal device, or receiving, by the network device, data on the data channel from the terminal device.

In another aspect, a method for wireless communication includes employing an AI-based dynamic bandwidth allocation system to allocate resource blocks to user equipment: transmitting allocation information to the user equipment using a compressed signaling format determined by the AI-based system; and reducing signaling overhead in a wireless communication network. Implementations can include utilizing an artificial intelligence (AI) system to determine an assignment of at least one first bandwidth portion of a plurality of bandwidth portions within an available bandwidth to a given first numerology: the given first numerology having an associated first Orthogonal Frequency-Division Multiplexing (OFDM) subcarrier spacing and first symbol duration, the plurality of bandwidth portions having at least one second bandwidth portion that is assigned to a second numerology: the second numerology having an associated second OFDM subcarrier spacing and second symbol duration. The first OFDM subcarrier spacing can differ from the second OFDM subcarrier spacing by a factor of 2n, where n≠0.

Additional inventive concepts are detailed below, and the invention is not limited to the specific embodiments presented in the claims but include various permutations and combinations of the features and elements of claim concepts disclosed throughout the application. For instance, if the application details three distinct sets of claim concepts, each addressing different aspects of the invention, the inventor contemplates that elements from claim set one could be integrated with elements from claim set two or three, or that all three claim sets could be merged to create a new embodiment. The concepts or claims are not limited to the specific combinations explicitly set out in the initial claims. The disclosed invention is not just the sum of its parts as originally claimed but includes all combinations or configurations that achieve the same or similar technical effects or solve the same or similar problems.

BRIEF DESCRIPTION OF THE FIGURES

FIG. 1 shows an exemplary heterogeneous wireless system with satellites, airships, and ground terminals servicing UEs with AI support to provide 5G+ speed, while

FIG. 4A shows an AI-based beamforming arrangement for UEs, while FIG. 4B shows a process for increasing bandwidth through beam transmission.

FIGS. 6A-FIG. 6H show exemplary processes applying AI to improve wireless performance while FIG. 7A

FIG. 8 shows an exemplary AI-based power level control method to optimize communication between a base station and a UE.

DETAILED DESCRIPTION

Figure 1:
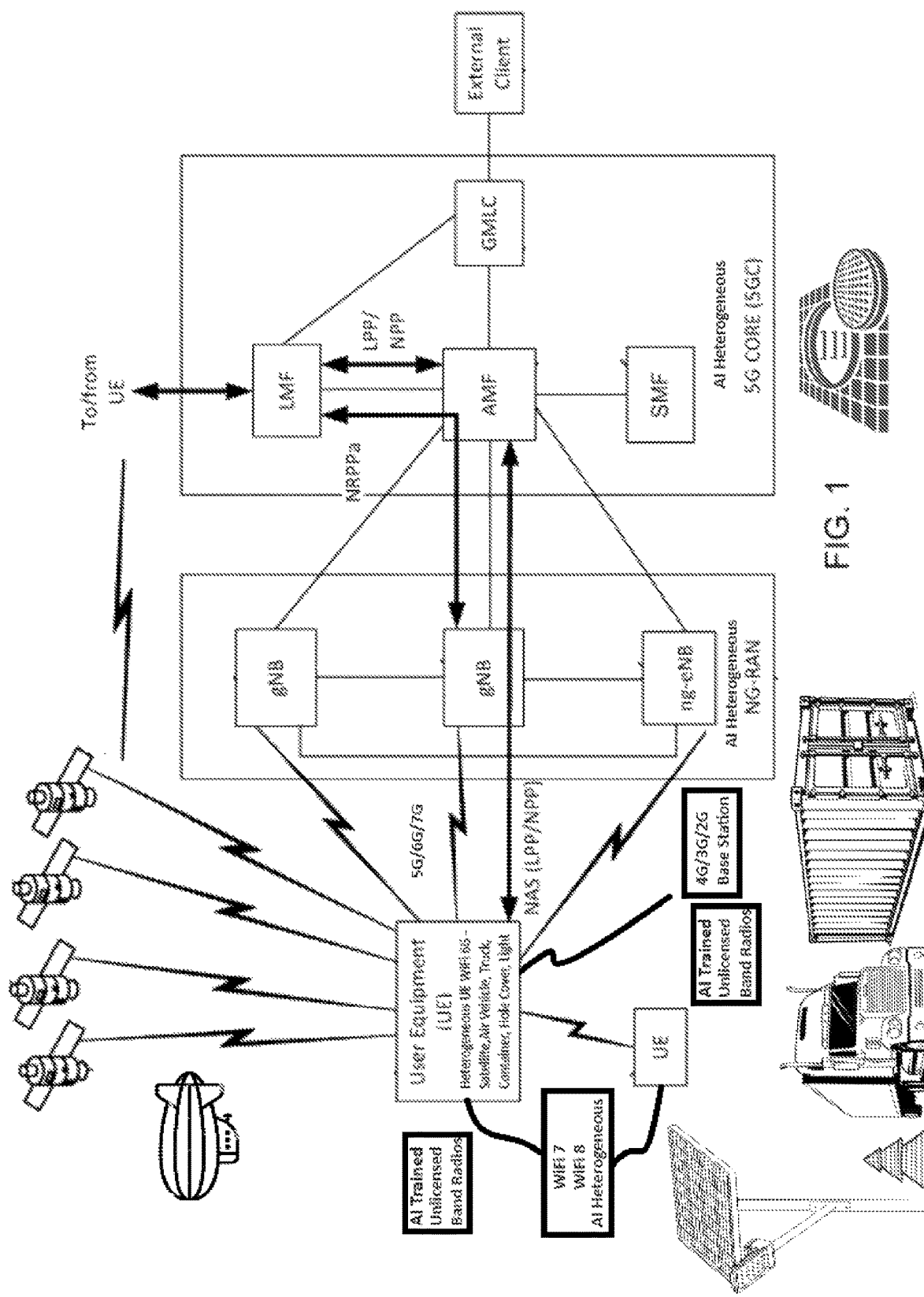

FIG. 1 shows a wireless heterogeneous 5G or 6G management system. Fifth Generation (5G) and 6G wireless networks are poised to introduce a significant transformation in the landscape of wireless communication. 5G/6G networks will employ a significantly larger number of antennas, leveraging technologies such as Massive Multiple Input Multiple Output (MIMO) to enhance signal quality and network capacity. In FIG. 1, the system described is designed for wireless communication, allowing components within the system to communicate wirelessly, either directly or indirectly through base stations (BSs) and a network. Indirect communications may involve alterations such as header information changes or format conversions. The user equipment (UE) can include various devices like smartphones, tablets, vehicle-based devices, and wearable technology. The system also accommodates other wireless devices, including Internet of Things (IoT) devices, medical devices, and home automation devices. The core network facilitates interaction with external clients, such as computer systems, which may request or receive location information about the UE.

The UE or other devices can communicate across different networks using a range of technologies, including 5G. Wi-Fi, and satellite positioning. The system supports multicarrier operations, where transmitters can send modulated signals on multiple carriers. UE-to-UE sidelink communications are possible, allowing devices to communicate directly with each other without base station involvement. The UE may be referred to by various terms, including mobile device, wireless device, or terminal, and supports multiple Radio Access Technologies (RATs). It can connect to other networks via device-to-device (D2D) peer-to-peer (P2P) links, supported by technologies like LTE Direct and Wi-Fi Direct. Base stations in the Next Generation Radio Access Network (NG-RAN) include gNBs and ng-eNBs, which facilitate access to the 5G network. These base stations may also function as positioning-only beacons for determining the UE's location. The Access and Mobility Management Function (AMF) and Location Management Function (LMF) are involved in the positioning of the UE, supporting various positioning methods. The Gateway Mobile Location Centre (GMLC) handles location requests for the UE from external clients. The UE may use UE-assisted or UE-based position methods, where it either sends measurements to a location server or computes its location using assistance data. Network-based position methods involve base stations or Access Points (APs) obtaining measurements to determine the UE's location. The LMF communicates with base stations using protocols like the New Radio Position Protocol A (NRPPa) and communicates with the UE using protocols like the LTE Positioning Protocol (LPP). These protocols support the exchange of information necessary for positioning the UE. Generally, each cell is served by a respective base station (BS), a crucial network element in the RAN responsible for managing radio transmissions to and from UEs within one or more cells. A BS may also be known by various other terms such as a base transceiver station (BTS), a radio base station, a radio transceiver, a transceiver function, a basic service set (BSS), an extended service set (ESS), an access point (AP), a Node B (NB), an eNode B (eNB), or a gNode B (gNB).

In another aspect of the RAN, sidelink signals may be utilized for direct communication between UEs without the need for scheduling or control information from a base station. For example, two UEs may communicate with each other using peer-to-peer (P2P) or sidelink signals without routing the communication through a base station. The sidelink signals include both traffic and control components. In another scenario, a UE is shown communicating with two other UEs. In this case, the UE may act as a scheduling entity or a primary/transmitting sidelink device, while the other UEs may act as scheduled entities or non-primary (secondary/receiving) sidelink devices. A UE may serve as a scheduling entity or a scheduled entity in various network configurations, such as device-to-device (D2D), peer-to-peer (P2P), vehicle-to-vehicle (V2V), vehicle-to-everything (V2X), or in a mesh network. In a mesh network. UEs may also communicate directly with each other in addition to communicating with the scheduling entity. Thus, in a wireless communication system with scheduled access to time-frequency resources, whether in a cellular. P2P/D2D, or mesh configuration, a scheduling entity and one or more scheduled entities may communicate using the scheduled resources.

Wireless communication between the RAN and UEs involves an air interface, with transmissions from a base station (or scheduling entity) to UEs referred to as downlink (DL) transmissions, which can be seen as point-to-multipoint transmissions originating from the base station. This is sometimes described using the term broadcast channel multiplexing. Conversely, transmissions from UEs to the base station are known as uplink (UL) transmissions, characterized as point-to-point transmissions originating from the UEs.

Access to the air interface may be scheduled by a scheduling entity, such as a base station, which allocates communication resources among devices within its service area. The scheduling entity is responsible for scheduling, assigning, reconfiguring, and releasing resources for communication. While base stations are typically the scheduling entities, in some scenarios, a UE itself may act as a scheduling entity: managing resources for other UEs.

This communication system may also leverage information from a constellation of satellite vehicles for Satellite Positioning Systems (SPS) like GPS, GLONASS. Galileo, or Beidou, or other local or regional SPS such as IRNSS. EGNOS, or WAAS. The NG-RAN includes NR nodeBs and a next-generation eNodeB, while the 5GC comprises various functions like the Access and Mobility Management Function (AMF). Session Management Function (SMF). Location Management Function (LMF), and Gateway Mobile Location Center (GMLC). These components are interconnected, allowing for bi-directional wireless communication between the UEs and the base stations, and between the base stations and the AMF. The base stations, which may be macro cells, small cells, or access points, provide communication coverage for specific geographic regions or cells, which can be further divided into sectors based on the base station antennas.

The communication system is designed to provide communication service quality information for QoS monitoring. This involves the network application entity, such as an application server or an application function within the 5GC, extracting timing information from uplink messages received from the UEs. This timing information, which includes timestamps or offset values, is used to determine the communication service quality. The network management and/or control entity, which could be part of the core network or the management plane, receives this quality information and adjusts the communication network to enhance the QoS based on this data. This adjustment could involve re-selecting user plane functions or RANs, re-orchestrating network functions, or re-configuring scheduling configurations in the RAN Furthermore, the communication system supports notification message flows for both uplink and downlink traffic, allowing UEs to communicate quality measure information, including end-to-end delay and jitter, to the network application entity. This entity then forwards the information to the 5GC and RAN for necessary adjustments. The system is capable of handling multipath transmission scenarios, where UEs can send different notification messages for each transmission path, enhancing the robustness and reliability of the communication service.

The deployment of small cells as part of the 5G/6G infrastructure provides the necessary coverage and capacity, particularly for high-frequency mm Wave bands that have limited propagation characteristics. To support the dense deployment of small cells and ensure seamless connectivity across the network. 5G uses wireless access mesh backhaul networks. These networks enable the interconnection of small cells and other network elements, facilitating efficient data transmission across the network. This mesh backhaul approach overcomes the challenges associated with high-frequency mmWave propagation, ensuring that users can enjoy consistent and high-quality service. The AP has a coverage area, mobile devices, and a backhaul network that provides wireless access within a specific coverage area. The network includes multiple mobile devices that can establish both uplink and downlink connections with the AP, enabling data exchange among the devices and with a remote end through a backhaul network. The AP supports various wireless communication protocols, and the mobile devices are described as components capable of wireless connectivity with the AP. The network may also incorporate additional wireless devices to enhance its functionality. This setup is applicable in the context of 5G or 6G wireless networks, and includes a logical function architecture for managing, controlling, and data handling within such networks.

Within a Radio Access Network (RAN), the resource grid is utilized to schematically represent the time-frequency resources available for a given antenna port. In scenarios involving multiple-input-multiple-output (MIMO) configurations with several antenna ports, each port has a corresponding resource grid. This grid is segmented into multiple resource elements (REs), with each RE comprising a single subcarrier and symbol. These REs, the smallest units within the time-frequency grid, carry a single complex value that represents data from either a physical channel or signal. The amount of information each RE represents varies with the modulation scheme employed. Blocks of REs are known as physical resource blocks (PRBs) or simply resource blocks (RBs), encompassing a set number of consecutive subcarriers in the frequency domain. Typically, an RB includes 12 subcarriers, a figure that remains constant across different numerologies. In the time domain, the number of consecutive Orthogonal Frequency Division Multiplexing (OFDM) symbols an RB includes can vary based on the numerology. It's generally understood that a single RB corresponds exclusively to one direction of communication, either transmission or reception, for a device. Resource blocks can be grouped into Resource Block Groups (RBGs), sub-bands, or bandwidth parts (BWPs), with these groupings potentially spanning the entire bandwidth. The scheduling of user equipment (UEs) or sidelink devices for downlink, uplink, or sidelink transmissions involves allocating one or more REs within these sub-bands or BWPs. Typically: a UE utilizes only a subset of the available resource grid. The allocation of more RBs to a UE, coupled with a higher modulation scheme for the air interface, results in a higher data rate for the UE. RBs can be scheduled by a base station or self-scheduled by a UE/sidelink device in the case of device-to-device (D2D) sidelink communication. Resource elements within an RB may be designated to carry various physical channels, including control, shared, and data channels, as well as pilots or reference signals. These pilots or reference signals enable a receiving device to perform channel estimation, facilitating coherent demodulation/detection of the control and/or data channels.

Frames, subdivided into subframes, represent durations within the communication system, with each frame spanning 10 ms and each subframe lasting I ms. Subframes consist of one or multiple adjacent slots, which are defined by a specific number of OFDM symbols and a given cyclic prefix (CP) length. Slots can also include mini-slots or shortened transmission time intervals (TTIs) for transmissions occupying resources scheduled for ongoing slot transmissions. Slots are structured to include both a control region and a data region. The control region may carry control channels, such as a physical downlink control channel (PDCCH) or a physical uplink control channel (PUCCH), while the data region carries data channels like a physical downlink shared channel (PDSCH) or a physical uplink shared channel (PUSCH). Slots can be dedicated entirely to downlink (DL), uplink (UL), or a combination of both. The system can address scenarios where downlink channel repetitions, such as physical downlink shared channel (PDSCH) repetitions, may collide with uplink symbols. In such cases, a wireless communication device may skip decoding all downlink channel repetitions and send a "fake" negative acknowledgment (NACK) to the network access node to indicate the skipped decoding. In sidelink communication, the control region of a slot may include a physical sidelink control channel (PSCCH) carrying sidelink control information (SCI), while the data region may include a physical sidelink shared channel (PSSCH) carrying sidelink data traffic. These physical channels are multiplexed and mapped to transport channels for handling at the medium access control (MAC) layer, with transport channels carrying blocks of information called transport blocks (TBs). This approach aims to efficiently manage potential collisions and ensure effective communication within the RAN.

Communication within the RAN can be either broadcast, multicast, groupcast, or unicast, with the nature of the communication determining the transmission method. For downlink transmissions, a scheduling entity, such as a base station, allocates REs to carry downlink control information (DCI) and other downlink signals. These signals include demodulation reference signals (DMRS), phase-tracking reference signals (PT-RS), positioning reference signals (PRS), channel state information reference signals (CSI-RS), and synchronization signal blocks (SSBs). Synchronization signals, including a primary synchronization signal (PSS) and a secondary synchronization signal (SSS), along with the physical broadcast control channel (PBCH) in the SSB, provide essential system information for initial access. This information aids UEs in achieving synchronization and identifying the physical cell identity (PCI) of the cell. For uplink transmissions, scheduled entities utilize REs to carry uplink control information (UCI) to the scheduling entity. UCI can include a variety of packet types and categories, such as pilots, reference signals, and information to assist in decoding uplink data transmissions.

The 5G heterogeneous system encompasses a wide array of communication technologies and infrastructure, aiming to provide seamless and efficient user equipment (UE) communication across diverse environments. This system integrates various links from satellite. WiFi, unlicensed amateur radio transceivers, and cellular base stations from previous generations (1G through 4G) to the latest 5G base stations. These 5G base stations are uniquely deployed on light poles, traffic lights, artificial trees, trucks, blimps, shipping containers, man-hole covers, and buildings, creating a dense and versatile network fabric. AI provides seamless communication and handoffs between different types of networks and technologies is crucial. This requires standardized protocols and interfaces that can handle the complexity of the system. AI is also used to efficiently managing the spectrum among various services, especially in densely populated areas where the spectrum is a scarce resource, is essential. Dynamic spectrum sharing techniques are powered by AI as detailed below. AI based security and privacy methods apply robust security protocols that can operate across different network types. AI is also used to maintaining a high QoS across such a diverse network infrastructure, especially in scenarios of high mobility or dense user environments, requires advanced network management and optimization techniques.

Heterogeneous Protocol

FIG. 1's 5G/6G/7G heterogeneous system represents a significant evolution in wireless communication, offering unprecedented flexibility, coverage, and speed. In a heterogeneous wireless communication system that includes satellite. 5G. WiFi, and unlicensed transceivers, a protocol to enable these diverse technologies to communicate with each other and coordinate requests for available spectrum would need to be comprehensive and robust. The protocol has several layers, including physical, network, and application layers, and addresses interoperability, spectrum management, and coordination challenges. The protocol can include the following: Interoperability Standards: The protocol defines common standards that ensure interoperability between different network types and technologies by adopting existing standards like IP for network layer operations or defining new ones specific to the system. Dynamic Spectrum Access (DSA): The protocol incorporate DSA mechanisms to dynamically allocate spectrum in real-time, based on availability and demand. This uses a spectrum database or sensing capabilities to determine which frequencies are available for use without causing interference. Centralized Spectrum Management: A centralized spectrum manager or server is tasked with tracking spectrum usage across the network and making allocation decisions to optimize resource use and minimize interference. Decentralized Coordination: Alternatively, or in addition to centralized management, the protocol could enable decentralized coordination among transceivers using distributed algorithms and blockchain allow transceivers to negotiate spectrum usage among themselves based on local conditions and priorities. Cognitive Radio Capabilities: Transceivers are equipped with cognitive radio capabilities, allowing them to intelligently scan for and switch to available frequencies, as well as adapt their transmission parameters to the current spectrum environment. Priority and Quality of Service (QOS): The protocol defines how to handle different priority levels and QoS requirements for various services and users, ensuring that critical communications are maintained. Handoff Procedures: The protocol should specify procedures for seamless handoffs between different network types, ensuring continuous connectivity for mobile users. Feedback and Adaptation: The system includes feedback to monitor the performance of spectrum allocations and adapt the protocol's operations accordingly. The incorporated by reference provisional application provides more details on the Pseudocode for Spectrum Coordination Protocol in a Heterogeneous System This pseudocode outlines a basic protocol for spectrum coordination in a heterogeneous system. The SpectrumCoordinationProtocol class represents the functionality of transceivers, including requesting spectrum, negotiating access, and configuring the transceiver for the new spectrum. The Spectrum Database class simulates a simple database for tracking spectrum allocations. The protocol includes mechanisms for checking available spectrum, negotiating access (with a simplified success rate), and configuring transceivers based on the outcome of negotiations.

Example Protocol Flow: Spectrum Request: A transceiver detects the need for additional spectrum, either due to user demand or deteriorating signal quality. Spectrum Availability Check: The transceiver checks for available spectrum using a spectrum database or through spectrum sensing. Coordination and Negotiation: The transceiver communicates with neighboring transceivers or a central spectrum manager to negotiate access to the available spectrum. Allocation and Configuration: Once spectrum is allocated, the transceiver configures its transmission parameters to use the new frequency band without causing interference. Communication: The transceiver begins communication over the allocated spectrum, monitoring for quality and interference. Adaptation, If conditions change, the transceiver may request a different spectrum allocation or adjust its parameters to maintain communication quality.

The negotiation can involve direct communication between transceivers, possibly using a decentralized protocol to ensure fairness and efficiency in spectrum allocation. The pseudocode below outlines a basic approach for one transceiver in this system. This example assumes that each transceiver can broadcast messages to and receive messages from its neighbors and uses a simple auction-based mechanism for spectrum allocation. The provisional application also provides Pseudocode for a Decentralized Spectrum Allocation Protocol for a Single Transceiver.

This pseudocode on the decentralized protocol has transceivers bid for spectrum allocation. Each transceiver broadcasts its spectrum request and bid to its neighbors. After receiving all bids, each transceiver decides on the allocation based on the highest bid. This example uses a simple auction mechanism for spectrum allocation, ensuring fairness and efficiency by allocating the spectrum to the highest bidder. In a real-world scenario, additional considerations such as bid validity, conflict resolution, and dynamic bid adjustments could be incorporated to enhance the protocol's effectiveness and fairness.

To incorporate blockchain registration into the decentralized spectrum allocation protocol, the protocol adds functionality to record spectrum allocation transactions on a blockchain. This ensures transparency and immutability of the allocation decisions. The following pseudocode extends the previous example with blockchain capabilities.

The system uses detailed data on network conditions, user behavior, and cost considerations to ensure seamless handoff performance. A system for managing handoffs in a heterogeneous wireless communication network, comprising:
  a data collection module configured to gather network condition data and user equipment (UE) parameters:
  an artificial intelligence (AI) module equipped with a machine learning model trained to predict optimal handoff targets based on the collected data:
  a handoff execution module configured to perform the handoff of the UE to the predicted optimal network comprising satellite. 5G, and WiFi:
  wherein the AI module is further configured to continuously update the machine learning model based on feedback received post-handoff to improve future handoff predictions.

The data collection module is configured to collect real-time data including signal strength, network congestion, and UE velocity. The handoff execution module is further configured to initiate handoffs without service interruption and the AI module is further configured to predict handoff targets for a plurality of UEs simultaneously, wherein the Seamless Handoff Execution further comprises one or more of: Pre-Handoff Signal Quality Assessment: Continuously monitor the signal quality of the current network and potential target networks; Utilize AI algorithms to predict signal degradation and identify the optimal timing for handoff initiation. Predictive Resource Allocation: Employ machine learning models to forecast user demand and network congestion, preemptively allocating resources in the target network to ensure seamless service continuation. Dynamic Spectrum Sharing: Implement dynamic spectrum sharing techniques, especially in densely populated areas, to efficiently utilize available spectrum across different technologies and minimize interference. Guard Channel Concept and Queuing: Reserve a fraction of the total available channels exclusively for handoff requests to prioritize ongoing calls over new originating calls, reducing the likelihood of service interruption: Implement queuing mechanisms for handoff requests when immediate channel allocation is not possible, ensuring a smooth transition once resources become available. Inter-System and Intra-System Handoff Support: Support both inter-system handoffs (between different cellular systems) and intra-system handoffs (within the same cellular system) to accommodate mobility across diverse network environments: Ensure compatibility and coordination between different network management systems for seamless handoff execution. Handoff Decision Logic: Develop local decision logic within the handoff execution module that considers pre-configured parameters and real-time measurements to determine the most suitable target network for handoff: Customize handoff algorithms based on carrier-specific requirements and user preferences to optimize the handoff process. Feedback Loop for Continuous Improvement: feedback mechanism to collect post-handoff performance data, enabling continuous learning and improvement of the handoff decision. The handoff execution module is further configured to prioritize handoffs based on UE priority levels. The handoff execution module is further configured to perform handoffs across different generations of network technologies. The AI module is further configured to take into account user preferences in the handoff prediction process.

A method for managing handoffs in a wireless communication network, comprising:
  collecting network condition data and user equipment (UE) parameters:
  utilizing an artificial intelligence (AI) algorithm to predict an optimal handoff target based on the collected data:
  executing the handoff of the UE to the predicted optimal network:
  updating the AI algorithm based on feedback received post-handoff to improve the accuracy of future handoff predictions.

In implementations, gathering network condition data involves assessing signal quality, bandwidth availability, and latency. The AI algorithm used in this method is based on a decision tree classifier. When executing a handoff, the method includes coordinating with the target network to confirm the availability of necessary resources. The AI algorithm is also capable of predicting handoff targets by analyzing user equipment (UE) mobility patterns. To enhance the algorithm, a feedback loop is applied that integrates user feedback on the handoff experience. The AI algorithm is equipped to handle handoffs between networks that have overlapping coverage zones. It employs a supervised learning method, training on labeled data specific to handoff events. The handoff execution process includes a pre-handoff stage that readies the UE for a smooth transition to the target network. Additionally: the AI algorithm is tailored to predict handoff targets for UEs that are running real-time applications. The updating of the AI algorithm is carried out in real-time, allowing it to adapt to the latest network conditions and UE statuses In a method for minimizing interference in a shared spectrum wireless communication network:
  employing an artificial intelligence (AI) algorithm to identify potential interference scenarios between users and services:
  analyzing communication patterns using the AI algorithm to predict interference occurrences:
  adjusting spectrum allocations for users and services in the network based on the interference predictions to minimize interference.

In implementations, the AI algorithm comprises a neural network that has been trained using historical data on interference and user communication patterns. This algorithm is designed to continuously learn and refine its interference predictions by incorporating new network data. It employs a decision tree to classify and prioritize different interference scenarios effectively. Additionally: the AI algorithm uses a genetic algorithm to develop evolving strategies for spectrum allocation that aim to reduce interference. Before implementing any changes, the algorithm is capable of simulating network conditions to evaluate the potential effects of allocation adjustments. It also applies game theory principles to navigate and resolve conflicts arising from competing spectrum demands. The algorithm takes user quality of service (QoS) requirements into consideration when making allocation adjustments to ensure optimal user experience. Furthermore, it is equipped to assess the impact of environmental factors on interference levels. The AI algorithm provides network operators with real-time recommendations for interference mitigation. Lastly: it is designed to seamlessly integrate with dynamic spectrum access systems, enabling automated management of interference issues.

A system for interference management in a wireless communication network utilizing shared spectrum, comprising:
  a data acquisition module configured to collect network usage data and signal quality indicators:
  an artificial intelligence (AI) module equipped with a predictive model for identifying and predicting interference between network users and services:
  a spectrum management engine configured to implement spectrum allocation adjustments based on the AI module's predictions to reduce interference.

In implementing, the predictive model utilizes a support vector machine (SVM) that is trained on signal quality data alongside known interference patterns for accurate predictions. The data acquisition module within this system is designed to gather information from a network of distributed sensors strategically placed. The spectrum management engine is equipped to carry out real-time spectrum reallocation, adjusting dynamically in response to anticipated interference scenarios. Additionally, the AI module includes a reinforcement learning component, which serves to refine and enhance the interference management strategy progressively over time. This module is also adept at identifying and mitigating unexpected non-stationary sources of interference.

The spectrum management engine further prioritizes spectrum allocations, taking into account the criticality of various services to ensure essential operations receive the bandwidth they require. To streamline interference management, the AI module employs clustering algorithms to categorize users based on similar interference experiences. It also uses Bayesian networks to understand the probabilistic relationships between different sources of interference, aiding in more effective interference prediction and management. Anomaly detection algorithms are another tool within the AI module, designed to spot abnormal patterns that could signal potential interference issues. Lastly, the AI module is built to seamlessly integrate with existing network management systems, enabling a coordinated approach to interference mitigation across the network infrastructure.

AI-Enabled Spectrum Sharing Integration A method for integrating artificial intelligence (AI)-enabled spectrum sharing techniques into existing wireless communication network technologies, comprising: a spectrum sharing management module configured to dynamically allocate spectrum resources between different generations of wireless communication technologies based on real-time demand: an AI module equipped with predictive algorithms to forecast spectrum availability and user demand: a compatibility interface designed to facilitate the integration of the AI-enabled spectrum sharing techniques with existing network infrastructures, including 4G Long Term Evolution (LTE) and 5G New Radio (NR), without necessitating extensive hardware upgrades. In implementing, the AI module is equipped with machine learning models that have been trained using data on historical spectrum usage and traffic patterns. This method incorporates Dynamic Spectrum Sharing (DSS) technology within the spectrum sharing management module, facilitating the simultaneous operation of 4G LTE and 5G NR services within the same frequency bands. The compatibility interface leverages software-defined networking (SDN) principles to ensure smooth interoperability across different network generations. Additionally, the AI module includes a neural network that is capable of adapting in real-time to fluctuations in network conditions. The spectrum sharing management module is tasked with safeguarding incumbent users against harmful interference while simultaneously permitting expanded spectrum access. Predictive algorithms within the AI module are tailored to reduce latency and enhance the Quality of Service (QOS) for users. The compatibility interface is also designed with protocol translation capabilities to ensure continuous communication between older and newer network equipment. Through the use of reinforcement learning, the AI module continuously refines its spectrum allocation decisions. The spectrum sharing management module is additionally set up to accommodate the integration of Internet of Things (IoT) devices into the network. Furthermore, the AI module provides valuable analytics for network planning and capacity management, incorporating insights from the application of AI-enabled spectrum sharing techniques.

Distributed Infrastructure with Wifi

The concept of a distributed infrastructure where homeowners can rent access to their WiFi internet access in a heterogeneous infrastructure, and collect micropayments from third-party User Equipments (UEs), represents a novel approach to democratizing internet access. This model, often referred to as the "uberization" of internet access, leverages blockchain technology for secure, transparent, and efficient transactions. Below is a discussion on how such a system could be implemented, focusing on the key components and the protocol that enables homeowners to offer and monetize their internet access. The system includes the following components: Blockchain Network: A decentralized blockchain network serves as the backbone of the system, facilitating secure and transparent transactions between homeowners and UEs. The blockchain records all transactions, including WiFi access agreements and micropayments, ensuring integrity and non-repudiation. Smart Contracts: Smart contracts automate the execution of agreements between homeowners and UEs. These self-executing contracts with the terms of the agreement directly written into code manage access permissions and handle micropayments automatically upon the fulfillment of specified conditions. WiFi Access Points (APs): Homeowners' WiFi routers are configured as access points that third-party UEs can discover and connect to. These APs need to support secure guest access and be capable of interacting with the blockchain network for authentication and transaction processing. Digital Wallets: Both homeowners and UEs possess digital wallets for conducting transactions. Homeowners receive micropayments in their wallets, while UEs use theirs to pay for WiFi access. Decentralized Application (DApp): A DApp provides a user-friendly interface for both homeowners and UEs. Homeowners can register their WiFi APs, set access prices, and monitor earnings. UEs can find available WiFi APs, make payments, and connect to the internet.

In an exemplary protocol for uberizing Internet access, the process starts with Registration: Homeowners register their WiFi APs on the blockchain via the DApp, specifying the access price and terms. This information is stored in a smart contract. Discovery: UEs use the DApp to discover available WiFi APs nearby. The DApp displays APs along with access prices and terms. Access Request: When a UE chooses an AP, it sends an access request along with the agreed payment to the smart contract associated with that AP. Payment and Access Granting: The smart contract verifies the payment and automatically grants the UE access to the homeowner's WiFi for the specified duration. The payment is transferred to the homeowner's digital wallet. Usage: The UE connects to the WiFi AP using credentials provided by the smart contract. The connection is secure, and the homeowner's network remains protected. Termination: Upon the expiration of the access period, the smart contract automatically revokes the UE's access to the WiFi AP. Feedback and Rating: After the access period ends, both the homeowner and the UE can rate each other. This rating system helps maintain a high-quality service and trust within the ecosystem. Advantages may include the following. Monetization of Unused Bandwidth: Homeowners can generate income by sharing their unused internet bandwidth. Affordable Access for UEs: UEs benefit from more affordable and widespread internet access options. Decentralization and Security: The use of blockchain and smart contracts ensures secure, transparent, and tamper-proof transactions. Automated Transactions: Smart contracts automate the process of granting access and transferring payments, reducing the need for intermediaries. One embodiment of the protocol enables homeowners to rent access to their WiFi internet access in a heterogeneous network infrastructure and collect micropayments from third-party User Equipments (UEs), we'll leverage blockchain technology for secure, transparent transactions and smart contracts for automated agreement execution. This protocol will facilitate an "uberization" of internet access, allowing homeowners to monetize their unused bandwidth and providing UEs with an alternative for increased speed when cellular networks cannot meet bandwidth requirements.

Protocol Overview

Homeowner Registration: Homeowners register their WiFi networks on the blockchain platform, specifying access conditions such as bandwidth, duration, and price.

UE Discovery and Request: UEs search for available WiFi networks based on their current location and desired criteria, then send access requests along with micropayment to the homeowner's smart contract.

Smart Contract Execution: Upon receiving a request, the smart contract automatically verifies the payment and grants the UE access to the WiFi network for the specified duration.

Access and Usage: The UE connects to the WiFi network, enjoying increased internet speed. The smart contract ensures secure access for the duration paid for.

Micropayment Distribution: After successful connection or at the end of the access period, the smart contract transfers the micropayment from the UE's digital wallet to the homeowner's wallet.

Feedback and Ratings: Both parties can rate each other post-transaction, contributing to a trust-based community.

This pseudocode outlines the basic operations of the protocol, including network registration by homeowners, access requests by UEs, and the execution of smart contracts to handle transactions and access permissions. Other features such as secure authentication, dynamic pricing algorithms, and enhanced security measures are implemented in the protocol.

A method for providing internet access to a user equipment (UE) via a homeowner's WiFi network, comprising:
  registering, by a homeowner, the WiFi network on a blockchain platform, including specifying access conditions:
  receiving, by the blockchain platform, a request for access from the UE, including a micropayment:
  executing, by a smart contract on the blockchain platform, the access request by verifying the micropayment and granting the UE access to the WiFi network based on the specified access conditions:
  transferring, by the smart contract, the micropayment from the UE to the homeowner upon successful access grant.

In another aspect, a system for facilitating internet access via Wifi networks using blockchain technology; comprising:
  a blockchain platform configured to store registrations of WiFi networks by homeowners and to execute transactions between homeowners and UEs:
  a plurality of smart contracts deployed on the blockchain platform, each associated with a registered WiFi network and configured to automate the process of granting access to UEs based on received micropayments:
  a user interface configured to allow homeowners to register their WiFi networks and UEs to discover and request access to available WiFi networks.

The access conditions for WiFi networks include factors such as bandwidth, access duration, and the price for access. Additionally; the blockchain platform provides a digital wallet for both the homeowner and the User Equipment (UE) to streamline micropayment transactions. Both the homeowner and the UE to rate each other post-transaction, fostering a trust-based community.

In the system outlined in Concept 2, a decentralized application (DApp) is incorporated into the blockchain platform, enabling homeowners and UEs to engage with smart contracts directly (Concept 6). The user interface is designed to show real-time WiFi network availability based on the UE's location (Concept 7). Smart contracts are set up to automatically terminate the UE's WiFi access once the agreed-upon duration expires (Concept 8), and they are also equipped to manage disputes between homeowners and UEs regarding WiFi access (Concept 9).

Moreover, the blockchain platform supports dynamic pricing for WiFi network access, adjusting rates based on current demand (Concept 10). To ensure transparency and security; the platform records transactions on a public blockchain (Concept 11).

AI Based Heterogeneous Control, Management & Data Plane

Figure 2:
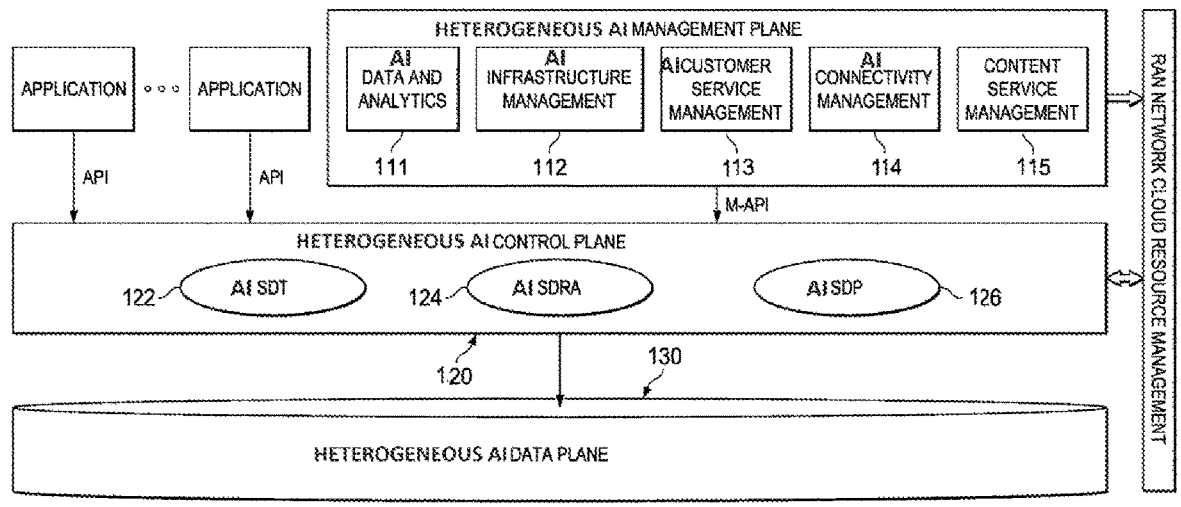
FIG. 2 shows AI heterogenous management, control and data plane architecture.

FIG. 2 shows an AI management plane 110 communicating with a RAN network cloud resource management module, which in turn communicates with a control plane 120, which in turn controls a data plane 130. This architecture leverages artificial intelligence (AI) to optimize the heterogeneous network operations, enhance customer service, manage connectivity and content, and ensure efficient infrastructure management. Below is a detailed breakdown of the system components and their interactions. AI Management Plane (110): Serves as the brain of the network management system, utilizing AI to oversee and optimize various aspects of the network. It includes several key modules: AI Data and Analytics Entity (111)—Analyzes vast amounts of network data to identify patterns, predict network issues, and suggest optimizations: AI Infrastructure Management (112)—Automates the configuration, maintenance, and optimization of network infrastructure based on insights derived from AI analytics: Customer Service Module (113): Enhances customer support by using AI to predict and resolve customer issues proactively, and personalize customer interactions: Connectivity Management Module (114): Manages and optimizes network connectivity dynamically to ensure seamless service across different network types and conditions: Content Management Module (115): Utilizes AI to optimize content delivery based on user preferences, network conditions, and content characteristics: RAN Network Cloud Resource Management Module: Interfaces with the AI management plane to allocate cloud resources efficiently for RAN operations. It ensures that RAN components have the necessary computational and storage resources to meet dynamic network demands: Control Plane (120): Receives optimized configurations and directives from the AI management plane and translates them into actionable control signals for the network. It manages the routing of data packets and the setup of network connections based on AI-driven insights: Data Plane (130): Responsible for the actual forwarding of data packets across the network. It executes the configurations and rules set by the control plane, ensuring efficient and secure data transmission.

The management plane 110 includes an AI data and analytics entity 111, an AI infrastructure management 112, a customer service module 113, a connectivity management module 114, and a content management module 115. AI Data and Analytics Entity 111 employs predictive analytics to forecast network demand and service quality. Machine learning models can analyze vast amounts of data to identify trends and provide actionable insights for network optimization. AI is applied to the Data and Analytics Entity 111 in the logical function architecture 100 for next-generation 5G wireless networks. The AI Data and Analytics Entity 111 includes AI Predictive Analytics that analyze historical data to forecast future network demands and service quality: enabling proactive adjustments to network resources and configurations. The AI Data and Analytics Entity 111 includes Anomaly Detection where AI can identify unusual patterns in network traffic that may indicate security threats or system malfunctions, allowing for timely interventions. The AI Data and Analytics Entity 111 includes Machine Learning to improve accuracy over time without explicit programming, which is essential for tasks such as spectrum sharing management and QoE monitoring. The AI Data and Analytics Entity 111 includes NLP to interpret and respond to human language, which can be used for customer service management and to provide insights from unstructured data like customer reviews. Generative AI generates new data that resembles existing patterns, which can be used for tasks like synthetic data generation for privacy-preserving analysis or stress-testing network configurations. AI can interpret complex scripts and generate new code, aiding in the creation and understanding of analytics algorithms and infrastructure management. The AI Data and Analytics Entity 111 includes Augmented Predictive Analytics, providing more precise forecasts for network management, such as predicting the demand for connectivity services. AI provides quick overviews of new datasets, offering summary statistics and visualizations for immediate understanding of key attributes. AI integrates with data visualization tools to create dynamic and interactive representations of data, aiding in the interpretation and communication of complex information. By leveraging these AI capabilities, the Data and Analytics Entity 111 can significantly improve the efficiency and effectiveness of network management, customer service, and infrastructure optimization in 5G networks.

Infrastructure Management Entity 112 includes AI optimization of spectrum sharing by predicting the best times and locations for sharing based on usage patterns. It can also manage RAN resources more efficiently through predictive maintenance and dynamic allocation of backhaul and access link resources. Optimizing Spectrum Sharing is done through AI/ML. In one embodiment, the Infrastructure Management Entity 112 can leverage artificial intelligence and machine learning (AI/ML) techniques to optimize spectrum sharing by predicting the best times and locations for sharing based on usage patterns. The Spectrum Usage Prediction can utilize long short-term memory (LSTM) neural networks to analyze historical spectrum usage data and predict future occupancy states of frequency channels over multiple time slots. This allows identifying idle spectrum opportunities for opportunistic access. The system can use multivariate LSTM models that consider multiple input features like time of day, location, service types etc. to make more accurate spectrum occupancy predictions. The system identifies frequency bands exhibiting discernible usage patterns (e.g. higher daytime usage) which are good candidates for dynamic sharing based on the predictions. Spectrum Access Optimization uses the predicted spectrum usage to dynamically allocate spectrum resources to different entities/services based on demand, rather than static assignments. This improves spectrum utilization efficiency. The system combines spectrum usage predictions with policies/rules to enable automated, real-time spectrum access control and dynamic spectrum sharing without human intervention. Reinforcement learning to optimize spectrum allocation decisions that balance demands from multiple entities while avoiding interference.

The Infrastructure Management Entity 112 can utilize AI/ML and predictive analytics to manage RAN resources like backhaul and access links more efficiently through predictive maintenance and dynamic allocation. Predictive Maintenance is done by analyzing sensor data and operational data from RAN equipment using machine learning models to predict potential failures or need for maintenance. This enables proactive scheduling of maintenance to prevent failures and downtime. The system uses generative AI models that can simulate complex failure patterns by learning from multimodal data like sensor readings, weather conditions, usage patterns etc. to make more accurate predictions. The system optimizes maintenance schedules by combining failure predictions with other factors like employee availability, customer demand patterns etc. using AI/ML techniques. Infrastructure Management Entity 112 utilizes AI/ML and predictive analytics for managing RAN resources like backhaul and access links through predictive maintenance and dynamic allocation, the process involves collecting and analyzing sensor data and operational data from RAN equipment, using machine learning models to predict potential failures or maintenance needs, and dynamically allocating resources based on these predictions. Dynamic Resource Allocation is performed where the system predicts future traffic load and bandwidth requirements on the backhaul and access links using time-series forecasting models like LSTM on historical network data. The system can dynamically allocate backhaul and access link resources based on the predicted demand to avoid congestion and maintain quality of service. The AI learning can make dynamic resource allocation decisions that maximize utilization while meeting service requirements. By incorporating AI/ML capabilities, the Infrastructure Management Entity 112 can optimize spectrum utilization through dynamic sharing based on predicted usage patterns. The system support RAN operations by enabling predictive maintenance to prevent failures and dynamic resource allocation to meet demand efficiently.

Customer Service Management Entity 113 employs AI to improve customer service by personalizing experiences through chatbots and virtual assistants. It can also monitor service-specific QoE and adjust network parameters in real-time to maintain high service quality: Entity 113 can monitor service-specific Quality of Experience (QoE) and adjust network parameters in real-time to maintain high service quality Connectivity Management Entity 114 uses AI to provide advanced location tracking services by analyzing movement patterns to predict and adjust network configurations for optimal connectivity. For example, entity 114 can do the following:

Cluster historical location data into movement patterns using a clustering algorithm.

Train an LSTM neural network model to predict future locations based on the clustered patterns.

For the current location, use the LSTM to predict future locations.

For each predicted future location, use a machine learning model to determine the optimal network configuration.

Adjust the network configuration proactively for the predicted future locations.

This allows the Connectivity Management Entity to analyze mobility patterns using AI/ML, predict future locations, and optimize the network configuration at those locations for seamless connectivity as the device moves around.

Content Service Management Entity 115 uses AI to manage content caching more effectively by predicting content popularity and user demand, thus optimizing the selection and placement of cached content.

Control Plane 120 is detailed next and involves leveraging AI and machine learning (ML) techniques to enhance the management, orchestration, and optimization of network resources and operations. This approach can significantly improve network efficiency, reliability; and security.

A hierarchical AI-based control plane solution for multi-technology deterministic networks involves structuring the control plane in layers, where each layer is responsible for different aspects of network control and management. This hierarchical structure allows for more efficient handling of complex network operations and better optimization of resources across different technologies and network layers. AI algorithms at each layer can make autonomous decisions based on real-time data, improving the network's adaptability and responsiveness to changing conditions. The control plane operation includes creating routing tables, managing network traffic, maintaining network topology; and providing security and load balancing. AI can enhance these functions by analyzing network data in real-time to make more informed decisions about routing, traffic management, and security policies. For example, AI can predict traffic patterns and adjust routing protocols accordingly to prevent congestion and ensure optimal data flow.

The AI-based system for real-time network traffic analysis and management includes loading and preprocessing network traffic data, training a machine learning model to predict traffic congestion, and using the model to make routing decisions. Additionally: it suggests dynamically adjusting traffic signals based on real-time traffic data to optimize traffic flow and prevent congestion. The system runs continuously, constantly monitoring and adjusting to the current traffic conditions.

In the context of Software-Defined Networking (SDN), the control plane is decoupled from the data plane, allowing for more flexible and dynamic network management. The AI-based SDN enables intelligent control plane functions, such as automated network configuration, optimization, and anomaly detection. By analyzing network performance data. AI algorithms can identify inefficiencies or potential security threats and automatically adjust network configurations as detailed in the following pseudocode:

The AI-based SDN system for intelligent control plane functions includes loading and preprocessing network performance data, building and training an anomaly detection model to identify inefficiencies or security threats, and building and training a network optimization model to automatically adjust network configurations. The system runs continuously: monitoring network performance and making adjustments as needed to optimize the network and address any detected anomalies.

The AI cloud control plane provides management and orchestration across an organization's cloud environment. AI can optimize cloud control plane operations by automating the configuration and deployment of cloud resources based on application requirements and performance metrics. AI can also enhance security in the cloud control plane by continuously monitoring for anomalous behavior and automatically implementing security controls to mitigate potential threats.

AI-enabled routing in SDN involves using AI and ML algorithms to optimize routing decisions based on a comprehensive analysis of network conditions, traffic patterns, and application requirements. This approach can significantly improve network performance and reliability by ensuring that data is routed through the most efficient paths, reducing latency; and avoiding congestion.

AI is used in the control plane to enhance network management, orchestration, and optimization through real-time data analysis, automated decision-making, and predictive capabilities. By leveraging AI, networks can become more adaptive, efficient, and secure, meeting the demands of increasingly complex and dynamic network environments.

Software Defined Topology (SDT) Logical Entity 122 uses AI to assist in creating virtual data-plane topologies by analyzing service requirements and network capabilities to determine the most efficient paths for data traffic. The Software Defined Topology (SDT) Logical Entity 122 uses AI to assist in creating virtual data-plane topologies by analyzing service requirements and network capabilities to determine the most efficient paths for data traffic. This process involves several steps, including understanding service parameters, analyzing network capabilities, and using AI algorithms to design optimal topologies. For Service Parameter Analysis, the SDT module receives service parameters for the service, which include requirements such as bandwidth, latency, reliability; and security.

For Network Capability Assessment, the system assesses the current state of the network, including the location of hosts, servers, terminals, and other end nodes: the projected traffic for the environment; and the projected costs for delivering different service levels. For AI-Driven Topology Design, the AI algorithms analyze the service parameters and network capabilities to create a logical network topology that meets the service requirements while optimizing the use of network resources. The AI system considers performance constraints such as network reliability, traffic throughput, and host/client computer speeds to minimize cost and maximize service quality:

AI is used to detect anomalies and potential security threats within the network, adjusting the topology as needed to mitigate these risks. The AI system can dynamically adapt the virtual topology in response to changing network conditions, service requirements, or traffic patterns to ensure continuous optimization. The SDT can be combined with Software-Defined Networking (SDN) to further enhance flexibility and control over the network topology: allowing for programmatic access and administration. The AI system can learn from the network's operational data over time, continuously improving its topology design algorithms for better performance and efficiency.

By leveraging AI in this way, the SDT Logical Entity 122 can create virtual topologies that are optimized for the specific needs of different services, ensuring efficient and reliable data traffic flow across the network.

Software Defined Resource Allocation (SDRA) Logical Entity 124 uses AI to enhance resource allocation by continuously learning from network conditions to map virtual topologies to physical paths more effectively. This includes metrics such as bandwidth usage, latency: packet loss, and network congestion levels. By continuously monitoring these conditions, the AI system can learn patterns and trends in network traffic, enabling it to predict future states and demands.

Using the insights gained from continuous learning, the SDRA can dynamically allocate network resources to meet current and anticipated demands. This involves adjusting bandwidth allocations, rerouting traffic, and even reconfiguring network elements on the fly to optimize performance and resource utilization. The goal is to ensure that virtual topologies are supported by the most efficient physical paths, considering the ever-changing network conditions.

SDRA Logical Entity 124 works in tandem with Software-Defined Networking (SDN) and Network Functions Virtualization (NFV) technologies. SDN provides the flexibility to programmatically control network resources and adjust configurations through a centralized control plane. NFV allows network functions to be virtualized and run on standard hardware, further enhancing the agility of resource allocation. The SDRA uses AI to make informed decisions on how best to utilize these technologies for efficient resource allocation. The system includes dynamically adjusting network paths and resources in response to varying traffic loads to maintain optimal performance and avoid congestion. The system allocates resources in a way that minimizes energy consumption without compromising service quality, contributing to greener network operations.

Software Defined Per-Service Customized Data Plane Process (SDP) Logical Entity 126 uses AI to select the most suitable transport protocols by analyzing traffic characteristics and network conditions, and AI-driven simulations to predict the outcomes of different protocol choices. The Software Defined Per-Service Customized Data Plane Process (SDP) Logical Entity 126 uses AI to select the most suitable transport protocols by analyzing traffic characteristics and network conditions. This process can involve AI-driven simulations to predict the outcomes of different protocol choices.

The AI-Driven Protocol Selection Process includes the following. Traffic Characterization: The SDP entity collects data on traffic characteristics, such as packet sizes, transmission intervals, and payload types. This data can be used to understand the requirements of different services, such as video streaming. VoIP, or file transfers. Network Condition Monitoring: Simultaneously, the entity monitors network conditions, including bandwidth availability, latency, jitter, and packet loss rates. This monitoring helps to understand the current state of the network and its ability to support various traffic types. AI-Driven Analysis: Using machine learning algorithms, the SDP entity analyzes the collected data to identify patterns and correlations between traffic characteristics and network performance. Protocol Simulation and Prediction: The entity can use AI-driven simulations to predict how different transport protocols might perform under current and projected network conditions. For example, it might simulate the performance of TCP versus UDP for a video streaming service given the current network latency and jitter. Protocol Selection: Based on the analysis and simulations, the SDP entity selects the transport protocol that is expected to provide the best performance for each service. This selection is made per service, allowing for customized data plane processing. Example of Protocols include: TCP (Transmission Control Protocol): Often used for applications that require reliable delivery, such as web browsing and email: UDP (User Datagram Protocol): Commonly used for applications where speed is more critical than reliability, such as live video or audio streaming: RTP (Real-time Transport Protocol): Designed for delivering audio and video over networks, often used in conjunction with UDP: SCTP (Stream Control Transmission Protocol): Can be used for applications that require both reliable data transfer and real-time features: DCCP (Datagram Congestion Control Protocol): Suitable for non-reliable traffic with congestion control, such as streaming media: or QUIC (Quick UDP Internet Connections): A newer protocol that provides a combination of TCP's reliability and UDP's speed, with built-in encryption, among others.

The AI-driven simulations could involve creating models that predict the performance of these protocols under various conditions. For example, an AI model could predict that QUIC will outperform TCP in a high-latency network due to its faster handshake process and better congestion control mechanisms. By using AI to analyze and predict the performance of different transport protocols, the SDP Logical Entity 126 can optimize the data plane for each service, ensuring that the selected protocol aligns with the service's requirements and the current network conditions. This approach can lead to improved performance, better quality of service, and a more efficient use of network resources.

AI in Data Plane 130 uses AI to dynamically adjust data flow within the physical data-plane, ensuring efficient traffic handling and quick adaptation to changing network conditions. AI in Data Plane 130 involves the application of artificial intelligence techniques to manage and optimize the flow of data within the physical data-plane of a network. By dynamically adjusting data flow. AI can ensure efficient traffic handling and quick adaptation to changing network conditions. Here's an elaboration on how AI can be applied in this context: Real-Time Traffic Analysis: AI algorithms can continuously analyze network traffic in real-time, identifying patterns, trends, and anomalies. This analysis can include metrics such as packet rates, throughput, and error rates. By understanding the current traffic flow. AI can make informed decisions about how to manage data transmission effectively. Predictive Traffic Management: Using predictive analytics. AI can forecast future network conditions based on historical and real-time data. This allows the Data Plane to proactively adjust to anticipated changes, such as increased traffic during peak hours or the impact of a new service deployment. Dynamic Routing and Load Balancing: AI can optimize routing decisions by dynamically selecting paths that minimize latency, avoid congestion, and balance the load across the network. This might involve rerouting traffic away from overburdened links or nodes and toward underutilized ones, ensuring a more even distribution of network traffic. Congestion Avoidance and Quality of Service (QOS): AI-driven systems can detect the onset of congestion before it becomes problematic and take steps to mitigate it, such as adjusting transmission rates or prioritizing certain types of traffic. Additionally. AI can enforce QoS policies by identifying and prioritizing traffic according to predefined rules, ensuring that critical services maintain high performance.

Anomaly Detection and Security: AI can enhance network security by identifying and responding to anomalies that may indicate cyber threats, such as distributed denial-of-service (DDOS) attacks. By detecting unusual traffic patterns. AI can trigger defensive mechanisms to protect the network infrastructure.

Self-Optimization and Healing: Data Plane 130 can use AI to self-optimize, continuously tuning its performance based on feedback loops. In the event of failures or suboptimal performance. AI can initiate self-healing processes, such as rerouting traffic or deploying additional resources to maintain service continuity.

Integration with SDN Controllers: In an SDN environment. AI in the Data Plane can work in conjunction with SDN controllers, which provide centralized management and orchestration. AI can inform the SDN controller of the current state of the network, enabling more intelligent and adaptive control plane decisions.

In addition to these specific uses, AI can be integrated across the entire logical function architecture to provide a cohesive and intelligent network management system that is capable of self-optimization, self-healing, and proactive security measures. AI can enable the 5G network to adapt to new services and demands dynamically, ensuring that the network remains robust, efficient, and secure as it evolves.

One embodiment applies AI to optimize the process of establishing a virtual data-plane logical topology for a service, each step handled by different logical entities within a software-defined networking (SDN) framework. Here's an elaboration on how AI can be applied to each step: Software Defined Topology (SDT) Logical Entity: This entity uses AI to establish a virtual data-plane logical topology tailored to the service's requirements. AI algorithms analyze service requirements, such as bandwidth, latency, and reliability, and create a virtual topology that meets these needs while optimizing the use of network resources. Software Defined Resource Allocation (SDRA) Logical Entity: Once the virtual topology is established, the SDRA entity maps it to the physical data-plane. AI is used here to continuously learn from network conditions, such as traffic patterns and congestion, to allocate resources effectively. AI-driven simulations can predict the impact of different resource allocation strategies, enabling the SDRA to make informed decisions that ensure efficient service delivery over the wireless network. Software Defined Per-Service Customized Data Plane Process (SDP) Logical Entity: This entity selects the most suitable transport protocols for the service-related traffic. AI analyzes traffic characteristics and network conditions to predict which protocols will provide the best performance. For instance, AI might choose TCP for reliable data transfer or UDP for real-time streaming, depending on the service requirements and current network state.

An example of how these entities work together using AI can be seen in a scenario where a video streaming service requires a virtual topology with high bandwidth and low latency. The SDT entity would use AI to design a virtual topology that prioritizes these requirements. The SDRA entity would then map this topology to the physical network, dynamically allocating resources like bandwidth on congested links or rerouting traffic to avoid latency. Finally, the SDP entity would use AI to select a transport protocol that optimizes for streaming, such as QUIC, which is designed for quick setup and has built-in congestion control mechanisms. By integrating AI across these entities, the network can adapt in real-time to changing conditions, optimize resource usage, and ensure that each service receives the network performance it requires. This approach leads to a more responsive, efficient, and user-centric networking environment, particularly important in complex and dynamic 5G networks.

Applying AI to optimize the process of establishing a virtual data-plane logical topology for a service involves several steps, each handled by different logical entities within a software-defined networking (SDN) framework. Here's an elaboration on how AI can be applied to each step: Software Defined Topology (SDT) Logical Entity: This entity uses AI to establish a virtual data-plane logical topology tailored to the service's requirements. AI algorithms analyze service requirements, such as bandwidth, latency, and reliability, and create a virtual topology that meets these needs while optimizing the use of network resources. Software Defined Resource Allocation (SDRA) Logical Entity: Once the virtual topology is established, the SDRA entity maps it to the physical data-plane. AI is used here to continuously learn from network conditions, such as traffic patterns and congestion, to allocate resources effectively. AI-driven simulations can predict the impact of different resource allocation strategies, enabling the SDRA to make informed decisions that ensure efficient service delivery over the wireless network. Software Defined Per-Service Customized Data Plane Process (SDP) Logical Entity: This entity selects the most suitable transport protocols for the service-related traffic. AI analyzes traffic characteristics and network conditions to predict which protocols will provide the best performance. For instance. AI might choose TCP for reliable data transfer or UDP for real-time streaming, depending on the service requirements and current network state. An example of how these entities work together using AI can be seen in a scenario where a video streaming service requires a virtual topology with high bandwidth and low latency. The SDT entity would use AI to design a virtual topology that prioritizes these requirements. The SDRA entity would then map this topology to the physical network, dynamically allocating resources like bandwidth on congested links or rerouting traffic to avoid latency. Finally, the SDP entity would use AI to select a transport protocol that optimizes for streaming, such as QUIC, which is designed for quick setup and has built-in congestion control mechanisms.

By integrating AI across these entities, the network can adapt in real-time to changing conditions, optimize resource usage, and ensure that each service receives the network performance it requires. This approach leads to a more responsive, efficient, and user-centric networking environment, particularly important in complex and dynamic 5G networks.

In one method for optimizing network resource allocation and protocol selection for service-related traffic in a wireless network: a. establishing a virtual data-plane logical topology for a service by a Software Defined Topology (SDT) logical entity, wherein the establishment is based on analyzing service requirements and network capabilities using artificial intelligence (AI): b, mapping the established virtual data-plane topology to a physical data-plane for transporting the service-related traffic over the wireless network by a Software Defined Resource Allocation (SDRA) logical entity, wherein the mapping utilizes AI to continuously learn from network conditions and dynamically allocate network resources: c. selecting one or more transport protocols for transporting the service-related traffic over the physical data-plane of the wireless network by a Software Defined Per-Service Customized Data Plane Process (SDP) logical entity, wherein the selection is based on AI analysis of traffic characteristics and network conditions; and d, using AI-driven simulations to predict outcomes of different protocol choices to optimize the transport of service-related traffic.

The AI analysis for establishing the virtual data-plane logical topology includes machine learning algorithms that process historical and real-time data regarding network performance and service requirements. The dynamic allocation of network resources involves predictive modeling to forecast network demand and adjust resource allocation in real-time. The selection of transport protocols is further based on predicted service quality metrics, including latency, throughput, and packet loss.

A system for optimizing network resource allocation and protocol selection for service-related traffic in a wireless network, comprising: a, a Software Defined Topology (SDT) logical entity configured to use artificial intelligence (AI) to establish a virtual data-plane logical topology based on service requirements and network capabilities: b, a Software Defined Resource Allocation (SDRA) logical entity configured to map the virtual data-plane topology to a physical data-plane and dynamically allocate network resources based on continuous learning from network conditions using AI: c, a Software Defined Per-Service Customized Data Plane Process (SDP) logical entity configured to select one or more transport protocols for the service-related traffic based on AI analysis of traffic characteristics and network conditions; and d, an AI-driven simulation module configured to predict outcomes of different protocol choices to facilitate the optimization of transport protocol selection.

The SDT logical entity utilizes machine learning algorithms to analyze historical and real-time data for establishing the virtual data-plane logical topology. The SDRA logical entity employs predictive modeling to forecast network demand and adjust resource allocation parameters in real-time. The SDP logical entity bases the selection of transport protocols on a combination of predicted service quality metrics and outcomes from AI-driven simulations. An AI system leverages machine learning (ML) and deep learning (DL) techniques to predict and allocate resource blocks to terminal devices more accurately and dynamically.

The following steps are done with the AI methodology: Data Collection: Collect historical data on resource block usage, network conditions, terminal device behavior, and performance metrics. Feature Engineering: Identify relevant features from the collected data that influence resource block allocation, such as traffic patterns, device mobility, channel quality and time of day. Other features that influence resource block allocation decisions, such as time of day, location, device capabilities, current network load, and historical resource block utilization patterns. Model Training: Train a supervised learning model, such as a deep neural network (DNN), to predict the optimal set of resource blocks for a given terminal device based on the identified features. The model should be trained using a dataset that includes instances of successful and unsuccessful resource allocations. Resource Indication Prediction: Implement the trained model in the network device to predict the resource indication information, which includes determining the plurality of resource blocks that should be allocated to the terminal device. Encoding Resource Indication Information: Encode the predicted resource blocks into resource indication information using S bits, where each bit corresponds to a block or a set of consecutive blocks in the frequency domain. This encoding should be designed to minimize the number of bits while still providing accurate and unambiguous resource block indication. Sending Resource Indication Information: The network device sends the encoded resource indication information to the terminal device. Receiving and Decoding by Terminal Device: The terminal device receives the resource indication information and decodes it to determine the index information of the allocated resource blocks. Feedback Loop: Implement a feedback mechanism where the terminal device reports back to the network device on the success or failure of using the allocated resource blocks. This feedback is used to further train and refine the AI model. Continuous Learning: Continuously update the AI model with new data and feedback to adapt to changing network conditions and device behaviors. Integration with Network Functions: Integrate the AI methodology with existing network functions, such as the Network Data Analytics Function (NWDAF), to leverage network insights for better prediction and allocation of resources. By using this AI methodology, the network device can efficiently perform resource configuration for the terminal device, ensuring that the terminal device can accurately obtain resource location information in a timely manner. The AI-driven approach can adapt to dynamic network conditions and user behaviors, leading to improved network efficiency and user experience.

Example AI System Workflow: The network device collects real-time data on network conditions and terminal device requirements. The AI model processes the data and predicts the optimal resource block allocation for each terminal device. The network device encodes this information into resource indication information and sends it to the terminal devices. Terminal devices receive the resource indication information and determine their allocated resource blocks. Terminal devices provide feedback on the allocation's effectiveness, which the AI system uses to improve future predictions. By implementing such an AI system, the network device can dynamically and intelligently allocate resources, leading to improved network efficiency and better user experiences. This approach aligns with the principles of AI-enabled radio resource allocation in 5G networks.

A 5G resource block (RB) is fixed in size. Specifically, an RB in 5G New Radio (NR) is defined as consisting of 12 consecutive subcarriers in the frequency domain. This definition is consistent across various sources and standards, indicating that the size of a resource block in terms of the number of subcarriers it contains is fixed. However, the bandwidth occupied by a resource block can vary depending on the subcarrier spacing, which is part of the 5G NR's flexible numerology. The subcarrier spacing can be 15 kHz. 30 kHz. 60 kHz. 120 kHz, or 240 kHz, affecting the overall bandwidth that a single RB occupies, but the structure of the RB itself, being 12 subcarriers, remains constant.

AI and machine learning (ML) can be used to optimize various aspects of 5G networks, including subcarrier spacing, by analyzing network data and making predictions or decisions based on that data. In the context of 5G, subcarrier spacing is an important parameter that affects the performance of the network. Different subcarrier spacings can be used to accommodate different service requirements, such as low latency or high throughput. AI could potentially be used to determine the optimal subcarrier spacing by considering various factors such as: Traffic Patterns: AI can analyze traffic patterns to predict periods of high or low network usage, which can influence the choice of subcarrier spacing to optimize network capacity and performance. Channel Conditions: Machine learning algorithms can assess the channel conditions, including interference and signal-to-noise ratio, to select a subcarrier spacing that minimizes interference and maximizes signal quality. User Requirements: AI can take into account the Quality of Service (QOS) requirements of different users or applications, choosing a subcarrier spacing that meets these requirements while optimizing network resources. Network Topology: The layout of the network, including the distribution of base stations and user density, can be analyzed by AI to determine the most effective subcarrier spacing for coverage and capacity. Spectrum Availability: AI can consider the available spectrum and regulatory constraints to select a subcarrier spacing that makes efficient use of the spectrum.

An AI system designed to determine subcarrier spacing involves a combination of data collection, feature engineering, model training, and real-time prediction. The system uses historical and real-time network data to train predictive models, which would then be used to make decisions about subcarrier spacing in various network scenarios. These decisions would aim to optimize network performance, taking into account the trade-offs between different performance metrics such as throughput, latency, and reliability. Designating the subcarrier spacing in a method that involves sending resource indication information with S bits to a terminal device, where this information indicates the frequency domain resources of a data channel, requires a nuanced approach that leverages the flexibility of 5G NR's numerology. The method described involves a dynamic allocation of resource blocks within a Bandwidth Part (BWP) and utilizes the concept of Resource Block Groups (RBGs) to efficiently manage frequency domain resources. Here's how the subcarrier spacing can be designated within this framework: Define Numerology and Subcarrier Spacing: First, determine the numerology ($\mu$) that will be used for the BWP. The numerology defines the subcarrier spacing ($\Delta f$) according to the formula $\Delta f=15 \times 2^\mu$ kHz, where u ranges from 0 to 4, corresponding to subcarrier spacings of 15 kHz. 30 kHz. 60 kHz. 120 kHz, and 240 kHz, respectively. This choice will depend on the specific requirements of the data channel, such as latency, bandwidth, and the propagation environment. Configure Resource Block Groups (RBGs): Based on the chosen numerology and the total bandwidth of the BWP, configure the size of the RBGs (denoted as m). The RBG size m could vary depending on the total number of resource blocks (RBs) within the BWP and the subcarrier spacing. The configuration aims to optimize the allocation of RBs to meet the service requirements while ensuring efficient utilization of the spectrum. Resource Indication Information Encoding: Encode the resource indication information using S bits, where the most significant bit (MSB) indicates whether a set of RBs belongs to the frequency domain resources of the data channel. The encoding should reflect the allocation of RBs starting from a specific start resource block of the BWP. The quantity of RBs indicated (n) should be less than or equal to the RBG size (m). Dynamic Allocation Based on Offset (y2): The offset (y2) from the start resource block of a common index area to the start resource block of the BWP mod m determines the dynamic adjustment of n. When y2 is not equal to 0, n is adjusted to be less than m, specifically m-y2. This ensures that partial RBGs at the beginning of the BWP are efficiently utilized. When y2 is equal to 0, indicating the offset is an integer multiple of m, n is set equal to m, optimizing the allocation for full RBG utilization. Transmission of Resource Indication Information: The network device sends the encoded resource indication information to the terminal device. This information enables the terminal device to accurately determine the allocated frequency domain resources (RBs) for data transmission or reception. Adaptation to Network Conditions: The method should include mechanisms for adapting the RBG configuration and the allocation of RBs based on changing network conditions, user demands, and the performance of previous allocations. This could involve AI or machine learning algorithms to predict optimal configurations and allocations dynamically. By following these steps, the subcarrier spacing is inherently designated through the AI's choice of numerology for the BWP, which directly influences the configuration of RBGs and the dynamic allocation of RBs to terminal devices. This method leverages the flexibility and efficiency of 5G NR to meet diverse service requirements while optimizing the use of frequency domain resources.

In an alternative embodiment, the first bit out of a series of S bits is utilized to signal whether a sequence of n resource blocks, commencing from a starting resource block within a shared index zone, is allocated to a terminal device, with n being equivalent to m: alternatively, n is determined by a formula that incorporates a primary offset and m. Here, m is either communicated by the network device or is preset, the primary offset represents the gap between the starting resource block of the shared index area and a predetermined point in the frequency domain, and this frequency domain reference point is either transmitted by the network device or is preset. In a variation of this design, n is set to a value derived from the primary offset and m, where n is either equal to y1, or it is the result of m subtracted by y1, with y1 being the remainder when the primary offset is divided by m. Additionally, the terminal device may receive the primary offset from the network device. In another optional design, the first bit in the S bits indicates whether a sequence of n resource blocks, starting from the initial resource block of a bandwidth part (BWP), is designated for the terminal device, or it signifies whether m resource blocks contiguous to the n consecutive resource blocks, starting from the initial resource block of a BWP, are intended for the terminal device. Here, n is calculated based on m and a secondary offset, or n is ascertained based on m, the primary offset, and the secondary offset. The values for m, the primary offset, and the secondary offset are either communicated by the network device or are preset, with the secondary offset being the distance between the starting resource block of the shared index area and the initial resource block of a carrier BWP. In a further optional design, when n is derived from m and the secondary offset, n equals m minus y2, where y2 is the remainder when the secondary offset is divided by m. Alternatively, when n is calculated based on m, the primary offset, and the secondary offset, n is either equal to y3 or it is the difference between m and y3, with y3 being the remainder when a third offset is divided by m, and this third offset is associated with both the primary and secondary offsets. In yet another optional design, the terminal device receives either the primary offset, the secondary offset, or both from the network device. The network device sends offset indication information to the terminal device, which the terminal device uses to determine the number of resource blocks offset from the resource indication frequency domain reference point to either the starting resource block of the shared index area or the initial resource block of the carrier BWP. The resource indication frequency domain reference point could be either the first resource block or the last one within the sequence indicated by the first bit of the resource indication information. The terminal device then figures out the index information for the set of resource blocks based on both the offset indication information and the resource indication information. In an additional optional design, a second bit in the S bits is employed to denote whether a certain number of resource blocks, referred to as in resource blocks, are allocated to the terminal device, and these in resource blocks are situated next to the n resource blocks indicated by the first bit in the S bits. The value of in could be 1, 2, 4, 8, 3, 6, or 12, The network device sends offset indication information to the terminal device, which includes the quantity of RBs offset from the resource indication frequency domain reference point to the start resource block of the common index area or the BWP. By incorporating these enhancements, the method becomes more flexible and can accommodate a variety of resource allocation scenarios, allowing for efficient and dynamic resource configuration for the terminal device. The terminal device can accurately and timely obtain resource location information, which is crucial for optimizing the use of the frequency spectrum and improving overall network performance.

In one embodiment, resource indication information is sent using a bitmap, and the most significant bit (MSB) indicates whether a resource block set belongs to the frequency domain resources of the data channel. Alternative Encoding arrangements can use a different encoding scheme that does not rely on bitmaps or MSB indications. For example, one could use a list or a different data structure to convey the same information. Instead of using bits to indicate resource block sets, consider using a different mechanism, such as a table or a database that maps resource blocks to their status. The system can use Dynamic RBG Sizing where the RBG size is not fixed but dynamically determined based on network conditions or user requirements. Non-RBG Allocation can be used with a resource allocation method that does not use the RBG concept at all, perhaps by using a continuous range or a different grouping mechanism. A Hybrid Allocation can be used where time-domain and frequency-domain resource allocation is combined using a time-frequency matrix.

Bandwidth Parts (BWPs) within the frequency domain can be set up through specific signaling to a terminal device, such as RRC signaling, without any restrictions. A terminal device can have up to four BWPs configured for downlink transmission and up to four additional BWPs for uplink transmission. It's important to note that BWP configurations can vary across different terminal devices. In practice, only one BWP for uplink or downlink is active at any given time. The resources for a BWP are situated within the bandwidth of a system carrier. The terminal device identifies the subcarrier spacing ($\mu$) from the received indication information and calculates the number of physical resource blocks in the common index area using u and the table above. Alternatively, the terminal device may receive a direct notification from the network device regarding the number of physical resource blocks in the common index area, or it may determine this number based on standards or protocols, with no restrictions applied. The number of physical resource blocks within a common index area of the system carrier is determined according to the following table and subcarrier spacing sizes corresponding to u are outlined:

| $\mu$ | Quantity of physical resource blocks | Subcarrier spacing (kHz) |
| --- | --- | --- |
| 0 | 275 | 15 |
| 1 | 275 | 30 |
| 2 | 275 | 60 |
| 3 | 275 | 120 |
| 4 | 138 | 240 |
| 5 | 69 | 480 |

For instance, with $\mu=0$, there are 275 physical resource blocks, and the common resource block indexes range from {0} to {274}. These indexes are utilized to configure the resources occupied by a BWP in the frequency domain, where the resource blocks within a BWP are sequential. The minimum granularity in the frequency domain is one resource block. The common RB indexes are set by the network device. Depending on the subcarrier spacing, the network device also configures an offset from an RB with index 0 in the common RB indexes to a frequency domain reference point. This reference point could be a physical resource block with the lowest index in a synchronization signal/physical broadcast channel block (SS/PBCH Block) of a primary serving cell (Pcell), an uplink frequency domain location announced through system information in a Peell, a frequency domain location indicated by secondary serving cell configuration in a Scell, or a frequency domain area indicated by supplemental uplink frequency domain configuration in supplemental uplink (SUL) frequency domain, with no restrictions on the selection.

Figure 3:
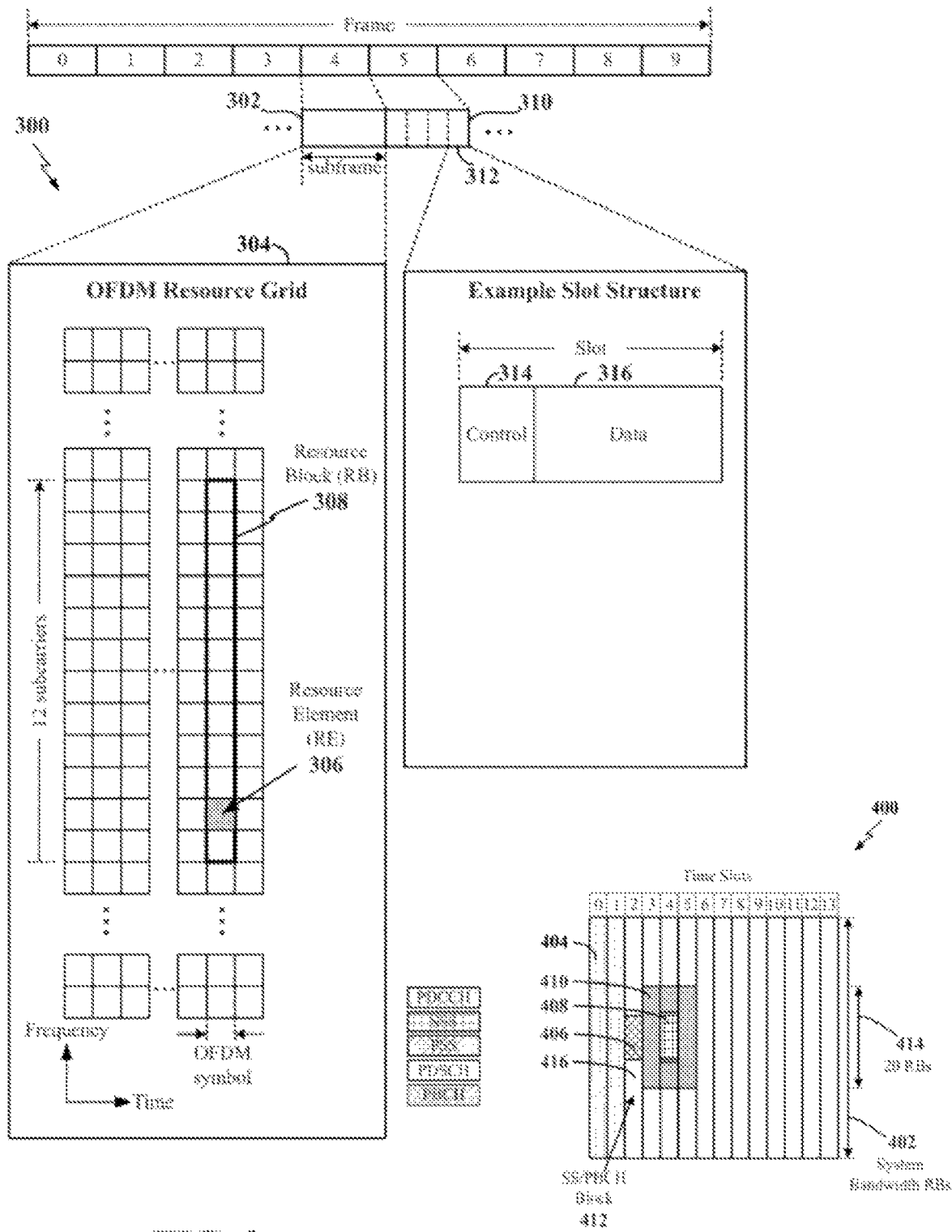
FIG. 3 shows exemplary wireless resources in an air interface utilizing orthogonal frequency divisional multiplexing (OFDM) according to some aspects of the disclosure.

Turning now to FIG. 3, the resource grid is utilized to schematically represent the time-frequency resources available for a given antenna port. In scenarios involving multiple-input-multiple-output (MIMO) configurations with several antenna ports, each port has a corresponding resource grid. This grid is segmented into multiple resource elements (REs), with each RE comprising a single subcarrier and symbol. These REs, the smallest units within the time-frequency grid, carry a single complex value that represents data from either a physical channel or signal. The amount of information each RE represents varies with the modulation scheme employed. Blocks of REs are known as physical resource blocks (PRBs) or simply resource blocks (RBs), encompassing a set number of consecutive subcarriers in the frequency domain. Typically, an RB includes 12 subcarriers, a figure that remains constant across different numerologies. In the time domain, the number of consecutive Orthogonal Frequency Division Multiplexing (OFDM) symbols an RB includes can vary based on the numerology. It's generally understood that a single RB corresponds exclusively to one direction of communication, either transmission or reception, for a device. Resource blocks can be grouped into Resource Block Groups (RBGs), sub-bands, or bandwidth parts (BWPs), with these groupings potentially spanning the entire bandwidth. The scheduling of user equipment (UEs) or sidelink devices for downlink, uplink, or sidelink transmissions involves allocating one or more REs within these sub-bands or BWPs. Typically, a UE utilizes only a subset of the available resource grid. The allocation of more RBs to a UE, coupled with a higher modulation scheme for the air interface, results in a higher data rate for the UE. RBs can be scheduled by a base station or self-scheduled by a UE/sidelink device in the case of device-to-device (D2D) sidelink communication.

Frames, subdivided into subframes, represent durations within the communication system, with each frame spanning 10 ms and each subframe lasting 1 ms. Subframes consist of one or multiple adjacent slots, which are defined by a specific number of OFDM symbols and a given cyclic prefix (CP) length. Slots can also include mini-slots or shortened transmission time intervals (TTIs) for transmissions occupying resources scheduled for ongoing slot transmissions. Slots are structured to include both a control region and a data region. The control region may carry control channels, such as a physical downlink control channel (PDCCH) or a physical uplink control channel (PUCCH), while the data region carries data channels like a physical downlink shared channel (PDSCH) or a physical uplink shared channel (PUSCH). Slots can be dedicated entirely to downlink (DL), uplink (UL), or a combination of both. Resource elements within an RB may be designated to carry various physical channels, including control, shared, and data channels, as well as pilots or reference signals. These pilots or reference signals enable a receiving device to perform channel estimation, facilitating coherent demodulation/detection of the control and/or data channels. Communication within the RAN can be either broadcast, multicast, groupcast, or unicast, with the nature of the communication determining the transmission method. For downlink transmissions, a scheduling entity: such as a base station, allocates REs to carry downlink control information (DCI) and other downlink signals. These signals include demodulation reference signals (DMRS), phase-tracking reference signals (PT-RS), positioning reference signals (PRS), channel state information reference signals (CSI-RS), and synchronization signal blocks (SSBs). Synchronization signals, including a primary synchronization signal (PSS) and a secondary synchronization signal (SSS), along with the physical broadcast control channel (PBCH) in the SSB, provide essential system information for initial access. This information aids UEs in achieving synchronization and identifying the physical cell identity (PCI) of the cell. For uplink transmissions, scheduled entities utilize REs to carry uplink control information (UCI) to the scheduling entity. UCI can include a variety of packet types and categories, such as pilots, reference signals, and information to assist in decoding uplink data transmissions. In sidelink communication, the control region of a slot may include a physical sidelink control channel (PSCCH) carrying sidelink control information (SCI), while the data region may include a physical sidelink shared channel (PSSCH) carrying sidelink data traffic. These physical channels are multiplexed and mapped to transport channels for handling at the medium access control (MAC) layer, with transport channels carrying blocks of information called transport blocks (TBs).

A modem processor may include an encoder, a modulator, a decoder, and a demodulator. The encoder is configured to encode signals that are to be sent, such as service data and signaling messages for uplink transmission, and perform processing tasks like formatting, encoding, or interleaving. The modulator is tasked with modulating the output of the encoder, which may involve symbol mapping and modulation, to produce an output sample. Conversely, the demodulator is set up to demodulate incoming signals, processing input samples to provide symbol estimation. The decoder's role is to decode the demodulated input, which may include de-interleaving and decoding, to output the processed signal. These components, the encoder, modulator, demodulator, and decoder, can be implemented within the integrated modem processor. They carry out processing based on the radio access technologies utilized by the radio access network. The modem processor receives digital data from the application processor, which may represent voice, data, or control information, and processes this data for transmission. It may support various wireless communication protocols from different communication systems, such as LTE. New Radio. UMTS, and HSPA. Optionally: the modem processor may include one or more memories. Additionally, the modem processor and the application processor may be integrated into a single processor chip.

As used herein, a sub-band refers to a continuous range of bandwidth that is allocated to a specific numerology and typically employs a unique spectrum shaping filter for signal processing. This is distinct from bandwidth portions or sub-band portions, which do not inherently involve spectrum shaping. Bandwidth portions are segments of the overall system bandwidth that fall under a single spectrum shaping filter, and they are not associated with specific spectrum shaping requirements. A sub-band is composed of a contiguous set of one or more bandwidth portions. Similarly, a sub-band can be segmented into multiple sub-band portions, which serve as units for allocating spectrum within a sub-band for resource block (RB) allocation. All sub-band portions within a sub-band share the same numerology that is linked to that sub-band.

The allocation of sub-bands to particular numerologies can vary over time and may be adjusted based on system needs, although in some cases, the allocation might be fixed or only occasionally changed. The size and quantity of sub-bands assigned to a numerology are influenced by factors such as the types of traffic, the number of users, and the data volume they require. The flexibility in sub-band assignment is beneficial because it allows for a design that is adaptable for future needs and supports the simultaneous operation of multiple services within the same frequency carrier.

The system leverage machine learning (ML) techniques, including reinforcement learning (RL) and deep learning (DL), to optimize bandwidth allocation, sub-band selection, and resource block allocation in wireless networks. AI for flexibly decomposing the system bandwidth and efficiently allocating resource blocks (RBs) without relying on pre-assigned numerology; a machine learning approach dynamically adjusts to the varying payload sizes of different user equipments (UEs). One embodiment performs the following:

1. Decomposing System Bandwidth into Sub-bands

AI Structure: Clustering Algorithms

Objective: To dynamically partition the system bandwidth into sub-bands based on current network demands and UE requirements.

Implementation Details: Use unsupervised learning algorithms, such as k-means clustering, to group UEs with similar bandwidth and latency requirements. The system bandwidth can then be decomposed into sub-bands that correspond to these clusters, with each sub-band being assigned a numerology that best fits the cluster's needs 2. Assigning Sub-bands to Numerologies AI Structure: Reinforcement Learning (RL)

Objective: To assign one or more sub-bands to a numerology in a way that optimizes network performance and UE satisfaction.

Implementation Details: Implement an RL agent that learns to assign sub-bands to numerologies based on the traffic type, UE payload size, and network conditions. The agent receives rewards for assignments that improve network efficiency and UE throughput, encouraging it to learn optimal policies over time.

3. Efficient RB Allocation within Sub-bands

AI Structure: Deep Neural Networks (DNNs)

Objective: To allocate RBs within sub-bands efficiently, considering the diverse payload sizes of UEs.

Implementation Details: Train a DNN to predict the optimal RB allocation for each UE within a sub-band. The network can take into account the payload size, required data rate, and quality of service (QOS) requirements to make allocation decisions that maximize spectral efficiency and minimize interference.

4. Reducing the Size of the RB Allocation Bitmap
    AI Structure: Dimensionality Reduction Techniques
        Objective: To reduce the size of the RB allocation bitmap in accordance with the varying payload sizes of UEs.
        Implementation Details: Apply dimensionality reduction techniques, such as Principal Component Analysis (PCA) or autoencoders, to compress the RB allocation bitmap without losing significant information. This can make the allocation process more efficient, especially for UEs with smaller payload sizes.
        By leveraging these AI structures, the system can dynamically adapt to changing network conditions and UE demands without being constrained by fixed numerologies. This approach can lead to more efficient use of the available bandwidth and better overall network performance. The AI models would need to be trained on historical data and continuously updated with real-time information to ensure they remain effective as network conditions evolve.

In an embodiment of the invention, AI is utilized to dynamically allocate system bandwidth, referred to as sub-bands, to various numerologies and communicate these allocations to user equipment (UE). This approach allows for flexible adaptation to changing network demands and UE requirements without being constrained by fixed numerology assignments.

For signaling the numerology and sub-band bandwidth assignments, the following can be done:

Higher Layer Radio Resource Control (RRC) Signaling: This method is suitable for scenarios where the numerology and sub-band assignments are relatively stable and do not require frequent updates. It offers the advantage of lower signaling overhead.

Dynamic Signaling: Utilized through a dynamic control channel, this method is appropriate for environments needing rapid and frequent changes in numerology and sub-band assignments. Although this approach incurs higher signaling overhead, it provides the flexibility needed for dynamic network conditions.

The system bandwidth is divided into a set of bandwidth portions, which can be of fixed equal size or vary based on predefined patterns. These portions are then allocated to different numerologies based on current network requirements, with the possibility of both distributed and contiguous assignments:

Fixed Equal Size Bandwidth Portions: Supports a fully flexible assignment where any combination of bandwidth portions can be allocated to a specific numerology. The allocation can be indicated using L bits of signaling, allowing for both distributed and contiguous sub-band configurations.

Predefined Patterns of Bandwidth Portions: This method divides the available bandwidth into portions of varying sizes according to predefined patterns, which are designed based on traffic statistics and the requirements of different numerologies. This approach enables efficient allocation of bandwidth to suit the varying payload sizes of UEs, from small (e.g., Machine-Type Communications, MTC) to large (e.g., mobile broadband, MBB) payloads.

Signaling schemes are developed to efficiently convey the assignment of bandwidth portions to numerologies, with specific schemes designed for conveying contiguous group assignments more efficiently than the fully flexible assignment scheme.

The choice of the number of bandwidth portions (L) and the use of predefined patterns balance the trade-off between flexibility and signaling overhead. The signaling can be semi-static to reduce the overhead impact in dynamic environments.

AI plays a crucial role in this process by analyzing network conditions, UE demands, and traffic patterns to make intelligent decisions on the division of system bandwidth into sub-bands and the assignment of these sub-bands to appropriate numerologies. This AI-driven approach ensures optimal utilization of the available bandwidth, accommodating the diverse needs of UEs while minimizing signaling overhead and maximizing network efficiency.

1. Transmitting a Bandwidth Portion Assignment
    AI Structure: Reinforcement Learning (RL) Model
        Objective: To dynamically assign bandwidth portions to different numerologies based on network conditions and demand.
        Input: Real-time network conditions, user demand, and specific requirements of different applications.
        Action: Selection of bandwidth portions for assignment.
        Reward: Improved network efficiency and user experience, measured by metrics such as throughput, latency, and energy efficiency.
        Utilize an RL model where the state represents the current network conditions and the action is the selection of bandwidth portions. The reward function is designed to optimize network performance. This model can be trained using historical data and updated periodically to adapt to changing network conditions.

2. Transmitting a Sub-band Portion Selection Field and a Resource Block Allocation Field
    AI Structure: Deep Neural Network (DNN) with Supervised Learning
        Objective: To select sub-band portions and allocate resource blocks efficiently to minimize interference and maximize spectral efficiency.
        Input: Current network load, user distribution, and interference patterns.
        Output: Optimal sub-band portion selections and resource block allocations.
        A DNN can be trained on historical data to predict the optimal sub-band portion selection and resource block allocation. The network can consider various factors, including interference patterns, to make decisions that enhance overall network performance.

3. Receiving a Bandwidth Portion Assignment
    AI Structure: Predictive Modeling
        Objective: To predict future bandwidth portion assignments and prepare the receiver device for optimal reception.
        Input: Historical bandwidth portion assignments, current network conditions, and device capabilities.
        Output: Predicted bandwidth portion assignment.
        A predictive model, such as a time series analysis or a machine learning model, can forecast future bandwidth portion assignments based on historical trends and current conditions. This allows the receiver device to adjust its settings proactively for improved reception.

4. Receiving a Sub-band Portion Selection Field and a Resource Block Allocation Field
    AI Structure: Decision Support System (DSS) based on Machine Learning Objective: To assist the device in interpreting received sub-band portion selections and resource block allocations for efficient resource management.

Input: Received sub-band portion selection and resource block allocation fields, current device status, and network conditions.

Output: Recommendations for resource management on the device.

A DSS, powered by machine learning algorithms, analyzes the received fields and current conditions to provide actionable recommendations. This system can help the device manage its resources more efficiently, adapting to the allocated sub-band portions and resource blocks.

Each of these AI structures can be further refined and customized based on specific network architectures, technologies (e.g., 5G, IoT), and application requirements. The integration of AI and ML in managing bandwidth and resource allocations offers a pathway to more adaptive, efficient, and intelligent wireless networks.

Rb Allocation

AI performs RB allocation by dynamically assigning resource blocks to user equipment (UE) based on various factors such as traffic type, channel conditions, and UE requirements. This process is more adaptive and efficient compared to the traditional fixed bitmap approach used in LTE, which does not always provide the most efficient allocation for different payload sizes.

AI-Driven RB Allocation Process is as follows:

Data Collection and Analysis: AI systems collect real-time data on network conditions, UE capabilities, and traffic demands.

Predictive Modeling: Using machine learning algorithms, AI predicts the traffic patterns and requirements of different UEs, allowing for proactive RB allocation.

Dynamic Sub-band and Bandwidth Portion Assignment: AI algorithms assign sub-bands or bandwidth portions to numerologies based on the predicted needs of the UEs. These assignments can be contiguous or non-contiguous and are signaled to UEs using various methods.

Resource Block Grouping: AI can group RBs into RBGs for efficient allocation, considering factors like frequency diversity and channel selectivity.

Optimization: AI optimizes RB allocation to balance the trade-off between resource saving and user satisfaction, aiming to improve network performance and UE experience.

Signaling: AI systems communicate the RB allocation to UEs using signaling methods that can include higher layer RRC signaling for semi-static assignments or dynamic signaling for rapid changes.

Scenarios and Methods of AI-Based RB Allocation

Sub-band Assignment: AI assigns one or more sub-bands to a given numerology, which may be contiguous or distributed across the bandwidth. The assignment is signaled to UEs, and the numerology for each UE is either predefined or previously signaled.

Bandwidth Portion Assignment: Instead of sub-bands, AI can assign sets of bandwidth portions to a numerology. This method offers flexibility in allocating different portions of the bandwidth based on UE needs.

Bandwidth Portion Selection Field: AI uses this field to indicate which bandwidth portions assigned to a numerology will be used for a specific UE. This allows for tailored RB allocation within the assigned bandwidth portions.

Sub-band Selection Field: Similar to the bandwidth portion selection field, this field is used by AI to indicate which sub-bands will be used for a given UE, providing a more granular control over the RB allocation.

RB Allocation Field: This field specifies the actual RB allocation within the selected bandwidth or sub-band for the UE, ensuring that the UE receives the necessary resources for its traffic.

AI-based RB allocation methods are designed to be flexible and efficient, allowing for a more responsive and adaptive network that can handle the diverse and dynamic requirements of modern wireless communication systems. The use of AI in RB allocation can lead to significant improvements in network performance, resource utilization, and user satisfaction.

Sub-band selection and bandwidth portion selection are methods used to convey RB allocation to UEs, allowing for flexible and efficient use of the available spectrum. These methods can be further refined by dividing the selected frequency resources into sub-band portions, which provides a balance between scheduling flexibility and signaling overhead.

Sub-Band Selection

Sub-band Selection Field: This field indicates which sub-bands are allocated to a UE. For example, a two-bit field with a value of "10" might indicate that the first sub-band is selected for RB allocation to the UE, while the second is not.

OFDM Processing: When UEs are allocated sub-bands that are non-contiguous, separate OFDM processing may be required for each sub-band, which can increase the complexity and cost for the UE.

Bandwidth Portion Selection

Bandwidth Portion Selection Field: Similar to the sub-band selection field, this field specifies which bandwidth portions are allocated to a UE. A two-bit field set to "10" would indicate that the first bandwidth portion is selected for RB allocation. The format of the bandwidth portion selection field can vary to provide more flexibility or to reduce signaling overhead. A single bit can indicate a less flexible allocation, while multiple bits can allow for a more granular allocation across bandwidth portions.

Sub-Band Portion Selection

Division into Sub-band Portions: The selected bandwidth portions or sub-bands can be further divided into sub-band portions, with the number of portions (K) representing a trade-off between flexibility and overhead.

Sub-band Portion Selection Field: This field selects one or more of the sub-band portions for RB allocation. The number of bits required for this field depends on whether arbitrary or contiguous selection is supported.

Message Formats for RB Allocation

Message Format with Bandwidth Portion Selection: A message format includes a bandwidth portion selection field, a sub-band portion selection field, and an RB allocation field, which together specify the RB allocation across the selected portions.

Message Format with Sub-band Selection: Another message format includes a sub-band selection field, a sub-band portion selection field, and an RB allocation field, allowing for RB allocation across selected sub-band portions.

Logical Division of Sub-Band Bandwidth

Logical Sub-band Portions: Resources can be divided on a logical basis, where each logical sub-band portion may correspond to a physically contiguous or non-contiguous portion of the spectrum. Efficient Resource Allocation: Logical division allows for efficient allocation, particularly for moderate to larger bandwidths, by enabling the allocation of physically non-contiguous sub-band portions through contiguous logical portions. These methods enable a system to dynamically and efficiently allocate RBs to UEs based on their specific needs and the overall network conditions. The use of logical sub-band portions can simplify the allocation process and reduce the complexity for UEs, especially when dealing with non-contiguous spectrum allocations.

Incorporating AI into the transmitter and receiver chains for dynamic numerology and RB allocation involves leveraging machine learning algorithms to adaptively manage and optimize resource block allocations based on real-time network conditions, user demands, and traffic types. This approach moves away from fixed numerologics and static resource block allocations, enabling a more flexible and efficient use of the available spectrum. The AI-enhanced transmitter chain would include components similar to those in the conventional setup (constellation mapper. IFFT, cyclic prefix inserter, etc.), but with the addition of AI-driven modules for dynamic numerology selection, sub-band and bandwidth portion assignment, and RB allocation. AI-Driven Numerology Selection: An AI module analyzes network conditions and user requirements to select the most appropriate numerology for each set of UEs. This selection is based on factors such as latency requirements, traffic volume, and mobility patterns. Dynamic Sub-band and Bandwidth Portion Assignment: Another AI module dynamically assigns sub-bands or bandwidth portions to selected numerologies. This assignment considers real-time network load, spectrum efficiency and interference patterns to optimize spectrum usage. AI-Based RB Allocation: An AI-driven RB allocator determines the optimal allocation of RBs within the assigned sub-bands or bandwidth portions. This process uses predictive modeling to anticipate user demand and adaptively allocate resources for maximum efficiency. Signal Processing and Transmission: The processed signals, including AI-determined numerology, sub-band/bandwidth portion assignments, and RB allocations, are then transmitted over the channel. This includes the application of spectrum shaping filters to limit interference and ensure compliance with spectrum regulations. AI-Enhanced Receiver Chain The receiver chain in UEs would similarly be adapted to operate with dynamically assigned numerologies and to process signals based on AI-driven RB allocations. Dynamic Numerology Processing: The receiver is capable of adapting to different numerologies as signaled by the transmitter. This flexibility allows the UE to efficiently process signals regardless of the numerology used. Bandwidth Portion and Sub-band Processing: The receiver processes signals containing bandwidth portion or sub-band assignments, adapting its processing to the specific portions of the spectrum allocated to it. RB Allocation Processing: The receiver also processes signals indicating the RB allocation within the assigned bandwidth portions or sub-bands. This involves demapping and equalizing the received signals based on the AI-driven allocation patterns.

Implementation and Use Cases Machine Learning Models: The AI modules in both the transmitter and receiver chains can be implemented using machine learning models, such as deep neural networks (DNNs) for pattern recognition and reinforcement learning (RL) algorithms for decision-making under uncertainty. Real-time Adaptation: The system can adapt in real-time to changing network conditions, user mobility, and traffic demands, optimizing the use of spectrum and improving user experience. Use Cases: This AI-enhanced approach is particularly beneficial in scenarios with highly variable traffic patterns, such as in urban areas with dense user populations, or for applications requiring low latency and high reliability, such as vehicle-to-everything (V2X) communications and industrial IoT. By leveraging AI for dynamic numerology selection and RB allocation, the system can achieve greater spectral efficiency, better accommodate diverse user needs, and enhance overall network performance. This approach represents a significant evolution from the fixed numerology and static RB allocation methods, enabling more agile and intelligent use of wireless communication. In one aspect, a cellular system leverages artificial intelligence to enhance the process of obtaining a sector of sectors and transmitting a plurality of random beams to user equipment (UE) within the sector. These random beams are generated through spatial filtering of a random beam pattern. Implementations include: AI-Enhanced Sector Determination: AI algorithms can analyze historical data and real-time network conditions to dynamically determine the optimal sector or sectors for beamforming. This involves using machine learning models to predict user density, mobility patterns, and channel quality across different sectors. By doing so, the transceiver can adaptively select the most appropriate sector or sectors that require channel estimation, optimizing network resources and improving overall system efficiency.

Intelligent Beam Pattern Generation: The generation of random beams through spatial filtering can be optimized using AI. Machine learning algorithms can analyze channel conditions, including interference patterns, multipath effects, and UE distribution, to generate beam patterns that maximize coverage and signal quality. This could involve the use of deep learning models to iteratively adjust spatial filter coefficients based on feedback from the network and UEs, leading to more accurate and efficient beamforming.

Adaptive Pilot Subcarrier Allocation: AI can also be applied to optimize the use of pilot subcarriers for channel estimation. By analyzing the channel conditions and the requirements of different UEs. AI algorithms can dynamically allocate pilot subcarriers to different random beams. This ensures that the pilot signals are used efficiently, reducing interference and improving the accuracy of channel estimation. For instance, reinforcement learning can be used to learn the best allocation strategies over time, adapting to changes in network conditions and UE behavior.

Optimization of OFDM Symbol Aggregation: The aggregation of random beams in an orthogonal frequency-division multiplexing (OFDM) symbol can be optimized using AI to enhance spectral efficiency. Machine learning algorithms can determine the best way to aggregate beams within an OFDM symbol based on current network load. UE requirements, and channel conditions. This optimizing the power allocation and phase shifts for each beam maximize the signal-to-noise ratio (SNR) and reduce interference among the beams.

Real-time Sector and Beam Adjustment: AI can enable real-time adjustment of sectors and beam patterns based on continuous monitoring of network conditions and UE feedback. This involves using machine learning algorithms to process uplink sounding signals, out-of-band information, and other relevant data to make immediate adjustments to the sector definitions and beamforming strategies. This real-time adaptability ensures that the network can quickly respond to changes, maintaining optimal performance and user experience.

By integrating AI into the channel estimation process for massive MIMO systems, the system achieves more dynamic and efficient network operation. AI can help in making real-time decisions based on complex data analysis, leading to improved channel estimation accuracy: enhanced network capacity, and better overall performance of 5G and future wireless networks.

Next-generation wireless communication systems, such as 5G systems (5GS), are designed to include both a 5G core network and a 5G Radio Access Network (RAN), with the New Radio (NR)-RAN being a key component. The NR-RAN facilitates communication across one or more cellular networks. For instance, a wireless communication device, known as user equipment (UE), might connect to a first cell operated by a first base station (BS), such as a gNB, or it might connect to a second cell managed by a different base station.

Base stations play a crucial role in managing access to cells to accommodate multiple UEs. They achieve this by allocating various resources, including those in the time domain and frequency domain, to different UEs within a cell. This allocation ensures that multiple UEs can operate within the same cell without interference, thereby optimizing the network's efficiency and performance.

To enhance the reach and effectiveness of a wireless network, repeater devices are often deployed. These devices are strategically placed to relay communication traffic between two nodes, effectively extending the network's coverage area. Repeaters are particularly useful in areas where direct communication between the base station and UEs is hindered by physical obstructions or where the signal strength is insufficient for reliable communication. By boosting the signal and relaying communications, repeaters help ensure consistent and reliable network coverage across a broader area, thereby enhancing the overall performance and accessibility of the wireless network.

Artificial intelligence (AI) is used to optimize the relay of traffic between two wireless communication devices. This method is particularly relevant in the context of a wireless communication network where a base station controls the repeater device. Here's a detailed breakdown of the method and how AI can be applied. Receiving Control Signaling from the Base Station: The repeater device receives control signaling from the base station, which includes control information related to the traffic being relayed through the repeater device. AI can be used here to analyze historical control signaling data to predict future control signaling patterns, optimizing the repeater's readiness and response to incoming control information. Obtaining a Time Division Duplex (TDD) State: The TDD state, derived from the control information, dictates the timing for transmission and reception. AI algorithms can optimize the TDD state by analyzing traffic patterns and predicting optimal transmission and reception times, thereby reducing latency and improving throughput. Obtaining Fronthaul-Link and Access-Link TCI State Indexes: These indexes indicate the beamforming directions for the fronthaul-link (repeater to first device) and access-link (repeater to second device). AI can dynamically adjust beamforming directions based on real-time environmental changes and device movements, ensuring optimal signal strength and quality: Obtaining Time Domain Resource Allocation: This involves determining how resources are allocated over time for the relayed traffic. AI can optimize resource allocation by predicting traffic volumes and adjusting allocations in real-time to avoid congestion and ensure efficient use of available resources. Configuring the Relay Unit: Based on the obtained information, the relay unit of the repeater device is configured to communicate the traffic using the most appropriate parameters (TDD state. TCI state indexes, time domain resource allocation). AI can play a crucial role here by continuously learning from network conditions and making real-time adjustments to the configuration to maximize communication efficiency and reliability.

By applying AI at each step of this method, the repeater device can significantly improve its performance in relaying traffic between wireless communication devices. AI's ability to analyze vast amounts of data, learn from patterns, and make predictive adjustments allows for a more adaptive, efficient, and robust wireless communication network. This approach not only enhances the quality of service for end-users but also contributes to the overall optimization of network resources, leading to a more resilient and responsive wireless communication infrastructure.

In one embodiment, an AI-enhanced method for facilitating wireless communication via a repeater device, which is under the governance of a base station within a wireless network, is presented. This method involves the repeater device receiving control signals from the base station. These signals contain crucial control information pertinent to the data being relayed between two wireless communication devices. From this control information, the repeater device discerns the state of Time Division Duplex (TDD), extracts indices for both fronthaul-link and access-link Transmission Control Indicator (TCI) states, and ascertains the allocation of time domain resources. Subsequently, the repeater's relay unit is programmed to utilize one or more of these elements—the TDD state, fronthaul-link TCI state index, access-link TCI state index, or time domain resource allocation—to manage the flow of data between the two wireless communication devices.

In another embodiment, a wireless repeater device structured for communication within a wireless network managed by a base station is revealed. This device is equipped with a wireless transceiver, memory, and a processor that is in communication with both the transceiver and the memory. The processor and memory are jointly configured to perform several functions: they capture control signals from the base station that include control information related to the traffic between two wireless communication devices: they determine the TDD state from this information: they identify the TCI state indices for both the fronthaul-link and the access-link: they pinpoint the time domain resource allocation; and they set up the repeater's relay unit to transmit data between the two devices using at least one of the identified elements.

In a further embodiment, a method is disclosed for a base station to manage wireless communication through a repeater device within a wireless network. The base station's method includes deciding to route traffic between two wireless communication devices via the repeater, determining the associated TDD state, identifying the TCI state indices for both the fronthaul-link and the access-link, and ascertaining the time domain resource allocation linked to the traffic. The base station then sends control information, which encompasses at least one of these elements, to the repeater device via control signaling. This information is used to configure the repeater's relay unit to handle the communication of data between the two devices.

Lastly, another embodiment discloses a base station designed for wireless communication, which oversees a wireless repeater device within a wireless network. The base station includes a wireless transceiver, memory, and a processor that communicates with both the transceiver and the memory. The processor and memory are collectively configured to execute several tasks: they decide to channel traffic through the repeater device between two wireless communication devices; they determine the TDD state related to the traffic: they identify the TCI state indices for both the fronthaul-link and the access-link: they ascertain the time domain resource allocation; and they transmit control information to the repeater device. This control information, which includes at least one of the aforementioned elements, is sent via control signaling to program the repeater's relay unit to facilitate the exchange of data between the two devices.

Utilizing artificial intelligence (AI) to analyze control information and predict optimal communication parameters in a heterogeneous network involving 4G. 5G. WiFi, and unlicensed band transceivers involves several operations. AI systems begin by collecting vast amounts of data from various sources within the network, including control signals, traffic patterns, and device-specific information. This data is then preprocessed to remove noise and irrelevant information, normalize different scales, and convert it into a format suitable for machine learning models.

The AI system identifies and extracts features from the control information that are relevant to predicting communication parameters. These features may include signal strength, noise levels, traffic load, and user mobility patterns. Machine learning models that are trained on the extracted features. These models can include deep neural networks (DNNs), convolutional neural networks (CNNs), recurrent neural networks (RNNs), and reinforcement learning (RL) algorithms. Each model type has its strengths: for example, CNNs are adept at spatial feature recognition, while RNNs excel in temporal data analysis. The training process involves feeding historical and real-time data into the AI models to learn the underlying patterns and relationships. The models are then validated and tested against unseen data to ensure their accuracy and robustness. This process may involve techniques like cross-validation and hyperparameter tuning. Once trained, the AI models perform real-time inference to predict optimal communication parameters, such as the best frequency band for transmission, the ideal time for handovers between different RATs, and the most efficient resource allocation strategies. The AI system can dynamically adjust these parameters in response to changing network conditions. The AI system is integrated with network controllers, such as base station controllers and WiFi controllers, to implement the predicted communication parameters. This integration allows for seamless coordination between different RATs and supports intelligent traffic steering and handover decisions. Training AI models for heterogeneous networks requires a diverse set of high-quality data that reflects the complexity of the environment. This includes data from different RATs, under various network loads, and across a range of user behaviors. To address privacy concerns and data security, federated learning can be employed. In this approach. AI models are trained locally on devices or edge servers, and only model updates are shared with a central server for aggregation. This method ensures that sensitive user data does not leave the local device. In cases where real-world data is scarce or difficult to obtain. AI models can be trained using simulations and synthetic data. This approach allows for the generation of a wide range of scenarios and conditions that the model may encounter in a real network. AI models in wireless networks benefit from continuous learning, where they are regularly updated with new data to adapt to evolving network conditions and user behaviors. This ensures that the models remain accurate and effective over time. By leveraging these AI-driven processes, service providers can enhance the performance of heterogeneous networks, ensuring efficient and reliable communication across 4G. 5G. WiFi, and unlicensed bands. The AI system's ability to predict and dynamically adjust communication parameters in real-time is crucial for meeting the demands of modern wireless networks, characterized by a diverse array of devices and applications. A Base Station (BS) may transmit synchronization signals, including Primary Synchronization Signal (PSS) and Secondary Synchronization Signal (SSS), in the network to enable User Equipments (UEs) to synchronize with the BS, as well as System Information (SI) to facilitate initial network access. The BS may transmit the PSS, the SSS, and/or the Master Information Block (MIB) via Synchronization Signal Blocks (SSBs) over the Physical Broadcast Channel (PBCH) and may broadcast the Remaining Minimum System Information (RMSI) and/or Other System Information (OSI) over the Physical Downlink Shared Channel (PDSCH). A UE attempting to access a Radio Access Network (RAN) may perform an initial cell search by detecting a PSS from a BS, enabling the UE to synchronize to the period timing of the BS and indicating a physical layer identity value assigned to the cell. The UE may also receive an SSS from the BS that enables the UE to synchronize on the radio frame level with the cell and provides a cell identity value, which the UE may combine with the physical layer identity value to identify the cell. After receiving the PSS and SSS, the UE may receive the SI from the BS. The system information includes essential information for a UE to access the network such as downlink (DL) channel configuration information, uplink (UL) channel configuration information, access class information, and cell barring information, among other information. The MIB may include SI for initial network access and scheduling information for RMSI and/or OSI. After decoding the MIB, the UE may receive the RMSI and/or the OSI. The SI includes information that enables a UE to determine how to conduct an initial access to a RAN. For example. System Information Block 2 (SIB 2) includes random access configuration information, such as a Random Access Channel (RACH) configuration, that indicates the resources that the UE is to use to communicate with the RAN during initial access. The random access configuration information may indicate the resources allocated by the RAN for a Physical Random Access Channel (PRACH) procedure. The RACH configuration may identify monitoring occasions (MOs) that specify a set of symbols in a PRACH slot that are scheduled by a base station for the PRACH procedure. The RACH configuration may also indicate the size of a random access response window during which the UE is to monitor for a response to a PRACH preamble. The RACH configuration may further specify that the random access response window starts a certain number of sub-frames after the end of the PRACH preamble. After obtaining the MIB, the RMSI and/or the OSI, the UE may thus perform a random access procedure for initial access to the RAN.

In some aspects of the disclosure, the scheduling entity and/or scheduled entity may be configured for beamforming and/or multiple-input multiple-output (MIMO) technology. An example of a wireless communication system supporting beamforming and/or MIMO is provided. In a MIMO system, a transmitter includes multiple transmit antennas and a receiver includes multiple receive antennas. Thus, there are multiple signal paths from the transmit antennas to the receive antennas. Each of the transmitter and the receiver may be implemented within a scheduling entity, a scheduled entity, or any other suitable wireless communication device. The transmitter may correspond to any of the BSs or scheduling entities shown in the figures, and the receiver may correspond to any of the UEs or scheduled entities in the figures.

The use of multiple antenna technology enables the wireless communication system to exploit the spatial domain to support spatial multiplexing, beamforming, and transmit diversity: Spatial multiplexing may be used to transmit different streams of data simultaneously on the same time-frequency resource. The data streams may be transmitted to a single UE to increase the data rate or to multiple UEs to increase the overall system capacity, referred to as multi-user MIMO (MU-MIMO). Spatial multiplexing may be achieved by spatially precoding each data stream and then transmitting each spatially precoded stream through multiple transmit antennas on the downlink. The spatially precoded data streams arrive at the UE(s) with different spatial signatures, enabling each of the UE(s) to recover the data streams destined for that UE. On the uplink, each UE transmits a spatially precoded data stream, enabling the base station to identify the source of each spatially precoded data stream. The number of data streams or layers corresponds to the rank of the transmission. The rank of the wireless communication system is limited by the number of transmit or receive antennas, whichever is lower. In addition, the channel conditions at the UE, as well as other considerations, such as the available resources at the base station, may also affect the transmission rank. For example, the rank assigned to a particular UE on the downlink may be determined based on the rank indicator (RI) transmitted from the UE to the base station. The RI may be determined based on the antenna configuration and a measured signal-to-interference-and-noise ratio (SINR) on each of the receive antennas. The RI may indicate the number of layers that may be supported under the current channel conditions. The base station may use the RI, along with resource information, to assign a transmission rank to the UE. In one example, a rank-2 spatial multiplexing transmission on a 2×2 MIMO antenna configuration will transmit one data stream from each transmit antenna. Each data stream reaches each receive antenna along a different signal path. The receiver may then reconstruct the data streams using the received signals from each receive antenna.

Figure 4A:
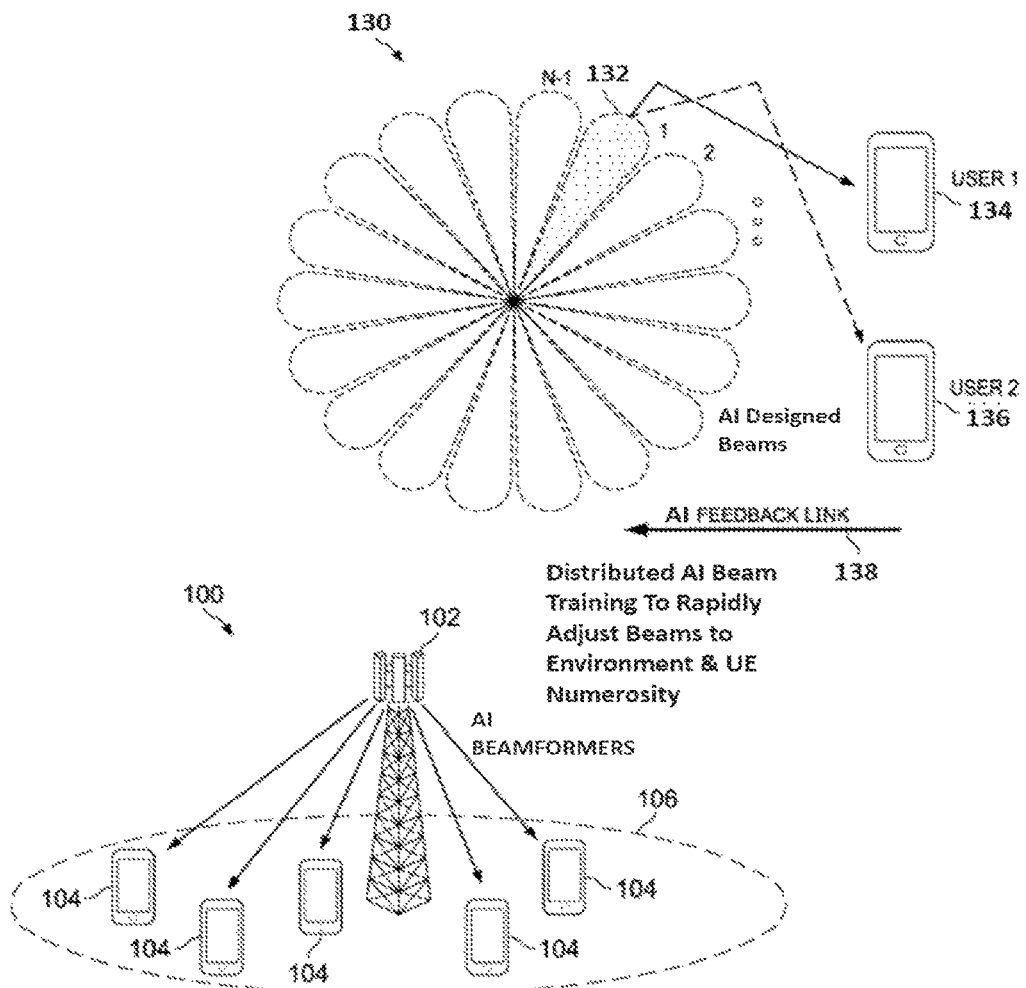

FIG. 4A illustrates a communication system, designated as system 100. The system includes a massive MIMO base station with a coverage area. The system also includes user equipment (UEs). The base station supports sectored random beams and may switch between using sectored random beams and conventional training. The base station broadcasts a channel to indicate support for sectored random beams. Each UE provides feedback to the base station indicating whether it supports sectored random beams. If the UE supports sectored random beams, the base station transmits sectored random beams to the UE. The base station generates sectored random beams by spatial filtering of a random beam pattern. Spatial filtering the random beam pattern effectively reduces the weight of particular random beams that do not point into the identified sector to zero such that only beams that contribute to the beam pattern in the sector have a non-zero weighting coefficient. The spatial filter coefficients are provided by the sector beam pattern. The base station may support sector selection based on out-of-band information. For example, the out-of-band information may be an uplink sounding signal received from the UE. The base station can use this uplink sounding signal from the UE to determine the location from which the UE transmitted the sounding signal. The base station can then use the determined location of the UE to form a sector for the sectored random beams. The system encompasses a base station, labeled 102, which oversees a specific coverage area, identified as 106. Within this area, multiple user equipment (UEs), collectively referred to as 104, operate. The base station 102 is an integral part of a massive MIMO system and can take various forms, including a base station transceiver (BST), an enhanced node B (eNB), a next-generation node B (gNB), a femtocell, among other wirelessly enabled transceiver devices. The UEs 104 can be any device capable of establishing a wireless connection with the base station 102, such as mobile phones, smartphones, laptops, and tablets. The base station 102 connects to a backhaul network (not explicitly shown) facilitating communication between the UEs and other network devices. In some configurations, system 100 may also incorporate additional wireless devices like relays and femtocells. A specific UE, referred to as UE2 104, conducts uplink (UL) channel sounding. Based on FDD reciprocity, the base station 102 creates a sector for sectored random beam-based training, covering a location of a UE 104 but not encompassing the entire coverage area 106.

Figure 5:
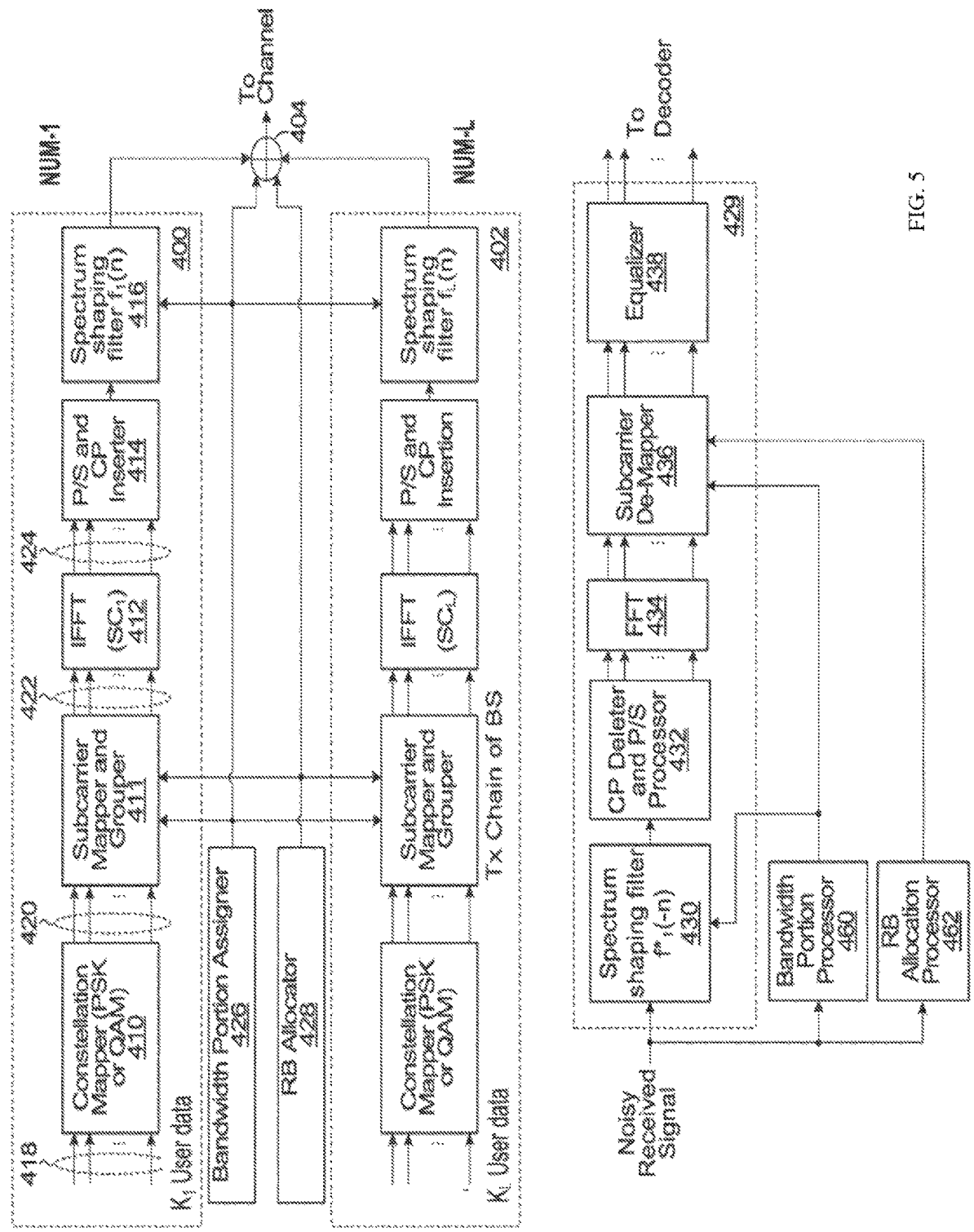
FIG. 5 is a schematic illustration of radio circuits for reducing signaling overhead in the wireless network.

Turning now to FIG. 5, the air interface in the RAN may employ various multiplexing and multiple access algorithms to facilitate simultaneous communication of different devices. For instance, 5G NR specifications provide multiple access for uplink transmissions from UEs to a base station and for multiplexing downlink transmissions from a base station to one or more UEs, using orthogonal frequency division multiplexing (OFDM) with a cyclic prefix (CP). Additionally, for uplink transmissions. 5G NR supports discrete Fourier transform-spread-OFDM (DFT-s-OFDM) with a CP. However, multiplexing and multiple access are not confined to these schemes and may include other methods such as time division multiple access (TDMA), code division multiple access (CDMA), frequency division multiple access (FDMA), sparse code multiple access (SCMA), resource spread multiple access (RSMA), and other suitable schemes. Downlink transmissions from the base station to UEs may also be multiplexed using various techniques like time division multiplexing (TDM), code division multiplexing (CDM), frequency division multiplexing (FDM), orthogonal frequency division multiplexing (OFDM), sparse code multiplexing (SCM), or other appropriate methods.

Furthermore, the air interface in the RAN may use duplexing algorithms. Duplexing allows for two-way communication between endpoints, with full duplex enabling simultaneous communication and half duplex allowing only one endpoint to send information at a time. In wireless links, full duplex channels typically rely on physical separation of transmitters and receivers, along with suitable interference cancellation technologies. Full duplex emulation in wireless links is often achieved using frequency division duplex (FDD) or time division duplex (TDD), where transmissions in different directions are separated by different carrier frequencies or by time division multiplexing, respectively.

In the RAN, the capability for a UE to maintain communication while moving, regardless of its location, is known as mobility. The setup, maintenance, and release of physical channels between the UE and the RAN are generally managed by an access and mobility management function (AMF), which may include a security context management function (SCMF) for control and user plane security and a security anchor function (SEAF) for authentication.

The RAN may support both downlink-based and uplink-based mobility to facilitate handovers, which involve transferring a UE's connection from one radio channel to another. In a network with downlink-based mobility, a UE may monitor signal parameters from its serving cell and neighboring cells, maintaining communication with one or more neighboring cells as needed. If the UE moves to a different cell or if the signal quality from a neighboring cell surpasses that of the serving cell for a certain period, the UE may initiate a handover to the neighboring cell. For example, a UE, which could be a vehicle or any suitable form of UE, may move from the area of its serving cell to that of a neighboring cell. When the signal strength or quality from the neighboring cell becomes superior for a specified duration, the UE may send a report to its serving base station, which may then command a handover to the new cell.

Beamforming is a signal processing technique that may be used at the transmitter or receiver to shape or steer an antenna beam along a spatial path between the transmitter and the receiver. Beamforming may be achieved by combining the signals communicated via antennas such that some of the signals experience constructive interference while others experience destructive interference. To create the desired constructive/destructive interference, the transmitter or receiver may apply amplitude and/or phase offsets to signals transmitted or received from each of the antennas associated with the transmitter or receiver. In 5G New Radio (NR) systems, particularly for above 6 GHz or mm Wave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information may be transmitted in a beam-sweeping manner to enable all scheduled entities (UEs) in the coverage area of a transmission and reception point (TRP) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (cMBB) gNBs for sub-6 GHz systems.

A base station may generally be capable of communicating with UEs using transmit beams of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station. In some examples, to select one or more downlink transmit beams and one or more downlink receive beams for communication with a UE, the base station may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a beam measurement report to the base station indicating the RSRP of each of the measured downlink transmit beams. The base station may then select one or more serving downlink beams for communication with the UE based on the beam measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

Similarly: uplink beams may be selected by measuring the RSRP of received uplink reference signals or downlink reference signals during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource when implementing uplink beam management or a selected SSB/CSI-RS resource when implementing downlink beam management. For example, the selected SSB/CSI-RS resource can have a spatial relation to the selected uplink transmit beam. The resulting selected uplink transmit beam and uplink receive beam may form an uplink beam pair link. Reciprocal beams are within the scope of the disclosure.

The integration of AI into beamforming processes addresses several challenges and limitations associated with traditional beamforming techniques, leading to improved spectral efficiency, reduced complexity, and enhanced system capacity. Here's how AI contributes to improving beamforming performance: Adaptive Beamforming: AI algorithms, especially machine learning (ML) and deep learning (DL), are adept at adapting beamforming strategies based on the dynamic wireless environment. By learning from historical data and real-time network conditions. AI can optimize the beam patterns and power allocation to maximize signal quality at the receiver end while minimizing interference to other users. Contextual Beamforming: Leveraging location information and other contextual data. AI enables contextual beamforming, which significantly improves the signal-to-interference-plus-noise ratio (SINR). This approach uses AI to analyze the user's location, movement patterns, and environmental characteristics to predict the optimal beam direction and strength, thereby enhancing communication reliability and efficiency. Hybrid Beamforming Design: AI aids in the design of hybrid beamforming architectures, especially for massive MIMO (mMIMO) systems where the complexity of optimal codebook design and CSI measurement overhead increases with the number of antenna elements. AI algorithms can efficiently manage the beam selection process by analyzing RF and non-RF modalities, reducing the need for exhaustive searches and simplifying the beamforming process. Beam Management: AI techniques are instrumental in beam management, particularly in millimeter-wave (mm Wave) communications where beam alignment is critical due to the high directionality of signals. AI can predict beam misalignments and automatically adjust beams in real-time, ensuring continuous connectivity and optimal performance even in high-mobility scenarios. Reducing Training Overhead: Traditional beamforming methods rely heavily on channel state information (CSI), which requires extensive training and feedback, introducing latency and overhead. AI-based beamforming can reduce this overhead by predicting channel conditions and beamforming vectors directly from past observations and limited feedback, thereby improving system efficiency. Enhancing Security and Robustness: AI algorithms can also enhance the security and robustness of beamforming techniques against adversarial attacks and interference. By learning to identify patterns of attacks or interference. AI can adjust beamforming strategies to mitigate their impact, ensuring reliable and secure communication. Multimodal Beamforming: AI enables multimodal beamforming by integrating information from various modalities, such as RF signals, images, and sensor data. This approach allows for more accurate beam alignment and selection by considering additional context that RF signals alone may not provide. Deep learning-based fusion techniques are crucial for processing and combining these diverse data types to inform beamforming decisions.

In one exemplary AI Assisted Beamforming Process. Data Collection: AI systems start by collecting a wide range of data, including Received Signal Strength Indicator (RSSI) measurements, channel state information (CSI), user location, device movement patterns, and environmental characteristics. Data Preprocessing: The collected data is preprocessed to remove noise and irrelevant information, normalize data from different scales, and convert it into a format suitable for ML models. Feature Extraction: AI algorithms identify and extract relevant features from the data that are critical for predicting optimal beamforming parameters. These features may include signal strength, noise levels, traffic load, and user mobility patterns. Model Training: Machine learning models, such as deep neural networks (DNNs), convolutional neural networks (CNNs), and reinforcement learning (RL) algorithms, are trained on the extracted features. The models learn the underlying patterns and relationships in the data to predict the best beamforming strategies. Model Validation: The trained models are validated and tested against unseen data to ensure their accuracy and robustness. Techniques like cross-validation and hyperparameter tuning are used during this phase. Real-Time Inference: Once trained and validated, the AI models perform real-time inference to predict the optimal beamforming parameters, such as the best frequency band for transmission, the ideal beam direction, and the most efficient resource allocation strategies. Beamforming Optimization: AI algorithms dynamically adjust beam patterns and power allocation based on real-time network conditions to maximize signal quality at the receiver end while minimizing interference to other users. Feedback Loop: The system incorporates a feedback loop where the performance of the beamforming strategy is monitored, and the data collected from this monitoring is used to further refine the AI models, ensuring continuous improvement and adaptation to changing conditions. In summary, AI significantly enhances beamforming performance by enabling adaptive, contextual, and multimodal beamforming strategies, reducing training overhead, and improving the system's security and robustness.

A system for AI-assisted beamforming in a wireless communication network:
  A data collection module configured to gather RSSI, CSI, and synchronization signals from UEs and BSs within a RAN:
  A data processing module equipped with an AI algorithm to preprocess and extract features relevant to beamforming from the collected data:
  A machine learning module containing one or more trained models that predict optimal beamforming parameters based on the extracted features:
  A validation module to test the accuracy of the machine learning model's predictions; and
  A beamforming control module that dynamically adjusts communication beams in the RAN based on the machine learning model's predictions to optimize network performance.

A method for optimizing beamforming in a wireless communication network:
  collecting data from a plurality of user equipments (UEs) and base stations (BSs) within a Radio Access Network (RAN), the data including at least Received Signal Strength Indicator (RSSI), channel state information (CSI), and synchronization signals:
  processing the collected data using an artificial intelligence (AI) algorithm to extract relevant features for beamforming:
  training a machine learning model based on the extracted features to predict optimal beamforming parameters for multiple-input multiple-output (MIMO) communication:
  validating the trained machine learning model using a set of validation data to ensure accuracy of the beamforming parameter predictions; and
  Implementing the predicted beamforming parameters in real-time to direct communication beams between the BSs and UEs, thereby enhancing signal quality and network efficiency.

The method for optimizing beamforming in a wireless communication network using AI techniques involves several key operations:

The system gathers a comprehensive set of data from various UEs and BSs within the RAN. This data includes RSSI, which measures the power level that a receiver senses from the signal being received. CSI, which provides detailed information about the channel properties between the transmitter and receiver, and synchronization signals, which are used by UEs to align with the BS's timing and frequency. Once the data is collected, it is processed using AI algorithms. This step involves preprocessing to clean and normalize the data, followed by feature extraction where the AI algorithm identifies patterns and characteristics within the data that are relevant to beamforming. This could include the directionality of signals, the variability of the channel, and the mobility patterns of the UEs.

With the relevant features extracted, a machine learning model is trained to predict optimal beamforming parameters. This model could be a neural network, a support vector machine, or any other suitable machine learning algorithm. The model learns from the historical and real-time data how to adjust the beamforming parameters to maximize the efficiency of MIMO communication.

The trained model is then validated using a separate set of data that was not used during the training phase. This validation process is crucial to ensure that the model's predictions are accurate and that it generalizes well to new data. The validation step helps to confirm that the model can reliably predict beamforming parameters that enhance network performance.

Finally: the validated model is used in real-time within the RAN to adjust the beamforming parameters. This involves dynamically directing communication beams between BSs and UEs based on the model's predictions. The AI system continuously processes incoming data and updates the beamforming parameters to adapt to changing network conditions. UE mobility, and channel characteristics, thereby optimizing signal quality and network efficiency.

A method for enhancing MIMO communication in a wireless network:
  Utilizing an AI-based system to analyze synchronization signals transmitted by BSs, including Primary Synchronization Signal (PSS) and Secondary Synchronization Signal (SSS), to facilitate UE synchronization:
  Applying spatial multiplexing techniques informed by AI predictions to transmit different data streams simultaneously on the same time-frequency resource to one or more UEs:
  Determining the rank of transmission and the number of data streams to be assigned to a particular UE based on a rank indicator (RI) transmitted from the UE, as analyzed by the AI-based system; and
  Configuring transmit and receive antennas for beamforming based on AI-optimized amplitude and phase offsets to shape or steer antenna beams along a spatial path between the transmitter and receiver.

Training a machine learning model to predict optimal beamforming parameters for MIMO communication involves several steps that leverage the capabilities of AI to analyze complex data and extract meaningful insights for beamforming optimization. Before training can begin, relevant features must be extracted from the collected data. This data can include RSSI. CSI, and synchronization signals from UEs and BSs within the RAN. The AI algorithm processes this data to identify features that significantly impact beamforming performance, such as signal strength, quality metrics like SINR, and the directionality of received signals. The extracted features form a dataset that will be used to train the machine learning model. This dataset is typically divided into training, validation, and test sets. The training set is used to teach the model, the validation set is used to tune hyperparameters and prevent overfitting, and the test set is used to evaluate the model's performance on unseen data. For MIMO systems, models that can handle high-dimensional data and complex relationships, such as deep neural networks (DNNs), convolutional neural networks (CNNs), or recurrent neural networks (RNNs), are often chosen. The model architecture is defined, including the number of layers, the type of layers (fully connected, convolutional, recurrent, etc.), activation functions, and output layer design. The model is trained using the training dataset. During training, the model learns to map the input features to the desired output, which are the optimal beamforming parameters. The learning process involves adjusting the model's internal parameters (weights and biases) to minimize a loss function, which quantifies the difference between the model's predictions and the actual beamforming parameters. Hyperparameters, such as the learning rate, batch size, and regularization terms, are tuned to optimize the model's learning process. Techniques like grid search, random search, or Bayesian optimization can be used to find the best set of hyperparameters. Throughout the training process, the model's performance is periodically evaluated on the validation set. This helps monitor for overfitting, where the model performs well on the training data but poorly on unseen data. If overfitting is detected, adjustments are made, such as early stopping, adding dropout layers, or increasing regularization. After training, the model's performance is assessed using the test set. Metrics such as accuracy, mean squared error, or beamforming gain can be used to evaluate how well the model predicts the optimal beamforming parameters. Once the model is trained and validated, it is deployed in the RAN to predict beamforming parameters in real-time. The model receives live data from the network, processes it through the trained model to predict beamforming parameters, and dynamically adjusts the beams to optimize MIMO communication. The deployed model is continuously monitored for performance. Feedback from the network, such as changes in channel conditions or UE mobility, is used to retrain and update the model, ensuring that it adapts to the evolving communication environment. This training process enables the AI-driven system to intelligently adjust beamforming parameters, improving signal quality, reducing interference, and enhancing the overall capacity and efficiency of MIMO communication systems.

A wireless communication device configured for AI-assisted beamforming:
   A plurality of transmit and receive antennas designed to support beamforming and spatial multiplexing:
   An AI processing unit configured to receive and analyze data related to beamforming, including but not limited to RSSI. CSI, and synchronization signals:
   A beamforming optimization module that utilizes predictions from the AI processing unit to adjust beam widths and directions for communication with UEs, wherein the adjustments are based on the mobility and stationarity of the UEs; and
   A feedback mechanism that provides performance data to the AI processing unit to continuously refine the beamforming predictions and adjustments.

A system for AI-assisted beamforming in a wireless communication network comprises:
   A data collection module that is responsible for gathering RSSI, CSI, and synchronization signals from UEs and BSs within a RAN.
   A data processing module equipped with an AI algorithm that preprocesses the collected data and extracts features relevant to beamforming.
   A machine learning module that contains one or more trained models. These models predict optimal beamforming parameters based on the features extracted from the data.
   A validation module that tests the accuracy of the machine learning model's predictions to ensure the reliability of the beamforming parameters.
   A beamforming control module that uses the machine learning model's predictions to dynamically adjust communication beams within the RAN, optimizing network performance.

A method for managing beamforming in a 5G New Radio (NR) system, comprising:
   broadcasting synchronization signals and system information from a BS to UEs using beam-sweeping techniques, wherein the beam-sweeping is optimized by an AI algorithm:
   selecting downlink and uplink transmit and receive beams for communication with UEs based on reference signal received power (RSRP) measurements, as processed by an AI system:
   implementing beamforming for uplink and downlink channels, including physical uplink control channel (PUCCH) and physical downlink shared channel (PDSCH), based on AI-determined beamforming parameters; and
   adjusting the beamforming parameters in response to changes in channel conditions and UE mobility, as determined by continuous AI analysis, to maintain optimal communication quality and network throughput.

AI optimization of broadcasting synchronization signals and system information from a base station (BS) to user equipments (UEs) using beam-sweeping techniques involves several AI-driven operations to enhance the efficiency and effectiveness of the beamforming process including Optimizing Beam-Sweeping Techniques where the AI algorithms analyze historical and real-time data to determine the most effective beam-sweeping patterns for broadcasting synchronization signals such as Primary Synchronization Signal (PSS) and Secondary Synchronization Signal (SSS), as well as system information (SI) including Master Information Block (MIB), Remaining Minimum System Information (RMSI), and Other System Information (OSI). The AI system can predict the best times and angles for beam-sweeping to ensure maximum coverage and signal reception by UEs, taking into account factors such as UE density, geographic distribution, and typical mobility patterns. Next the process selects Downlink and Uplink Transmit and Receive Beams, where the AI system processes RSRP measurements to select the most appropriate downlink and uplink transmit and receive beams for communication with UEs. By analyzing the RSRP data, the AI can identify which beams provide the strongest signal to the UEs and adjust the beamforming parameters to use these beams for communication, thereby improving the signal quality and reducing interference. The AI-determined beamforming parameters are used to configure the beamforming for both uplink channels, such as the Physical Uplink Control Channel (PUCCH), and downlink channels, such as the Physical Downlink Shared Channel (PDSCH). The AI system ensures that the beamforming parameters are optimized for the current network conditions, which can include the modulation and coding scheme (MCS), the number of resource blocks (RBs) allocated, and the specific requirements of the traffic being carried on these channels. The AI system continuously analyzes the channel conditions and UE mobility to detect any changes that may affect communication quality. When changes are detected, such as a UE moving out of a beam's coverage or variations in channel quality due to environmental factors, the AI system dynamically adjusts the beamforming parameters to maintain optimal communication quality. These adjustments can include changing the beam direction, width, and power, as well as switching between different beams or beam sets to ensure continuous and reliable connectivity for the UEs. By leveraging AI for these operations, the wireless communication network can achieve a more responsive and adaptive beamforming strategy. This results in improved network throughput, enhanced user experience, and more efficient utilization of the radio spectrum. The AI-driven process not only provides real-time optimization but also enables the network to learn and improve over time, leading to increasingly sophisticated beamforming strategies that can anticipate and react to the evolving demands of the network and its user.

A method for optimizing beamforming in a wireless communication network includes the following steps:

collecting data from a variety of user equipment (UE) and base stations (BS) within a Radio Access Network (RAN). This data encompasses Received Signal Strength Indicator (RSSI), channel state information (CSI), and synchronization signals such as Primary Synchronization Signal (PSS) and Secondary Synchronization Signal (SSS).

processing the collected data with an artificial intelligence (AI) algorithm to identify features that are critical for beamforming. This involves preprocessing the data to remove noise and standardize formats, followed by feature extraction to identify patterns and characteristics relevant to beamforming.

training a machine learning model using the identified features to predict optimal beamforming parameters. These parameters are essential for enhancing multiple-input multiple-output (MIMO) communication by determining the best beam directions and strengths for data transmission.

validating the trained machine learning model with a separate set of validation data to ensure the model's predictions are accurate and reliable for beamforming parameter determination.

implementing the predicted beamforming parameters in real-time within the RAN. This step involves dynamically adjusting the communication beams between BSs and UEs based on the machine learning model's predictions, thereby improving signal quality and overall network performance.

The exemplary pseudocode handles the collection and processing of data, training of a machine learning model for predicting optimal beamforming parameters, and the dynamic adjustment of beamforming based on channel conditions and UE mobility:

AI can be used for analyzing synchronization signals, applying spatial multiplexing techniques, determining transmission ranks, and configuring beamforming in a wireless communication network. It assumes the existence of functions for collecting synchronization signals, receiving RI from UEs, extracting features from signals, determining spatial parameters, applying spatial multiplexing, configuring antennas, and implementing the network configuration.

A wireless communication device configured for AI-assisted beamforming includes:

a set of transmit and receive antennas designed to support beamforming and spatial multiplexing.

an AI processing unit that receives and analyzes data related to beamforming, including RSSI, CSI, and synchronization signals.

a beamforming optimization module that uses predictions from the AI processing unit to adjust beam widths and directions for communication with UEs. These adjustments are based on the mobility and stationarity of the UEs.

A feedback mechanism that provides performance data to the AI processing unit. This mechanism allows for continuous refinement of the beamforming predictions and adjustments.

A method for managing beamforming in a 5G New Radio (NR) system includes:

broadcasting synchronization signals and system information from a BS to UEs using beam-sweeping techniques optimized by an AI algorithm to ensure efficient coverage.

selecting downlink and uplink transmit and receive beams for communication with UEs. This selection is based on RSRP measurements processed by an AI system.

implementing beamforming for uplink and downlink channels, including PUCCH and PDSCH. This implementation is based on beamforming parameters determined by AI.

adjusting the beamforming parameters in response to changes in channel conditions and UE mobility. These adjustments are determined by continuous AI analysis to maintain optimal communication quality and network throughput.

The advantages of AI-assisted beamforming may include: Adaptive Optimization: AI algorithms can dynamically adjust beam patterns and power allocation based on real-time network conditions, user equipment (UE) locations, and environmental characteristics, leading to improved signal quality and network efficiency. Enhanced Beam Selection: AI systems can process reference signal received power (RSRP) measurements to select the most appropriate transmit and receive beams for communication with UEs, ensuring stronger signal reception and reduced interference. Efficient Beam-Sweeping: AI can optimize beam-sweeping techniques for broadcasting synchronization signals and system information, ensuring efficient coverage and facilitating initial network access for UEs. Improved MIMO Communication: AI can determine the rank of transmission and the number of data streams to be assigned to a particular UE based on rank indicators (RI), enhancing the capabilities of multiple-input multiple-output (MIMO) systems. Real-Time System Adaptation: AI systems can continuously analyze channel conditions and UE mobility, adjusting beamforming parameters in real-time to maintain optimal communication quality and network throughput. Reduced Latency: By leveraging location information and AI, contextual beamforming techniques can expedite beamforming processes, reducing unwanted latency and improving the signal-to-interference-plus-noise ratio (SINR). Complexity Management: AI can handle the increased complexity of optimal codebook design and CSI measurement overhead in massive MIMO systems, facilitating beamforming beyond traditional CSI-based methods. Resource Efficiency: AI techniques can efficiently solve non-linear problems by automatically and efficiently extracting patterns within communication channels, optimizing network resources beyond human-based approaches. Robustness Against Variability: AI algorithms can adapt to different scenarios, such as pedestrian versus high-speed mobility or indoor versus outdoor environments, by learning from a diverse range of training data. These advantages demonstrate that AI-assisted beamforming is a promising approach for enhancing the performance and efficiency of modern wireless communication systems, including 5G and future 6G/7G networks. For example, the present technologies can be utilized in 6G: Advanced Beamforming: The described AI-driven beamforming techniques, including the use of beam reference signals, beam pair links (BPLs), and beam quality measurements (e.g., RSRP, SINR, RSRQ), can be further enhanced for 6G. These techniques will be crucial in 6G due to the expected use of higher frequency bands, including terahertz (THz) frequencies, which require precise beam alignment due to their highly directional nature. Beam Management: The process of selecting optimal beams for communication based on beam measurements reported by UEs can be adapted for 6G. As 6G is anticipated to support even denser networks with more connected devices, efficient beam management will be essential to ensure high-quality communication and to manage the increased complexity of the radio environment. Repeater Devices: The use of smart repeater devices that can operate as Layer-1 or Layer-2 relays will be important in 6G to extend coverage, especially in mm Wave and sub-THz frequency bands where signal propagation is limited by physical obstructions. These repeaters can be controlled remotely by base stations to provide enhanced coverage and capacity in areas that are otherwise challenging to reach. MIMO Enhancements: The methods for determining the rank of transmission and the number of data streams for MIMO communication, as well as configuring transmit and receive antennas for beamforming, will be vital for 6G. With the expected increase in the number of antenna elements and the complexity of MIMO systems in 6G. AI-driven optimization will be key to managing these systems efficiently. AI-Driven Optimization: The AI algorithms that optimize beam-sweeping techniques and process RSRP measurements for beam selection can be further developed for 6G. AI will play a significant role in real-time network optimization, adapting to the dynamic conditions of 6G networks, and providing personalized communication experiences. Network Slicing and QoS: The control plane protocol stack and the user plane protocol stack, as described, can be adapted for network slicing in 6G, which is expected to be a core feature. Network slices can be optimized for different service requirements, and AI can be used to manage these slices dynamically: ensuring the Quality of Service (QOS) for diverse applications. Integrated Access and Backhaul (IAB): The described technologies can support the development of IAB nodes in 6G, which will be crucial for backhauling traffic in dense urban environments or areas lacking fiber connectivity: AI can optimize the use of wireless backhaul links, improving the overall efficiency of the network. Energy Efficiency: As 6G networks will be designed with a focus on sustainability, the described beamforming and repeater device technologies can be optimized by AI to reduce energy consumption. AI can ensure that beams are only activated when needed and that repeater devices operate in the most energy-efficient manner. The technologies described herein provide a foundation for the advanced features expected in 6G networks. By leveraging AI for beamforming optimization, beam management, and the intelligent use of repeater devices. 6G networks can achieve the high data rates, low latency; and massive connectivity that will be required to support future wireless communication needs.

Referring now to FIGS. 6A-6F, the system is designed for beam-based training and compressive channel estimation within a massive MIMO cellular framework. The massive MIMO base station 102 communicates with several UEs. 134 and 136. Various beams, numbered 132 (from 1 to N−1), are sequentially trained. The base station transmits training signals across different spatial beams to the UEs 134 and 136, which then measure the signal power or SINR on each beam and report their preferred beams back to the base station. Utilizing this information about preferred beams, the base station optimizes data transmission to the UEs 134 and 136. FIG. 4B shows an exemplary method implemented in a massive MIMO transceiver for channel estimation includes the following operations: Identifying a specific sector from multiple sectors, where the identified sector covers a subset of the transceiver's total coverage area. Transmitting a set of random beams towards user equipment (UE) located within the identified sector, where the random beams are generated through spatial filtering of a random beam pattern, enhanced by AI algorithms for optimized beam pattern generation. Generation of Random Beams Using AI-Optimized Spatial Filter Coefficients: the AI generation of random beams based on spatial filter coefficients that are optimized using AI techniques to improve the efficiency and accuracy of beam generation. AI-Based Pilot Subcarrier Allocation for Random Beams-allocate different random beams to distinct pilot subcarriers, ensuring that each random beam is uniquely associated with a specific pilot subcarrier, thereby enhancing the multiplexing capabilities and reducing interference. Aggregation of Random Beams in OFDM Symbols-AI algorithms aggregate the random beams into a single orthogonal frequency-division multiplexing (OFDM) symbol, optimizing the spectral efficiency and reducing the overhead associated with transmitting multiple beams separately. AI-Controlled Spatial Spectrum Utilization for Random Beams-AI techniques determine the portion of the spatial spectrum that the random beams should occupy, maximizing coverage and minimizing interference within the identified sector. Sector Formation Based on AI-Analyzed FDD Reciprocity-sectors are formed and adjusted based on frequency division duplex (FDD) reciprocity: analyzed through AI algorithms to enhance sector definition and improve system performance. AI-Driven Sector Determination via Uplink Sounding Signals-AI algorithms analyze uplink sounding signals from the UE to dynamically determine the most appropriate sectors for beam transmission, enhancing the adaptability of the system to changing conditions. Sector Determination Using AI to Analyze Out-of-Band Information-AI algorithms process out-of-band information to assist in the determination of sectors, enabling more accurate and efficient sector selection based on external data sources.

An example operation of the compressive channel estimation using sectored random beams is discussed next. The example involves the UE estimating a sparsified downlink channel based on a measurement matrix derived from training, a dictionary, preprocessing, and a preprocessing matrix. The training is performed using random sectored beams, and the preprocessing is conducted according to UE observations and the preprocessing matrix. The preprocessing matrix may be computed at the UE, known by the UE from storage, or broadcast from the base station. It is computed from the singular-value decomposition (SVD) of a certain product of matrices. A combined matrix must be known or computed, where the preprocessing matrix, the transmitted training signal, the dictionary used in channel estimation, the received training signal, the subcarrier index, and the to-be-estimated sparse channel are all factors. Preprocessing changes the sparse problem solved to a minimization problem subject to a certain constraint The method begins with the UE receiving a training signal from the base station, which includes sectored random beams, beam formers, and a training sequence. Data captured includes information about the UE locations, signal quality, interference patterns, and other relevant metrics. AI Model Training: Using the collected data, an AI model is trained to recognize patterns and predict the optimal spatial filter coefficients that would result in the most effective beamforming patterns for the current network conditions. Machine learning techniques such as deep learning or reinforcement learning can be used for this purpose. Spatial Filtering: The trained AI model is then used to generate a set of spatial filter coefficients. These coefficients are applied to the antenna array to create random beam patterns. The spatial filtering process involves adjusting the phase and amplitude of the signals emitted by each antenna element to form the desired beam shape. Beam Weighting: The AI model ensures that the beams are weighted such that those not contributing to the desired coverage area (i.e., not pointing into the identified sector) are assigned a weight of zero. This means that only beams with a non-zero weighting coefficient will be transmitted, ensuring that the energy is focused where it is needed. Beam Pattern Optimization: The AI continuously optimizes the beam patterns based on real-time feedback. As the environment changes, the AI model can adjust the spatial filter coefficients to adapt the beam shapes, maintaining optimal performance. Sector-Specific Beamforming: The AI-optimized beams are used to perform sectored beamforming, where each beam is directed towards a specific UE or group of UEs within the identified sector. This approach allows for efficient use of the spectrum and reduces interference among UEs. Feedback Loop: The system includes a feedback loop where the UEs report back on the quality of the received signal. This information is fed into the AI model to further refine the spatial filter coefficients and improve the beamforming patterns over time. The UE then obtains a measurement matrix derived from the training signal and a preprocessing matrix. The preprocessing matrix may be computed at the UE, known by the UE from storage, or broadcast from the base station. It is computed from the singular-value decomposition (SVD) of a certain product of matrices. Preprocessing changes the sparse problem solved to a minimization problem subject to a certain constraint. The term is obtained from processing of measurements, and the combined matrix is essential for the process. The UE estimates a sparsified downlink channel according to the preprocessing matrix, the measurement matrix, and observations, which include the received training signal. Using compressive sensing, the UE can estimate the channel given the received training signal, the preprocessing matrix, and the measurement matrix.

Identifying a Specific Sector from Multiple Sectors can include the following: Data Collection: Collect real-time data on signal strength, user distribution, and other relevant metrics across the coverage area of the transceiver. Sector Identification Algorithm: Implement an AI algorithm, such as a clustering algorithm, to analyze the collected data and identify distinct sectors within the coverage area. The algorithm would group UEs based on signal similarity: user density, and other factors to define sectors. Sector Selection: Select a specific sector for channel estimation based on criteria such as user demand, network load, or signal quality. Transmitting Random Beams within the Identified Sector can include the following: Beam Pattern Generation: Develop an AI model that uses spatial filtering techniques to create random beam patterns. This model could use neural networks or other machine learning techniques to optimize beam patterns based on historical and real-time channel data. Spatial Filter Coefficients Optimization: Use AI to determine the optimal spatial filter coefficients that will generate the most effective beam patterns for the identified sector. Beam Transmission: Implement a control system within the transceiver to transmit the AI-generated random beams towards UEs located within the identified sector. AI-Based Pilot Subcarrier Allocation for Random Beams can include the following: Subcarrier Allocation Algorithm: Design an AI algorithm to allocate pilot subcarriers to the random beams. This algorithm would ensure that each random beam is uniquely associated with a specific pilot subcarrier to minimize interference. Multiplexing Optimization: Use the AI algorithm to enhance the multiplexing capabilities of the system by efficiently allocating subcarriers based on channel conditions and UE requirements. Aggregation of Random Beams in OFDM Symbols can include the following: OFDM Symbol Aggregation: Develop an AI algorithm to aggregate the random beams into a single OFDM symbol. This algorithm would optimize the use of the frequency spectrum and reduce transmission overhead. Spectral Efficiency Optimization: Use AI to dynamically adjust the aggregation process to maximize spectral efficiency based on real-time network conditions. AI-Controlled Spatial Spectrum Utilization for Random Beams can include the following: Spectrum Utilization Algorithm: Implement an AI algorithm to determine the portion of the spatial spectrum that the random beams should occupy. This algorithm would take into account the sector's characteristics and UE distribution to maximize coverage and minimize interference. Dynamic Spectrum Allocation: Ensure that the AI algorithm can dynamically adjust spectrum allocation in response to changes in the network environment. Sector Formation Based on AI-Analyzed FDD Reciprocity can include the following: FDD Reciprocity Analysis: Use AI to analyze FDD reciprocity and form sectors based on this principle. The AI would identify patterns in uplink and downlink channels to optimize sector formation. Sector Adjustment: Implement a system that allows for dynamic sector adjustment based on the AI's analysis of FDD reciprocity.

AI-Driven Sector Determination via Uplink Sounding Signals can include the following: Uplink Signal Analysis: Develop an AI algorithm to process uplink sounding signals from UEs and use this information to determine the most appropriate sectors for beam transmission. Real-Time Sector Determination: Integrate the AI algorithm into the transceiver's system to enable real-time sector determination and adjustment. Sector Determination Using AI to Analyze Out-of-Band Information can include the following: Out-of-Band Information Processing: Implement an AI algorithm to process out-of-band information, such as environmental data or non-communication signals, to assist in sector determination. Enhanced Sector Selection: Use the AI algorithm to improve the accuracy and efficiency of sector selection based on the analysis of out-of-band information. While the foregoing details one implementation, alternatives to obtaining a sector of sectors and transmitting a plurality of random beams to user equipment (UE) within the sector, where these beams are generated through spatial filtering of a random beam pattern include the following: Enhanced Compatibility with User Equipment (UE): To address the backward compatibility issue with UEs that only support beam training, a hybrid approach is employed. This approach involves initially using a set of predefined beam patterns that are compatible with existing UE beam training protocols. Once initial communication is established, the system can then switch to using the more efficient random or pointy beam patterns for finer channel estimation. This ensures that the system remains accessible to a wider range of UEs while still benefiting from the advantages of random beam patterns for channel estimation. Improved Channel Estimation with Hybrid Beam Patterns: Instead of strictly using fully random beams or pointy beams, a hybrid beam pattern approach can be utilized. This approach combines the benefits of both beam types by dynamically adjusting the beam pattern based on the channel conditions and the density of UEs in the sector. For instance, in scenarios where the UE density is low, pointy beams can be used to focus on specific UEs with higher precision. In contrast, in high-density scenarios, random beams can be employed to cover more UEs simultaneously: improving overall system efficiency. Adaptive Beam Pattern Generation: The generation of random beams can be further optimized by incorporating adaptive algorithms that adjust the spatial filter coefficients based on real-time channel feedback from the UEs. This adaptive approach allows the system to dynamically refine the beam patterns to better match the current channel conditions, leading to more accurate channel estimation. Machine learning techniques can be applied to predict optimal beam patterns based on historical data and current channel feedback, enhancing the system's adaptability and performance. Sector Determination Enhancements: The method of determining sectors can be refined by integrating advanced signal processing and machine learning algorithms to analyze uplink sounding signals, out-of-band information, and additional environmental factors. This can lead to more precise sectorization, which in turn improves the efficiency of beamforming and channel estimation. For example, machine learning models can predict sector dynamics based on user mobility patterns and adjust sectors in real-time to optimize coverage and channel estimation accuracy. Utilization of Orthogonal Frequency-Division Multiplexing (OFDM) Symbols: The aggregation of random beams in one OFDM symbol, as mentioned, can be optimized by employing advanced coding and modulation schemes that enhance the multiplexing efficiency. Techniques such as non-orthogonal multiple access (NOMA) or coded OFDM can be explored to increase the amount of information transmitted within a single OFDM symbol, thereby improving the granularity and accuracy of channel estimation without increasing the signaling overhead.

Virtual User Serving Gateways

In another embodiment, a process includes the instantiation of virtual user-specific serving gateways (v-u-SGWs), assigning unique local IDs to these gateways, and configuring routing parameters to ensure that packets are correctly forwarded. Instantiation of v-u-SGWs: AI algorithms can predict the demand for network services and instantiate the appropriate number of v-u-SGWs on network devices to meet the anticipated load. This can be based on historical data, time of day: special events, or other predictive indicators. Assignment of Local v-u-SGW IDs: Once a v-u-SGW is instantiated, an AI system can assign a unique local ID to it. This system can ensure that IDs are managed efficiently and avoid conflicts, perhaps by using a pattern recognition algorithm to track and allocate IDs. Host Identifier (ID) Assignment: The network device hosting the v-u-SGWs is assigned a host ID. AI can assist in managing these host IDs across the network, ensuring that they are unique and correctly associated with their respective devices. Configuration of Routing Parameters: AI can optimize the routing parameters within the network by analyzing traffic patterns and network topology. It can configure the network so that packets specifying both the host ID and the local v-u-SGW ID are efficiently forwarded to the correct v-u-SGW. Dynamic Adaptation: The AI system can continuously monitor network conditions and service performance, dynamically adjusting the number of v-u-SGWs and their configurations in response to real-time changes in network conditions.

```
#Function to instantiate v-u-SGWs based on predicted
    demand
def instantiate_v_u_sgw (predicted_demand):
    v_u_sgw_list=[ ]
    for i in range (predicted_demand):
        v_u_sgw=create_v_u_sgw ( )
        v_u_sgw_id=assign_local_id (v_u_sgw)
        v_u_sgw_list.append ((v_u_sgw, v_u_sgw_id))
    return v_u_sgw_list
#Function to assign a unique local ID to a v-u-SGW
def assign_local_id (v_u_sgw):
    local_id=ai_id_management_system.get_unique_id
        (v_u_sgw)
    return local_id
#Function to configure routing parameters in the network
def configure_routing_parameters (v_u_sgw_list, hos-
    t_id):
    for v_u_sgw, v_u_sgw_id in v_u_sgw_list:
        routing_config=ai_routing_system.configure (hos-
            t_id, v_u_sgw_id)
        apply_routing_configuration      (routing_config,
            v_u_sgw)
#Main function to orchestrate the virtual gateway estab-
    lishment
def main ( )
    network_conditions=monitor_network_conditions ( )
    predicted_demand=ai_demand_prediction_model.predict
        (network_conditions)
    v_u_sgw_list=instantiate_v_u_sgw      (predicted_de-
        mand)
    host_id=get_host_id ( )
    configure_routing_parameters (v_u_sgw_list, host_id)
```

This AI-optimized process aims to ensure that the virtual gateways are established efficiently and can adapt dynamically to the needs of the network, improving overall service quality and resource utilization. In the pseudocode, ai_id_management_system and ai_routing_system represent AI-driven systems responsible for managing IDs and routing configurations, respectively: ai_demand_prediction_model is an AI model that predicts the demand for v-u-SGWs based on current network conditions. The create_v_u_sgw function represents the process of creating a new v-u-SGW, and apply_routing_configuration applies the AI-optimized routing configuration to the network. A method for establishing a virtual user-specific serving gateway (v-u-SGW) in a wireless network, the method comprising:
  a. using an artificial intelligence (AI) system based on predicted network service demand to select and instantiate a first v-u-SGW on a network device:
  b, assigning a first local v-u-SGW ID to the first v-u-SGW by the AI system, wherein the first local v-u-SGW ID is unique within the network device:
  c, assigning a host identifier (ID) to the network device:
  d. configuring routing parameters in the network by the AI system to forward packets specifying both the host ID and the first local v-u-SGW ID to the first v-u-SGW; and
  e. dynamically adjusting the instantiation of v-u-SGWs based on real-time network conditions as analyzed by the AI system.

In implementations, the AI system utilizes a machine learning model to forecast network service demand by analyzing historical network usage data alongside real-time network conditions. In the method of Concept 1, this AI system is responsible for managing multiple local virtual user-specific serving gateway (v-u-SGW) IDs, ensuring each v-u-SGW instantiated on the network device is allocated a unique local v-u-SGW ID. Additionally; the AI system optimizes packet forwarding efficiency by configuring routing parameters based on the analysis of current network traffic patterns and topology: The method also involves the AI system in continuous monitoring of network performance metrics, enabling dynamic adjustments to the instantiation of v-u-SGWs. Furthermore, the method includes assigning a virtual service-specific serving gateway (v-s-SGW) to manage the aggregation of service-related traffic from a selected group of User Equipments (UEs).

A system designed to establish a virtual user-specific serving gateway (v-u-SGW) in a wireless network includes: (a) an AI system tasked with instantiating v-u-SGWs on a network device according to predicted network service demand: (b) an ID management module within the AI system for assigning unique local v-u-SGW IDs to each instantiated v-u-SGW: (c) a routing configuration module within the AI system, setting routing parameters to ensure packets are forwarded to the correct v-u-SGW based on host ID and local v-u-SGW IDs; and (d) a monitoring module within the AI system, dynamically adjusting the number of v-u-SGW instantiations in response to real-time network conditions. In the system of Concept 6, the AI system includes a machine learning model that leverages both historical and real-time network data to anticipate network service demand. The ID management module maintains a registry of local v-u-SGW IDs, ensuring IDs are assigned to v-u-SGWs on the network device without conflict. The routing configuration module uses traffic pattern analysis and network topology data to fine-tune routing parameters for efficient packet forwarding. Lastly, the monitoring module continuously assesses network performance metrics, such as bandwidth usage, latency; and packet loss, to guide the dynamic adjustment of v-u-SGW instantiations.CONTENT CACHING The use of Artificial Intelligence (AI) to optimize content caching in an Information-Centric Networking (ICN) virtual network (VN) involves several key processes that leverage AI algorithms to enhance the efficiency and responsiveness of content delivery within a wireless network. This optimization can significantly improve user experience by reducing latency: conserving bandwidth, and ensuring that popular content is readily available. The operations include:

Sensing the Popularity of Available Content-AI can analyze user behavior, content request patterns, and social media trends to accurately predict the popularity of available content. Machine learning models, such as time series forecasting or neural networks, can be trained on historical data to identify content that is likely to become popular, even before it trends widely. This predictive capability allows the Content Forwarding Service Manager (CFM) to proactively select content for caching.

Selecting Content for Caching-Once the popularity of content is sensed. AI algorithms can prioritize content for caching based on several factors, including predicted popularity, content size, and the freshness of content. Optimization algorithms can balance these factors to maximize the utility of the cached content while minimizing the required storage space and network resources.

Prompting Content Forwarding to Virtual ICN Servers-AI can also optimize the process of forwarding selected content to virtual ICN servers within the Radio Access Network (RAN) of a wireless network. By analyzing network conditions. AI can determine the optimal timing and routing for content forwarding to ensure efficient use of network bandwidth and minimize impact on other network services.

Caching Content in ICN Format and Serving Requests— For the method involving receiving content at a network device and caching it in an ICN format. AI can optimize the caching strategy based on the anticipated demand for content and the network device's storage capacity. AI algorithms can dynamically adjust the cache replacement policy to ensure that highly requested content is retained while less popular content is replaced. When a content request is received from a v-u-SGW. AI can assist in quickly locating the requested content within the ICN cache and determining the most efficient path for forwarding the content in the ICN format to the v-u-SGW. This process can be further optimized by predicting request patterns and pre-loading content into the cache or pre-positioning content closer to the anticipated request source.

Translating Content from ICN Format to User-Specific Format-AI can enhance the process of translating content from the ICN format to a user-specific format by learning user preferences and device capabilities. This can involve using machine learning models to predict the optimal format for content delivery based on the user's device type, network conditions, and past user behavior, ensuring that the content is delivered in the most appropriate format for immediate use.

Pseudocode for AI-optimized content caching and delivery

```
class AIContentCachingOptimizer:
    def init_(self, historical_data):
        self.popularity_model=train_popularity_model (historical_data)
        self.network_condition_model=train_network_condition_model (historical_data)
    def select_content_for_caching (self, available_content):
        predicted_popularity=self.popularity_model.predict (available_content)
        #Select content based on predicted popularity
        content_to_cache=prioritize_content (available_content, predicted_popularity)
        return content_to_cache
    def optimize_content_forwarding (self, content_to_cache, network_conditions):
```

```
optimal_forwarding
    plan=self.network_condition_model.predict (con-
    tent_to_cache, network_conditions)
#Forward content based on optimal plan
forward_content_to_virtual_icn_servers  (content_
    to_cache, optimal_forwarding plan)
```

By leveraging AI in these ways, the content caching process within an ICN VN can be significantly optimized, leading to improved efficiency in video content delivery with better user experience.

A method for optimizing communication service quality within a communication network includes utilizing an artificial intelligence (AI) learning model within a network application entity to analyze timing information extracted from application layer messages received from user equipment (UE): applying the AI learning model to predict future service quality issues and trends based on a comprehensive analysis of both historical and real-time extracted timing information: providing the predicted communication service quality information, as determined by the AI learning model, to a network management and/or control entity of the communication network; and enhancing communication service quality information with AI from the timing information, and improving a predictive accuracy over time and enabling the network to dynamically adjust parameters to maintain or enhance the quality of the communication service provided to the UE.

In implementations, the process includes extracting timing information from an application layer message sent by user equipment and determining communication service quality based on this timing information. The AI learning model then uses the extracted timing information to forecast potential service quality issues and dynamically adjusts network parameters to either maintain or enhance communication service quality. The method involves the network application entity extracting additional timing information from another application layer message received through a different communication path. The AI learning model combines and analyzes both sets of timing information to thoroughly assess communication service quality: A method where the network application entity receives communication service quality information from user equipment. This information aids the AI learning model in refining its predictions and adjustments for future service quality enhancements. Another aspect of One concept includes the network application entity receiving timing information from user equipment and determining communication service quality based on this information. Here, the AI learning model employs predictive analytics to foresee service quality trends and proactively mitigate potential quality issues. Communication service quality information, which includes a measure value, is provided to the network management and/or control entity: This provision is based on comparing the measure value to a dynamically adjusted threshold value, reflecting changing network conditions and service quality goals. The method also involves the network application entity periodically providing communication service quality information to the network management and/or control entity: with the AI learning model optimizing the frequency of this provision to balance real-time responsiveness with network resource efficiency. Communication service quality information may include metrics such as end-to-end delay or jitter. The network application entity also provides identifiers related to the quality of service (QOS) class, session, or flow associated with the communication service quality information to the network management and/or control entity. The AI learning model supports the identification and prioritization of QoS-sensitive traffic, ensuring optimal service delivery.

In a communication network, particularly a 5G communication network, a method for providing a communication service is enhanced by incorporating artificial intelligence (AI) to analyze and optimize communication service quality. This method involves a network application entity, such as an application server located within the core network or a cloud network in communication with the communication network, executing an application to provide the communication service to user equipment (UE). The UE, equipped with applications for utilizing URLLC services like industrial communications, time-sensitive network services, or automotive services, communicates with the communication network through a radio access network (RAN).

The network application entity is responsible for providing communication service quality information to a network management and/or control entity for quality of service (QOS) monitoring. This communication service quality information is determined based on timing information extracted from application layer messages received from the UE. The timing information, which may include timestamps indicating the generation time of messages or offset values showing execution time at the receiving node, is crucial for assessing the quality of the communication service, such as packet jitter or end-to-end delay:

To enhance this method, an AI learning model is employed by the network application entity to analyze the extracted timing information. This AI model leverages historical and real-time data to predict future service quality issues, enabling proactive adjustments to the communication network to maintain or improve QoS. The AI analysis includes extracting timing information from uplink messages and further application layer messages received via different communication paths, allowing for a comprehensive understanding of service quality across the network.

The network management and/or control entity: which may be implemented in various functions within the core network or the management plane, receives the AI-enhanced communication service quality information. It then adjusts the communication network to optimize QoS based on this information. Adjustments may involve re-selecting user plane functions or radio access networks for ongoing sessions, orchestrating network functions, or re-configuring scheduling in the RAN.

Furthermore, the method includes the network application entity receiving notification messages containing the communication service quality information from the UE. These messages inform the application server about the quality of received packets, including whether they meet predefined thresholds for delay and jitter. Based on this feedback, the application server, in collaboration with the 5G core network and RAN, can take necessary actions to ensure the communication service meets the required QoS standards.

By integrating AI to analyze timing information and predict service quality: this method significantly enhances the ability of the communication network to provide high-quality communication services, adapting dynamically to changing network conditions and user requirements, he UE, equipped with applications for utilizing URLLC services like industrial communications, time-sensitive network services, or automotive services, communicates with the communication network through a radio access network (RAN).

The network application entity is tasked with providing communication service quality information to a network management and/or control entity for quality of service (QOS) monitoring. This communication service quality information is determined based on timing information extracted from application layer messages received from the UE. The timing information, which may include timestamps indicating the generation time of messages or offset values showing execution time at the receiving node, is crucial for assessing the quality of the communication service, such as packet jitter or end-to-end delay:

To enhance this method, an AI learning model is employed by the network application entity to analyze the extracted timing information. This AI model leverages historical and real-time data to predict future service quality issues, enabling proactive adjustments to the communication network to maintain or improve QoS. The AI analysis includes extracting timing information from uplink messages and further application layer messages received via different communication paths, allowing for a comprehensive understanding of service quality across the network.

The network management and/or control entity: which may be implemented in various functions within the core network or the management plane, receives the AI-enhanced communication service quality information. It then adjusts the communication network to optimize QoS based on this information. Adjustments may involve re-selecting user plane functions or radio access networks for ongoing sessions, orchestrating network functions, or re-configuring scheduling in the RAN.

Furthermore, the method includes the network application entity receiving notification messages containing the communication service quality information from the UE. These messages inform the application server about the quality of received packets, including whether they meet predefined thresholds for delay and jitter. Based on this feedback, the application server, in collaboration with the 5G core network and RAN, can take necessary actions to ensure the communication service meets the required QoS standards.

By integrating AI to analyze timing information and predict service quality, this method significantly enhances the ability of the communication network to provide high-quality communication services, adapting dynamically to changing network conditions and user requirements.

Qos Aware Content Caching Resource Allocation

To implement Quality of Service (QOS) aware caching resource allocation in a network, we can design a system where caching decisions are made based on the QoS requirements of different applications or users. This pseudocode outlines a basic approach to dynamically allocate caching resources to meet these QoS requirements effectively. The system allocates caching resources based on QoS requirements, such as latency. Applications submit caching requests specifying their data size and required latency. The system then selects the best available caching resource that meets these requirements, prioritizing resources based on their latency and available capacity. This approach ensures that applications receive the caching resources they need to meet their QoS requirements, optimizing the overall performance and user experience of the network.

A method for allocating caching resources in a network, comprising: registering, by a system, caching resources along with their capacities and latency characteristics: receiving, by the system, caching requests from applications, each request including a required data size and a latency requirement: selecting, by the system, an optimal caching resource for each request based on the resource's capacity: its latency characteristic, and the request's latency requirement: allocating, by the system, the selected caching resource to fulfill the request.

A system for managing caching resources in a network to meet Quality of Service (QOS) requirements, comprising: a resource registry configured to store information about caching resources, including their capacities and latency characteristics: a request handler configured to process caching requests from applications, each request specifying a required data size and a latency requirement: a resource allocator configured to select and allocate caching resources to applications based on the resources' capacities, their latency characteristics, and the applications' latency requirements.

In implementations, a system manages caching resources within a network to fulfill Quality of Service (QOS) requirements. This system includes a resource registry for storing details about caching resources, such as their capacities and latency characteristics. A request handler is tasked with processing caching requests from applications, with each request detailing a required data size and a latency requirement. The resource allocator then selects and allocates caching resources to applications, considering the resources' capacities, their latency characteristics, and the applications' latency needs. In Concept 3, the method of Concept I includes a step where caching resources are prioritized based on their ability to meet or exceed the latency requirements specified in the request. Concept 4 adds that the system updates the available capacity of the chosen caching resource following allocation. Concept 5 describes a step in One concept where caching requests are sorted by their latency requirements in descending order before allocation. Concept 6 enhances the system of Concept 2 by enabling the resource registry to dynamically update the available capacities of caching resources as current allocations change. Concept 7 specifies that the resource allocator in Concept 2 can reallocate caching resources from lower to higher priority requests if needed to satisfy latency requirements. Concept 8 explains that the request handler is equipped to queue caching requests when immediate allocation isn't feasible, processing the queue based on priority as resources become available. Concept 9 introduces a step in One concept where the requesting application is notified of the allocation decision. Concept 10 reveals that the resource allocator in Concept 2 employs a machine learning algorithm to predict the optimal allocation of caching resources, using historical allocation data and network conditions. Finally. Concept 11 adds a feedback module to the system of Concept 2, designed to gather performance data from allocated caching resources and use this data to refine future allocations.

Cooperative Computation and Caching Protocol

To create a cooperative computation and caching protocol in a heterogeneous network of 5G. WiFi, and unlicensed transceivers interfacing with an AI management plane, the system performs following steps: Data Collection: The AI management plane collects real-time data on network conditions, user demands, and available resources from the heterogeneous network elements. Computation and Caching Decisions: Based on the collected data, the AI management plane uses machine learning algorithms to make decisions on where to cache content and how to distribute computation tasks across the network to optimize performance and reduce latency. Resource Allocation: The AI management plane communicates with the RAN network cloud resource management module to allocate the necessary resources for computation and caching as decided. Execution: The control plane receives instructions from the AI management plane and orchestrates the execution of computation and caching tasks across the data plane, which consists of various network elements like 5G base stations. WiFi access points, and unlicensed transceivers. Adaptation: The AI management plane continuously monitors the network and adapts the computation and caching strategies in response to changing network conditions and user demands. This pseudocode provides a high-level view of how an AI management plane manages cooperative computation and caching in a heterogeneous network. The AI management plane collects data, analyzes it to make decisions, and then coordinates with the RAN cloud resource management module, control plane, and data plane to execute these decisions.

Priority Aware Computational Resource Allocation

The system provides a priority-aware computational resource allocation protocol in a heterogeneous network of 5G. WiFi, and unlicensed transceivers interfacing with an AI management plane. The process optimizes the allocation of computational resources based on the priority of tasks or users where the protocol leverages AI to dynamically assess network conditions, user demands, and priority levels to allocate resources efficiently. This pseudocode outlines a basic framework for priority-aware computational resource allocation in a heterogeneous network. The AIManagementPlane class is responsible for managing computational resources and user requests, prioritizing tasks based on their priority levels, and allocating resources accordingly. The NetworkResourceModule class interfaces with the physical network, reporting resource status and handling user requests. This protocol ensures that high-priority tasks are given precedence in resource allocation, optimizing network performance and user satisfaction.

Computational Resources Offloading

To address the challenge of devices with limited computational resources offloading tasks to neighboring devices with idle computing resources, an AI-enhanced framework is provided. This framework works with base stations that manage the computing resource allocation, with AI algorithms improving the efficacy of resource offloading based on the price and availability of nearby edge computing capacity and has the following: Task Offloading Request: Devices with limited computational resources send offloading requests to the base station, including task details and required computational resources. AI-Enhanced Decision Making: The base station's AI management plane processes the requests, considering factors such as the urgency of the task, the computational load of potential helper devices, and the cost of offloading. Resource Allocation: The AI management plane allocates tasks to devices with idle resources based on optimization criteria, ensuring efficient use of the network's computational capacity. Pricing Model: The AI management plane dynamically adjusts the price for offloading tasks based on current demand and supply of computational resources, ensuring fair compensation for resource providers. Task Execution and Completion: Once a task is offloaded and executed by the helper device, the results are sent back to the requesting device or directly to the intended destination. The processing of offloading requests by an artificial intelligence (AI) management plane within a base station, based on the availability of nearby edge computing capacity and a dynamic pricing model, leverages AI to make real-time decisions that optimize network resources, ensure efficient task execution, and dynamically adjust pricing to reflect current demand and supply conditions.

The process includes: Step 1: Offloading Request Analysis-When a device with limited computational resources sends an offloading request to the base station, the AI management plane first analyzes the request. This analysis includes understanding the computational requirements of the task, the urgency level, and any specific constraints related to data privacy or latency. Step 2: Availability Assessment—The AI management plane then assesses the availability of nearby edge computing resources. This involves querying the current status of edge servers or neighboring devices with idle computing resources that could potentially handle the offloaded task. The AI considers factors such as computational power, memory availability, network connectivity, and proximity to the requesting device. Step 3: Dynamic Pricing Model—Concurrently, the AI management plane consults a dynamic pricing model to determine the cost of offloading the task. This model adjusts prices in real-time based on several factors: Demand and Supply: Higher demand for offloading or lower availability of computing resources drives prices up, and vice versa. Task Urgency: Tasks requiring immediate execution may incur a premium. Resource Requirements: Tasks demanding significant computational resources may be priced higher. Historical Data: Past transactions and network conditions can inform pricing strategies, leveraging machine learning to predict optimal pricing. Step 4: Decision Making—With the availability of edge computing resources and the cost of offloading determined, the AI management plane makes a decision. It selects the most suitable computing resource for the task, considering both technical feasibility and cost-effectiveness. The decision-making process may involve complex algorithms, such as optimization models or reinforcement learning, to balance multiple objectives. Step 5: Task Allocation and Pricing Notification-Once a decision is made, the AI management plane allocates the task to the chosen computing resource and notifies the requesting device of the offloading cost. The device can then confirm the offloading based on the provided price or decide to wait for a more favorable rate. Step 6: Continuous Learning and Adjustment—The AI management plane continuously learns from each offloading decision and outcome. It refines its algorithms for availability assessment, pricing, and decision making, improving its ability to efficiently allocate resources and dynamically price offloading services over time.

Consider a scenario where a smartphone requests offloading of a computationally intensive task. The AI management plane analyzes available edge servers and identifies two potential candidates. Using its dynamic pricing model, it calculates the cost of offloading to each server based on current demand. The smartphone is informed of the price, confirms the offloading, and the task is executed seamlessly, demonstrating the AI management plane's capability to optimize resource allocation and pricing dynamically. This process exemplifies how AI can revolutionize network management, offering a flexible, efficient, and economically viable solution for computational offloading in a heterogeneous network environment.

Allocating computational tasks to neighboring devices with idle computing resources by the AI management plane also leverages artificial intelligence to optimize the distribution of tasks across a network. This process aims to enhance network efficiency, reduce latency, and ensure that computational demands are met promptly and effectively. The optimization criteria used by the AI management plane can include several factors, such as resource availability, task urgency, energy efficiency, and network congestion. The Optimization Criteria includes: Resource Availability: The primary criterion is the availability of computational resources on neighboring devices. The AI evaluates the processing power, memory, and storage available on each device to determine its capability to handle specific tasks. Task Urgency: Some tasks may be more time-sensitive than others. The AI prioritizes tasks based on their urgency, ensuring that critical tasks are allocated resources first. Energy Efficiency: To promote sustainability and minimize operational costs, the AI considers the energy consumption of performing tasks on various devices. Tasks might be allocated to devices that offer a balance between computational capability and energy efficiency. Network Congestion: The AI assesses the current state of network traffic to avoid overloading certain nodes or links. Tasks may be distributed in a way that mitigates congestion and optimizes network throughput. Proximity: Allocating tasks to devices physically closer to the data source or the requesting device can reduce latency and improve response times. The AI takes into account the geographical distribution of devices when making allocation decisions. Reliability and Availability: The AI evaluates the reliability of devices based on their historical performance and availability patterns. Devices that are consistently available and perform reliably are preferred for task allocation.

During Allocation Process, the system performs: Task Analysis: Upon receiving a computational task request, the AI management plane analyzes the task's requirements, including computational complexity: memory needs, and deadline. Resource Discovery: The AI scans the network to identify neighboring devices with idle computing resources that match the task's requirements. Evaluation and Selection: Using the optimization criteria, the AI evaluates potential devices for task allocation. This evaluation may involve complex algorithms, such as multi-criteria decision-making (MCDM) methods or optimization models. Task Offloading: Once a suitable device (or devices) is selected, the AI offloads the task for execution. The selection process ensures that the chosen device(s) can complete the task efficiently and within the required timeframe. Monitoring and Adjustment: The AI management plane continuously monitors the execution of offloaded tasks. If necessary, it can adjust allocations in real-time based on changes in network conditions or device availability.

Consider a scenario where a video analytics application requires significant computational resources to process real-time data from surveillance cameras. The AI management plane receives the task request and identifies several smartphones and edge servers in the vicinity with idle resources. It evaluates these devices based on the optimization criteria and decides to offload the video processing tasks to a combination of devices that offer the best trade-off between processing power, energy efficiency, and proximity to the data source. This dynamic allocation allows the application to process video data efficiently, demonstrating the AI management plane's capability to optimize resource allocation in a heterogeneous network environment. This approach to allocating computational tasks not only maximizes the utilization of available resources but also enhances the overall performance and responsiveness of the network, showcasing the potential of AI in managing complex, distributed computing environments.

A method for managing computational task offloading in a wireless communication network, comprising: receiving, by a base station, offloading requests from devices with limited computational resources, each request including task details and required computational resources: processing, by an artificial intelligence (AI) management plane within the base station, the offloading requests based on the availability of nearby edge computing capacity and a dynamic pricing model: allocating, by the AI management plane, the computational tasks to neighboring devices with idle computing resources based on optimization criteria: charging, by the AI management plane, the requesting devices for the offloading service based on the dynamic pricing model.

Concept: A system for computational resource offloading in a wireless communication network, comprising: a base station configured to interface with devices within the network and manage computational task offloading: an artificial intelligence (AI) management plane integrated with the base station, configured to process offloading requests and allocate tasks to devices with idle computing resources: a dynamic pricing module within the AI management plane, configured to determine offloading charges based on real-time supply and demand of computational resources: a communication interface for transmitting offloading decisions and task results between the base station, requesting devices, and devices performing the offloading.

The enhanced method of One concept incorporates an AI management plane to predict task urgency (Concept 3), employs a dynamic pricing model that adjusts in real-time to network conditions (Concept 4), and ensures results of offloaded tasks are returned to devices via the base station (Concept 5). The system from Concept 2 is augmented with a machine learning algorithm within the AI management plane for optimized task allocation (Concept 6), uses secure encryption for data integrity (Concept 7), and enables the base station to monitor task performance for AI feedback (Concept 8). Additionally: the dynamic pricing module offers incentives for device participation during high demand (Concept 9), the AI management plane oversees offloading across diverse networks (Concept 10), and dynamically reallocates tasks based on edge computing resource availability (Concept 11). Resource Allocation Schemes for 5G Networks:

A method for optimizing resource allocation in a 5G network, comprising:
monitoring network traffic and resource usage across a plurality of network nodes:
analyzing the monitored data to identify patterns of resource demand:
determining optimal resource allocation strategies based on the identified patterns, wherein the strategies aim to balance load across the network nodes and minimize energy consumption; and
implementing the determined resource allocation strategies by dynamically adjusting resource distribution among the network nodes.

Variations of the method include: network nodes encompass a variety of components including 5G base stations, edge computing units, and user devices. This method involves analyzing monitored data through statistical analysis to forecast future network traffic and devising optimal resource allocation strategies, such as reallocating bandwidth and processing power. Additionally, it includes adjusting the operational status of network nodes to enhance energy efficiency and reduce consumption. The determination of strategies considers the energy efficiency of each network node and includes rerouting data traffic to mitigate congestion. These strategies are dynamically updated in real-time based on continuous monitoring and involve providing feedback to network administrators about the effectiveness of the resource allocation strategies. Furthermore, part of the strategies entails switching to renewable energy sources during periods of peak energy consumption to promote sustainability.

A system for optimizing resource allocation in a 5G network using artificial intelligence (AI), comprising:

a data collection module configured to gather information on network traffic and resource usage:

an AI-based analysis module configured to process the gathered information to identify resource demand patterns and predict future demands:

a strategy formulation module configured to generate optimal resource allocation strategies based on the analysis, aimed at enhancing network efficiency and reducing energy consumption; and an implementation module configured to execute the generated strategies by dynamically adjusting resources across the network.

Variations of the system features an AI-based analysis module equipped with a machine learning algorithm trained on historical network data. This module works in conjunction with a strategy formulation module that generates strategies for predictive resource provisioning to manage expected network load increases. The implementation module of the system adjusts computational resource allocation among edge computing units for optimized data processing. Additionally, the system includes a user interface that allows network administrators to monitor the effectiveness of the implemented strategies. The strategies generated by the system also involve dynamic adjustment of network node operational modes to save energy and utilize real-time data analytics for immediate strategy modifications. The system is designed to give priority to critical network traffic during high usage periods and includes an energy management module that optimizes the use of renewable energy sources within the network. Furthermore, the implementation module features a feedback loop to the AI-based analysis module, which refines future strategy generation based on the outcomes observed.

Privacy and Security Preservation in Energy-Efficient 5G Networks:

1. A system for maintaining privacy and security in an energy-efficient 5G network, comprising:

a plurality of 5G network nodes configured to operate with reduced power consumption:

a security management unit configured to implement encryption and authentication protocols that are optimized for low-power operation:

an energy management module configured to monitor and control the energy usage of the network nodes while maintaining the integrity of the security protocols; and a privacy control unit configured to manage user data and access rights in a manner that conserves energy without compromising user privacy.

Variations include a security management unit that utilizes lightweight cryptographic algorithms, tailored for environments where energy resources are limited. It features an energy management module with a dynamic power scaling capability; which adjusts the energy consumption of network nodes in response to the current needs for security processing. The privacy control unit in the system employs differential privacy techniques to anonymize user data, ensuring energy-efficient data processing. Network nodes within this system include user devices, base stations, and edge computing nodes. The security management unit is designed to selectively activate security features, taking into account the level of threat and the availability of energy resources. Additionally, the energy management module can activate energy-saving modes during low network traffic times without compromising security levels. The privacy control unit offers users the ability to customize their privacy settings in an energy-efficient manner. To further conserve energy; the network nodes are equipped with hardware-based security features that function independently of the main processing unit. Lastly: the system incorporates a threat detection module designed to operate with minimal energy consumption, enabling continuous monitoring for security breaches.

A method for enhancing privacy and security in an energy-efficient 5G network using artificial intelligence (AI), comprising: collecting data related to network security incidents and energy usage patterns: analyzing the collected data using an AI model to identify correlations between security measures and energy consumption: generating optimized security protocols that balance energy efficiency with robust privacy and security protections; and implementing the optimized security protocols across the 5G network.

Implementations can include an AI model that includes a neural network trained on historical data of past security incidents and energy consumption metrics. This model supports optimized security protocols, such as AI-driven adaptive encryption techniques that adjust their complexity based on data sensitivity and energy availability. The AI model is also configured to predict potential security threats and proactively adapt security measures to be energy-efficient. It enables the dynamic allocation of computational resources for security processing using AI and optimizes the timing of security updates and patches to reduce energy use. Furthermore, the AI model employs real-time network analytics to continuously improve the trade-off between security levels and energy consumption. The method includes energy-efficient user authentication mechanisms that utilize biometric data and is implemented on a distributed computing platform to maintain scalability and real-time responsiveness. Lastly, the optimized security protocols are designed to be compatible with renewable energy sources within the 5G network, ensuring sustainable operation.

Privacy and Security Preservation in Energy-Efficient 5G Networks, a system for maintaining privacy and security in an energy-efficient 5G network, comprising: a plurality of 5G network nodes configured to operate with reduced power consumption: a security management unit configured to implement encryption and authentication protocols that are optimized for low-power operation: an energy management module configured to monitor and control the energy usage of the network nodes while maintaining the integrity of the security protocols; and a privacy control unit configured to manage user data and access rights in a manner that conserves energy without compromising user privacy.

In implementations, the security management unit employs lightweight cryptographic algorithms suitable for energy-constrained environments. The energy management module includes a dynamic power scaling feature that adjusts the energy consumption of the network nodes based on current security processing needs. The privacy control unit utilizes differential privacy techniques to anonymize user data while performing energy-efficient data processing. The network nodes include user devices, base stations, and edge computing nodes. The security management unit is further configured to selectively activate security features based on the level of threat and available energy resources. The energy management module is configured to implement energy-saving modes during periods of low network traffic without reducing security levels. The privacy control unit is further configured to provide users with energy-efficient privacy settings customization options. The network nodes are equipped with hardware-based security features that operate independently of the main processing unit to save energy. The system further comprises a threat detection module that operates with minimal energy consumption to continuously monitor for security breaches.

A method for enhancing privacy and security in an energy-efficient 5G network using artificial intelligence (AI), comprising: •collecting data related to network security incidents and energy usage patterns:
  analyzing the collected data using an AI model to identify correlations between security measures and energy consumption:
  generating optimized security protocols that balance energy efficiency with robust privacy and security protections; and
  implementing the optimized security protocols across the 5G network.

In implementations, an AI model featuring a neural network is trained using a dataset that includes historical security incidents and energy consumption metrics. This model supports the development of optimized security protocols, which employ AI-driven adaptive encryption techniques. These techniques adjust their complexity based on the sensitivity of the data being protected and the current availability of energy. The AI model is adept at predicting potential security threats and can proactively modify security measures to ensure they are energy-efficient. It facilitates the dynamic allocation of computational resources specifically for security processing through AI. Additionally, the model is designed to enhance the scheduling of security updates and patches, aiming to minimize energy consumption. Utilizing real-time network analytics, the AI model constantly refines the equilibrium between maintaining a high security level and optimizing energy usage. The method also introduces optimized security protocols that incorporate energy-efficient user authentication mechanisms, which utilize biometric data. To ensure scalability and real-time responsiveness, the AI model operates on a distributed computing platform. Finally: the optimized security protocols are crafted to be compatible with renewable energy sources, aligning with the energy infrastructure of the 5G network. ENERGY AWARE COMPUTATIONAL RESOURCE ALLOCATION To implement energy-aware computational resource allocation in a heterogeneous network that includes 5G. WiFi, unlicensed transceivers, and IoT devices, with the coordination of an AI management plane, the following pseudocode outlines a basic approach. This approach focuses on optimizing energy consumption across the network while ensuring that computational tasks are completed efficiently. The provisional application also provides Pseudocode for a class AIManagementPlane that manages devices and tasks, prioritizing energy efficiency and task priority during allocation. Devices are registered with their energy efficiency ratings, and tasks are allocated to the most energy-efficient available device capable of handling the task. This approach ensures that the network optimizes energy consumption while addressing computational demands effectively.

Selecting an optimal device for task execution by the AI management plane, based on the device's energy efficiency rating and the task's required resources, involves a multifaceted decision-making process. This process is designed to ensure that computational tasks are offloaded to devices that not only have the capacity to handle them but also do so in the most energy-efficient manner. Here's an elaboration on how this selection process works:

Energy Efficiency Rating: Each device in the network is assigned an energy efficiency rating. This rating could be based on various factors, including the device's power consumption characteristics, battery life, processing power, and historical energy usage data. The rating reflects how efficiently a device can perform computational tasks relative to the energy it consumes.

Task Resource Requirements: The resource requirements of a task include the computational power needed, such as CPU and GPU usage, memory consumption, storage needs, and network bandwidth. These requirements are assessed against the capabilities of available devices to ensure compatibility. AI-Driven Selection Process: The AI management plane uses algorithms to analyze both the energy efficiency ratings of devices and the resource requirements of tasks. The selection process typically involves the following steps: Task Analysis: The AI evaluates the complexity and urgency of the incoming task, determining the level of resources needed for completion. Device Assessment: The AI reviews the current status of devices in the network, considering their energy efficiency ratings and available resources. Optimization Algorithm: The AI applies an optimization algorithm to find the best match between tasks and devices. This algorithm may use techniques such as linear programming, heuristic methods, or machine learning to maximize energy efficiency while meeting the resource demands of the task. Device Selection: The AI selects the device that can perform the task with the highest energy efficiency while ensuring that the task's resource requirements are met. If multiple devices are equally suitable, the AI may further prioritize based on additional criteria, such as network latency or device idle time. Task Offloading: Once the optimal device is selected, the AI offloads the task for execution, providing the necessary instructions and data to the device. The AI management plane continuously learns from each offloading decision and the resulting energy consumption. It refines its selection algorithms to improve future decisions, adapting to changes in device performance and network conditions.

An example Scenario is discussed next. Imagine a network with various IoT devices, smartphones, and edge servers. An IoT device needs to process data from its sensors but lacks the computational power to do so efficiently. It sends a request to the AI management plane, which analyzes the task's requirements. The AI then selects an edge server with a high energy efficiency rating and idle computational resources to perform the task. The edge server processes the data and returns the results, all while minimizing energy consumption.

This energy-aware approach to task allocation not only conserves battery life and reduces operational costs but also supports the sustainability goals of the network by optimizing energy usage across all connected devices.

One concept: A method for energy-aware computational resource allocation in a wireless communication network, comprising:
  registering, by an artificial intelligence (AI) management plane, a plurality of devices within the network along with their energy efficiency ratings:
  receiving, by the AI management plane, computational task requests from user equipment, each request including required resources and priority level:
  selecting, by the AI management plane, an optimal device for task execution based on the device's energy efficiency rating and the task's required resources:
  allocating, by the AI management plane, the computational task to the selected device for execution.

Concept 2: A system for managing computational tasks in a heterogeneous wireless communication network, comprising:

an artificial intelligence (AI) management plane configured to interface with a plurality of network devices and user equipment:
a device registry within the AI management plane for storing energy efficiency ratings of the network devices:
a task allocation module within the AI management plane for processing computational task requests based on energy efficiency considerations:
a communication interface for coordinating task execution between the AI management plane and the selected network devices.

In implementations, the registration step includes categorizing devices by their network technology type, such as 5G, WiFi, and unlicensed transceivers (Concept 3). The selection step gives priority to devices that are not engaged in other tasks (Concept 4) and adjusts device selection in response to real-time variations in the network's energy consumption (Concept 5). In the system of Concept 2, the task allocation module dynamically adjusts task priorities based on the urgency of the computational tasks (Concept 6). The communication interface employs secure data transmission protocols to maintain the integrity of the computational tasks (Concept 7). The AI management plane includes a machine learning algorithm trained to refine task allocation decisions using historical energy consumption data (Concept 8). It also provides feedback to network devices on their energy use during task execution (Concept 9) and monitors the energy efficiency of network devices, updating the device registry as needed (Concept 10).

A spectrum and resource allocation system for a 5G network, comprising:
a spectrum management unit configured to dynamically allocate frequency bands among network devices based on real-time network conditions:
a resource allocation processor configured to assign network resources including bandwidth, power, and computational resources to optimize network performance and energy efficiency; and
a data analysis module configured to collect and analyze network usage data to inform the spectrum management unit and resource allocation processor.

In implementations, the spectrum management unit employs machine learning algorithms to forecast future spectrum needs. The resource allocation processor in the system adjusts the power levels of network devices to reduce energy consumption while ensuring quality of service is maintained. The data analysis module of the system uses big data analytics to handle the processing of extensive network traffic data. Additionally, the spectrum management unit is equipped to apply cognitive radio techniques to detect and exploit underused frequency bands. The resource allocation processor is also designed to give priority to resources for ultra-reliable low-latency communication (URLLC) applications. The system includes an interference management module to reduce cross-talk and interference across frequency bands. Furthermore, the resource allocation processor utilizes network slicing to allocate customized resource blocks to various service types. The data analysis module is capable of providing network expansion recommendations based on analysis of long-term data trends. Lastly: the spectrum management unit and resource allocation processor work in tandem to conduct a joint optimization of spectrum use and resource allocation.

A method for optimizing spectrum and resource allocation in a 5G network using artificial intelligence (AI), comprising:
collecting network performance data including spectrum usage, device energy consumption, and user demand:
processing the collected data using an AI model to identify optimization opportunities for spectrum and resource allocation:
generating allocation strategies that enhance network performance and energy efficiency; and
implementing the allocation strategies in the 5G network.

In implementations, the AI model comprises a deep learning neural network that has been trained using historical data on network performance. This model facilitates allocation strategies that incorporate dynamic spectrum access techniques to adjust to changing network demands. It is also designed to offer predictive maintenance recommendations for network equipment, drawing on patterns of resource allocation. The allocation strategies further involve making real-time adjustments to resource blocks to accommodate various types of network traffic. Additionally, the AI model aims to enhance network energy efficiency by forecasting periods of low traffic and accordingly scaling down resource allocation. Employing reinforcement learning, the AI model continuously refines its allocation strategies based on feedback regarding network performance. The implementation of the AI model on a cloud platform ensures scalable processing of network data. These allocation strategies are also devised to reduce the carbon footprint associated with operating the 5G network. Moreover, the AI model is specifically configured to optimize resource allocation for cutting-edge 5G applications, including the Internet of Things (IoT) and vehicle-to-everything (V2X) communications.

A method for optimizing spectrum and resource allocation in a 5G network, comprising:
dynamically allocating frequency bands among network devices based on real-time network conditions:
assigning network resources including bandwidth, power, and computational resources to optimize network performance and energy efficiency; and
utilizing an AI model to analyze network usage data and inform the allocation process.

In implementing, the AI model is designed to forecast future spectrum needs and network resource demands. The method also includes modulating the power levels of network devices to reduce energy usage while ensuring the quality of service is preserved. The AI model utilizes machine learning algorithms that have been trained on historical data regarding network performance. Additionally: the method involves dynamically allocating frequency bands by employing cognitive radio techniques, which enable the identification and exploitation of frequency bands that are currently underused.

Resource Block Optimization

In FIG. 3, within a Radio Access Network (RAN), the resource grid is utilized to schematically represent the time-frequency resources available for a given antenna port. In scenarios involving multiple-input-multiple-output (MIMO) configurations with several antenna ports, each port has a corresponding resource grid. This grid is segmented into multiple resource elements (REs), with each RE comprising a single subcarrier and symbol. These REs, the smallest units within the time-frequency grid, carry a single complex value that represents data from either a physical channel or signal. The amount of information each RE represents varies with the modulation scheme employed.

Blocks of REs are known as physical resource blocks (PRBs) or simply resource blocks (RBs), encompassing a set number of consecutive subcarriers in the frequency domain.

Typically, an RB includes 12 subcarriers, a figure that remains constant across different numerologics. In the time domain, the number of consecutive Orthogonal Frequency Division Multiplexing (OFDM) symbols an RB includes can vary based on the numerology. It's generally understood that a single RB corresponds exclusively to one direction of communication, either transmission or reception, for a device.

Resource blocks can be grouped into Resource Block Groups (RBGs), sub-bands, or bandwidth parts (BWPs), with these groupings potentially spanning the entire bandwidth. The scheduling of user equipment (UEs) or sidelink devices for downlink, uplink, or sidelink transmissions involves allocating one or more REs within these sub-bands or BWPs. Typically, a UE utilizes only a subset of the available resource grid. The allocation of more RBs to a UE, coupled with a higher modulation scheme for the air interface, results in a higher data rate for the UE. RBs can be scheduled by a base station or self-scheduled by a UE/sidelink device in the case of device-to-device (D2D) sidelink communication.

Frames, subdivided into subframes, represent durations within the communication system, with each frame spanning 10 ms and each subframe lasting 1 ms. Subframes consist of one or multiple adjacent slots, which are defined by a specific number of OFDM symbols and a given cyclic prefix (CP) length. Slots can also include mini-slots or shortened transmission time intervals (TTIs) for transmissions occupying resources scheduled for ongoing slot transmissions.

Slots are structured to include both a control region and a data region. The control region may carry control channels, such as a physical downlink control channel (PDCCH) or a physical uplink control channel (PUCCH), while the data region carries data channels like a physical downlink shared channel (PDSCH) or a physical uplink shared channel (PUSCH). Slots can be dedicated entirely to downlink (DL), uplink (UL), or a combination of both.

Resource elements within an RB may be designated to carry various physical channels, including control, shared, and data channels, as well as pilots or reference signals. These pilots or reference signals enable a receiving device to perform channel estimation, facilitating coherent demodulation/detection of the control and/or data channels.

Communication within the RAN can be either broadcast, multicast, groupcast, or unicast, with the nature of the communication determining the transmission method. For downlink transmissions, a scheduling entity, such as a base station, allocates REs to carry downlink control information (DCI) and other downlink signals. These signals include demodulation reference signals (DMRS), phase-tracking reference signals (PT-RS), positioning reference signals (PRS), channel state information reference signals (CSI-RS), and synchronization signal blocks (SSBs).

Synchronization signals, including a primary synchronization signal (PSS) and a secondary synchronization signal (SSS), along with the physical broadcast control channel (PBCH) in the SSB, provide essential system information for initial access. This information aids UEs in achieving synchronization and identifying the physical cell identity (PCI) of the cell.

For uplink transmissions, scheduled entities utilize REs to carry uplink control information (UCI) to the scheduling entity. UCI can include a variety of packet types and categories, such as pilots, reference signals, and information to assist in decoding uplink data transmissions.

In sidelink communication, the control region of a slot may include a physical sidelink control channel (PSCCH) carrying sidelink control information (SCI), while the data region may include a physical sidelink shared channel (PSSCH) carrying sidelink data traffic. These physical channels are multiplexed and mapped to transport channels for handling at the medium access control (MAC) layer, with transport channels carrying blocks of information called transport blocks (TBs).

Battery Technology and Optimization for 5G Devices:

A basic framework for a battery management system in a 5G communication device optimizing energy consumption is detailed next. A control unit is configured to adjust power allocation to various components of the 5G communication device based on the received energy optimization parameters to minimize energy consumption while maintaining communication performance. The system monitors energy usage, identifies energy-intensive operations, receives optimization parameters, and adjusts power allocation accordingly. Additionally, it includes a simplified approach to monitoring for security breaches within network slices and isolating affected slices, although the primary focus is on energy optimization.

To apply AI for adjusting power allocation in a 5G communication device to save battery, based on the system described, we focus on dynamically identifying energy-intensive operations and implementing tailored energy optimization parameters. The AI component plays a crucial role in analyzing energy usage patterns, generating optimization recommendations, and adjusting power allocation to various device components.

A method for optimizing resource allocation in a 5G network, comprising:
  monitoring network traffic and resource usage across a plurality of network nodes:
  analyzing the monitored data to identify patterns of resource demand:
  determining optimal resource allocation strategies based on the identified patterns, wherein the strategies aim to balance load across the network nodes and minimize energy consumption; and
  implementing the determined resource allocation strategies by dynamically adjusting resource distribution among the network nodes.

In implementations, the network nodes may consist of components such as 5G base stations, edge computing units, and user devices. The method involves analyzing collected data by employing statistical analysis to forecast upcoming network traffic patterns. It also includes developing optimal resource allocation strategies that may involve redistributing bandwidth and processing power. The method encompasses adjusting the operational status of network nodes in line with these resource allocation strategies to minimize energy usage. Additionally, the method takes into account the energy efficiency of each network node when determining resource allocation. To case network congestion, the method may include rerouting data traffic in congested network areas. The resource allocation strategies are designed to be updated dynamically: informed by ongoing monitoring. Network administrators receive feedback on the effectiveness of the resource allocation strategies. Furthermore, the method includes provisions for the network to switch to renewable energy sources during times of high energy demand to optimize energy consumption.

A system for optimizing resource allocation in a 5G network using artificial intelligence (AI), comprising:
  a data collection module configured to gather information on network traffic and resource usage:

an AI-based analysis module configured to process the gathered information to identify resource demand patterns and predict future demands:

a strategy formulation module configured to generate optimal resource allocation strategies based on the analysis, aimed at enhancing network efficiency and reducing energy consumption; and an implementation module configured to execute the generated strategies by dynamically adjusting resources across the network.

In implementations, the AI-based analysis module is powered by a machine learning algorithm that has been trained with historical data on network performance. This system's strategy formulation module is responsible for creating strategies that anticipate and prepare for increases in network load through predictive resource provisioning. The implementation module in this system is tasked with distributing computational resources across edge computing units to enhance data processing efficiency. Additionally: the system includes a user interface designed for network administrators to track the success of the strategies in place. The strategies devised by the system allow for the dynamic modification of operational modes of network nodes to save energy. The AI-based analysis module leverages real-time data analytics to make immediate adjustments to these strategies as needed. A key feature of the system is its ability to give precedence to essential network traffic during times of high demand, guided by the strategic framework. The system also integrates an energy management module, which is set up to maximize the utilization of renewable energy sources within the network, aligning with the strategic objectives. Furthermore, the implementation module is equipped with a feedback loop that connects back to the AI-based analysis module, enabling the refinement of strategy creation based on the results observed. To apply AI for adjusting power allocation in a 5G communication device to save battery, based on the system described, the system focuses on dynamically identifying energy-intensive operations and implementing tailored energy optimization parameters. The AI component operation includes analyzing energy usage patterns, generating optimization recommendations, and adjusting power allocation to various device components.

AI can be applied to adjust power allocations to save battery in this system. The AI model begins by collecting and analyzing data related to energy usage patterns of the 5G communication device. This includes monitoring the power consumption of various device components such as the processor, display: network module, and sensors under different operating conditions. The AI model, likely employing machine learning algorithms, analyzes this data to identify operations or conditions that are particularly energy-intensive. For example, it might find that certain signal processing tasks or display brightness levels disproportionately affect battery life.

Generating Energy Optimization Recommendations: Based on its analysis, the AI model generates recommendations for optimizing energy consumption. These recommendations are tailored to the specific findings of the analysis. For instance, if the analysis reveals that high display brightness significantly drains the battery, the AI model might recommend reducing brightness levels under certain conditions. Similarly, if certain network operations are found to be energy-intensive, the model could suggest optimizing signal transmission power or adjusting the network module's operation mode.

Implementing Energy Optimization Recommendations: Once the recommendations are generated, the next step is to implement them to adjust power allocation across the device's components. This involves dynamically modifying the operational parameters of these components based on the received optimization parameters. For example: Processor: Adjusting the clock speed or switching to a lower power mode when high performance is not required. Display: Automatically reducing brightness or switching to a more energy-efficient color scheme under certain conditions. Network Module: Modifying signal transmission power or toggling between different network types (e.g., 5G. LTE) based on current network requirements and energy optimization goals. Sensors: Reducing the sampling rate of sensors that are not critical to the current operation or user activity.

A method for optimizing energy consumption in a 5G communication device using artificial intelligence (AI), comprising:

collecting data related to energy usage patterns of the 5G communication device;

analyzing the collected data using an AI model to identify energy optimization opportunities:

generating energy optimization recommendations based on the analysis; and implementing the energy optimization recommendations to adjust power allocation to various components of the 5G communication device.

In implementations, the AI model employs a machine learning algorithm that is trained using a dataset filled with historical energy usage data. This model is tasked with analyzing collected data to forecast future energy consumption patterns. The energy optimization recommendations generated by the model include directives for entering a low power mode during anticipated periods of reduced communication activity. Additionally, these recommendations suggest adjusting antenna beamforming parameters to lower energy use. The implementation of these energy optimization recommendations involves the dynamic reallocation of energy to the device's battery during its charging process. The AI model undergoes periodic updates to incorporate new energy usage data, ensuring its recommendations remain accurate and effective. It is also designed to adapt its energy optimization suggestions based on learned user behavior patterns. The method includes a process for providing feedback to the AI model regarding the success of the energy optimization recommendations, allowing for continuous improvement. Lastly, the AI model operates on a cloud-based server, which maintains communication with the 5G communication device to implement these optimizations.

A small cell network system for high-frequency 5G communications, comprising:

a plurality of small cell base stations configured to operate at a frequency above 24 GHz:

a network management unit configured to dynamically control the small cell base stations based on user density and data demand; and a backhaul communication link connecting the small cell base stations to a core network, wherein the backhaul communication link is optimized for high-frequency signal transmission.

In implementations, small cell base stations are outfitted with beamforming antennas, enabling focused signal transmission and reception to enhance network efficiency and coverage. The network management unit leverages machine learning algorithms to anticipate user density and data demand, optimizing network resources and user experience.

High-speed data transfer is facilitated through the use of millimeter-wave technology in the backhaul communication link, supporting the increased bandwidth requirements of modern applications.

To promote sustainability: the small cell base stations are powered by renewable energy sources and are equipped with energy storage units. These units ensure continuous operation during periods when renewable energy generation is insufficient. Additionally, to further conserve energy: the base stations are designed to enter a sleep mode during low network usage periods.

The network management unit possesses the capability to dynamically reroute data traffic among the small cell base stations. This function balances the network load and reduces energy consumption by efficiently distributing data traffic based on current network conditions and demand.

Designed for flexibility, the small cell base stations can be deployed in various environments, including both urban and rural settings, ensuring wide network coverage. Integration with existing infrastructure is emphasized to minimize environmental impact, allowing for the seamless incorporation of these base stations into the landscape without extensive alterations or disruptions.

A method for optimizing small cell deployment in a high-frequency 5G network using artificial intelligence (AI), comprising:
  collecting data related to network usage and environmental conditions at multiple small cell base station locations:
  processing the collected data using an AI model to determine optimal small cell base station deployment configurations:
  generating deployment recommendations for the small cell base stations to maximize coverage and minimize interference; and
  implementing the deployment recommendations across the small cell network.

In implementations, the AI model incorporates a neural network that has been trained using historical data on network performance. The deployment recommendations generated by this model include determining the optimal heights and angles for antenna installation to maximize network efficiency. The AI model is designed to continuously track network performance and dynamically update these deployment recommendations as network conditions change. Additionally, the model suggests strategies for conserving energy during periods of low network usage and considers the integration of renewable energy sources when formulating these recommendations. To stay current with evolving network usage patterns and environmental factors, the AI model is updated periodically. The model operates on a distributed computing system, enabling it to process data from multiple small cell base stations concurrently. It is also capable of forecasting future network usage spikes, allowing for proactive adjustments to the small cell network. Furthermore, the AI model is tasked with optimizing the backhaul communication link, taking into account the deployment recommendations to enhance overall network performance.

Integration of Renewable Energy with 5G Networks:

A 5G network infrastructure system powered by renewable energy sources, comprising:
  a plurality of 5G base stations:
  renewable energy generation units connected to each of the 5G base stations, wherein the renewable energy generation units are selected from the group consisting of solar panels, wind turbines, and hydroelectric generators:
  energy storage devices connected to the renewable energy generation units for storing excess generated energy; and
  a management unit configured to dynamically allocate energy from the energy storage devices to the 5G base stations based on real-time energy demand and generation data.

In implementations, the management unit is designed to prioritize energy allocation to essential network functions during times of reduced energy generation, ensuring critical operations remain uninterrupted. The system incorporates renewable energy generation units, such as solar panels, which are enhanced with solar tracking mechanisms to optimize energy capture throughout the day. Energy storage is facilitated by lithium-ion batteries, known for their high energy density and efficiency. To further minimize energy consumption, the 5G base stations within the system are equipped with energy-efficient hardware components.

Predictive analytics are employed by the management unit to anticipate energy demand, allowing for proactive adjustments in energy allocation. A remote monitoring interface is included for overseeing the energy generation and consumption within the 5G network infrastructure, enabling efficient management. The renewable energy generation units can operate in a grid-tied mode, permitting any surplus energy to be returned to the electrical grid, enhancing the system's sustainability.

Additionally, the management unit implements demand response strategies to curtail energy usage during peak demand times, contributing to overall energy efficiency. During periods of low network activity, the 5G base stations are capable of automatically transitioning to an energy-saving mode, further reducing energy consumption. This comprehensive approach ensures the system not only supports the advanced connectivity needs of 5G technology but does so in an environmentally responsible and energy-efficient manner.

A method for optimizing the integration of renewable energy sources with 5G network infrastructure using artificial intelligence (AI), comprising:
  collecting data related to energy generation from renewable energy sources and energy consumption by 5G network infrastructure;
  analyzing the collected data using an AI model to identify patterns and predict future energy generation and consumption;
  generating optimization strategies for energy allocation and consumption; and
  implementing the optimization strategies to ensure efficient use of renewable energy in powering the 5G network infrastructure.

In implementations, the AI model employs machine learning algorithms that are trained using historical data on energy generation and consumption. This model facilitates optimization strategies such as modulating the operational status of 5G base stations in alignment with anticipated energy availability. Additionally, the AI model is designed to dynamically manage the charging and discharging cycles of energy storage devices. Optimization strategies also encompass making real-time energy trading decisions, enabling the purchase of additional energy from the grid or the sale of surplus energy. The AI model is adept at optimizing the placement and orientation of renewable energy generation units and incorporates weather forecasting data to estimate energy production from solar and wind sources accurately. It includes load balancing strategies across the 5G network to minimize energy usage during peak demand periods. Implemented on a cloud-based platform, the AI model ensures scalability and efficient real-time data processing. Furthermore, the model is equipped to offer recommendations for enhancing energy efficiency in both the hardware and operational practices of the 5G network. Energy Efficiency by Shared Resources:

A network resource sharing system for enhancing energy efficiency in a 5G network, comprising:
  a plurality of network devices within the 5G network;
  a central management unit configured to monitor resource usage and energy consumption of the network devices;
  a shared resource pool accessible by the network devices, wherein the shared resource pool includes at least one of processing power, storage capacity, and bandwidth; and
  a resource allocation module within the central management unit, configured to dynamically allocate resources from the shared resource pool to the network devices based on current demand and energy efficiency criteria.

In implementations, the central management unit includes an energy monitoring module that tracks the energy savings resulting from the sharing of resources. The shared resource pool features virtualized network functions (VNFs) that can be deployed as needed. The resource allocation module employs predictive analytics to anticipate the demand for network resources, ensuring efficient distribution. Network devices within the system encompass 5G base stations, edge computing nodes, and user equipment. This module is also tasked with giving priority to critical network operations, especially during times of high demand. The shared resource pool is maintained on a cloud computing platform, allowing for scalable and flexible resource management. To further enhance energy savings, network devices are designed to switch to a low-power state when idle. The central management unit is additionally responsible for routing data traffic in an energy-efficient manner within the 5G network. Moreover, the shared resource pool incorporates renewable energy sources, which contribute to powering the network devices sustainably.

A method for optimizing energy efficiency in a 5G network through shared resource allocation using artificial intelligence (AI), comprising:
  collecting data on resource usage and energy consumption from a plurality of network devices within the 5G network;
  analyzing the collected data using an AI model to identify patterns and inefficiencies in resource usage and energy consumption;
  generating recommendations for optimal resource allocation from a shared resource pool to the network devices based on the analysis; and
  implementing the recommendations to dynamically allocate resources to the network devices, thereby enhancing energy efficiency.

In implementations, the AI model employs a machine learning algorithm that has been trained using historical data on network resource usage and energy consumption. This model generates recommendations for reallocating processing tasks among network devices to evenly distribute the load and minimize overall energy usage. It is designed to forecast future demands for network resources and proactively adjust resource allocations to meet these demands efficiently. Additionally, the model suggests strategies for the effective storage and use of renewable energy sources within the network's shared resource pool. It also aims to optimize the timing of resource allocation to align with periods of reduced energy demand from the grid, further enhancing energy efficiency. The implementation of these recommendations includes the automated scaling of virtualized network functions in response to real-time demand. The AI model leverages real-time data from network devices to continually refine its recommendations, ensuring they remain accurate and effective. Deployed on a distributed computing platform, the model guarantees scalability and quick responsiveness to changing network conditions. Moreover, the recommendations extend to optimizing data routing within the 5G network, aiming to reduce energy consumption during data transmission.

Energy Efficiency Strategies for 5G Networks: A system for enhancing energy efficiency in a 5G network, comprising:
  a plurality of network nodes configured to operate with reduced power consumption;
  an AI-based energy management unit configured to implement energy-saving strategies across the network nodes;
  a data collection module for gathering information on network performance and energy usage; and
  an analysis module utilizing AI/ML techniques to process the collected data and generate energy optimization recommendations.

The AI-based energy management unit employs predictive analytics to forecast energy demand and adjust energy allocation preemptively. The energy-saving strategies include adjusting the operational status of network nodes to reduce energy consumption during periods of low network traffic. The AI/ML techniques include deep learning algorithms for analyzing network usage patterns and identifying energy-saving opportunities.

Heterogeneous Wireless Iot

In one embodiment, a 5G IoT system with an energy management controller configured to monitor energy usage, determine optimal energy-saving configurations, and instruct IoT devices to adjust their operational parameters, including a protocol to offload processing and prioritize remote processing workloa as follows:

Monitoring Energy Usage of IoT Devices

The energy management controller, equipped with AI capabilities, continuously monitors the energy usage of IoT devices connected to the 5G network. It collects data on power consumption patterns, operational states, and environmental conditions.

```
class EnergyManagementController:
    def_init_(self):
        self.energy_usage_data={ }
        self.ai_model=load_energy_prediction_model ( )
    def monitor_energy_usage (self, iot_devices):
        for device in iot_devices:
            self.energy_usage_data [device.id]=device.get_energy_usage ( )
```

Determining Optimal Energy-Saving Configurations

The AI algorithm analyzes the collected energy usage data to identify energy-intensive operations and determine optimal energy-saving configurations for each IoT device. This may involve reducing operational frequency, dimming displays, or entering low-power modes during periods of inactivity.

```
def determine_energy_saving_configs (self):
    for device_id, usage in self.energy_usage_data.items ( )
        optimal_config=self.ai_model.predict_optimal_config (usage)
        self.energy_usage_data [device_id] ['optimal_config']=optimal_config
```

Instructing IoT Devices to Adjust Operational Parameters

Once optimal configurations are determined, the energy management controller sends instructions to IoT devices to adjust their operational parameters accordingly. This ensures that devices operate efficiently, conserving energy without compromising their functionality.

```
def instruct_iot_devices (self):
    for device_id, data in self.energy_usage_data.items ( )
        optimal_config=data ['optimal_config']
        instruct_device_to_adjust (device_id, optimal_config)
```

Offloading Processing from the IoT Device

To further conserve energy, the system includes a protocol to offload processing tasks from IoT devices to remote servers or edge computing nodes. This offloading is prioritized based on the workload and the criticality of the tasks, ensuring that essential operations are maintained while less critical processing is handled remotely.

```
def offload_processing (self, iot_device, task):
    if task.is_critical ( )
        process_locally (iot_device, task)
    else:
        remote_server=select_remote_processing_server (task)
        offload_task_to_remote (remote_server, task)
```

Prioritizing Remote Processing Workload

The AI system prioritizes remote processing workloads based on various factors such as task urgency, data sensitivity, and available remote processing resources. This ensures that the most important tasks are processed first and that the overall system operates efficiently.

```
def prioritize_remote_processing (self, remote_processing_queue):
    sorted_queue=sort_tasks_by_priority (remote_processing_queue)
    for task in sorted_queue:
        process_task_remotely (task)
```

By employing AI and machine learning, the energy management controller can optimize the energy efficiency of IoT devices in a 5G network. The system not only reduces energy consumption but also maintains high performance and meets the service requirements of various applications. This approach exemplifies the potential of AI to enhance the sustainability and operational efficiency of 5G IoT systems.

A system for optimizing energy consumption in a 5G-enabled Internet of Things (IoT) network, comprising:
  a plurality of IoT devices configured to perform energy-intensive tasks;
  a 5G communication module associated with each IoT device for wireless data transmission;
  an energy management controller configured to:
  monitor energy usage of the IoT devices;
  determine optimal energy-saving configurations for the IoT devices; and
  instruct the IoT devices to adjust their operational parameters to the determined configurations.

In implementations, the IoT devices encompass a range of smart technologies, including smart thermostats, lighting systems, and industrial machinery. The energy management controller in this system employs a predictive algorithm to anticipate future energy consumption patterns. The 5G communication module within the system is designed to switch to a low-power state during periods of inactivity to conserve energy. The energy management controller has the capability to compile and analyze energy usage data from multiple IoT devices. It is also tasked with determining optimal energy-saving configurations, such as modifying the duty cycles of IoT devices to reduce energy use. Furthermore, the controller is equipped to implement energy harvesting techniques, capturing and reusing energy from the environment. It coordinates energy usage across IoT devices to diminish peak demand loads on the energy grid. The energy management controller can also respond to external signals related to energy pricing, adjusting IoT device operations to optimize costs. Lastly, the controller is configured to take advantage of renewable energy sources whenever they are accessible, promoting sustainable energy consumption within the IoT ecosystem.

A method for optimizing energy consumption in a 5G-enabled Internet of Things (IoT) network, the method comprising:
  monitoring, by an energy management controller, energy usage of a plurality of IoT devices;
  analyzing, by the energy management controller, the monitored energy usage to identify inefficiencies;
  determining, by the energy management controller, optimal energy-saving configurations for the IoT devices;
  instructing, by the energy management controller, the IoT devices to adjust their operational parameters to the determined configurations; and
  communicating, by the IoT devices using a 5G communication module, the adjusted operational parameters to the energy management controller.

In implementations, the IoT devices encompass a variety of smart technologies, including but not limited to smart thermostats, lighting systems, and industrial machinery. This method involves employing a predictive algorithm during the analysis phase to project future energy consumption trends. Additionally, it includes putting the 5G communication module into a low-power state during periods when it is not engaged in active data transmission, conserving energy. The method also entails gathering energy usage data from a multitude of IoT devices to uncover opportunities for collective energy savings. Optimal energy-saving configurations are identified, which involve modifying the duty cycles of the IoT devices to optimize energy use. Furthermore, the method incorporates the application of energy harvesting techniques, which serve to augment the power supply to the IoT devices. It also includes the strategic coordination of energy usage across IoT devices to mitigate peak demand pressures on the electrical grid. Adjustments to the operations of IoT devices are made in response to external signals that reflect energy pricing, allowing for cost-effective energy consumption. Lastly, the method advocates for the use of renewable energy sources to power the IoT devices whenever such options are accessible, promoting sustainable energy practices.

FIG. 7A shows a flowchart for MT access management. In the context of 5G networks, managing access for local Terminal Equipment (TE) leverages the capabilities of Mobile Terminals (MTs) to ensure secure and efficient network access. The network uses a management list within the MT, which plays a crucial role in determining whether to grant network access to a requesting TE. This process is detailed as follows:

Management List Configuration: Within the MT, a management list is configured to contain the identities of local TEs. This list serves as a reference for the MT to verify the legitimacy of TEs attempting to access the network. The management list can include identities of TEs that are allowed or forbidden to access the network, providing a basis for the MT to make informed decisions about access requests.

Authentication Request Handling: When a TE initiates an authentication request to access the network, the request includes the identity of the TE. Upon receiving this request, the MT consults the management list to determine whether the TE's identity is recognized and whether it meets the criteria for network access.

If the TE's identity is found in the part of the management list that contains allowed TEs, the MT proceeds to acquire the identity of the user identity card inserted within it. This identity is then returned to the TE, enabling it to access the network using the credentials associated with the user identity card.

Conversely, if the TE's identity is not found in the allowed section or is specifically listed in the forbidden section of the management list, the MT refuses to return the identity of the user identity card to the TE, effectively denying network access.

Policy-Based Decision Making: In certain scenarios, the decision to grant or deny access may also be influenced by a policy set by the user. This policy can dictate alternative actions when a TE's identity does not straightforwardly match the criteria in the management list.

Service Authority Verification: For TEs that are granted access, the MT further verifies if the requested network services align with the authority information specified for the TE in the management list. This ensures that TEs are only able to access services they are authorized for, enhancing security and resource management.

Network Access and State Management: Successful authentication and service authority verification lead to the TE accessing the network. The MT then updates the current state information of the TE in the management list to reflect its online status. This state management is crucial for monitoring active connections and enforcing network policies, such as limiting the number of TEs that can access the network simultaneously.

Authentication and Key Exchange: The process involves the TE sending its identity to the network, receiving an authentication challenge, and obtaining an authentication response through the MT. Upon successful authentication, the network sends a message of successful authentication to the TE, and the MT updates the TE's state in the management list and provides the necessary keys for network access.

Integrating AI into the security process for managing local Terminal Equipment (TE) access to a network leverages a combination of biometric data, behavioral patterns, and unique user activities identifiable from the Mobile Terminal (MT), providing a more secure and personalized access management system. The system employs an AI-driven multi-factor authentication (MFA) mechanism that combines various identity indicators, including but not limited to facial recognition, voice patterns, typing dynamics, and unique user activities. This approach ensures a robust authentication process that is difficult to bypass by unauthorized users.

1. Biometric Authentication-Facial Recognition and Voice Patterns: Upon receiving an authentication request from a TE, the MT utilizes AI algorithms to analyze the facial image and voice data provided. The AI compares these against a pre-trained model containing authorized users' biometric data. Typing Dynamics: The system also evaluates the typing rate and pattern when the user interacts with the TE. AI algorithms analyze the rhythm and pressure of typing, comparing it to the user's historical data to verify identity.

2. Behavioral and Activity-Based Authentication-Unique User Activities: AI models assess patterns in the user's activities, such as typical login times, frequently accessed services, and common network usage patterns. This information helps to create a behavioral profile that enhances the authentication process. Anomaly Detection: The system continuously monitors for deviations from established behavior patterns. AI-driven anomaly detection algorithms flag unusual activities, triggering additional verification steps or denying access if necessary. Dynamic Access Control and Management where After successful authentication, the system dynamically manages network access based on the user's profile and current network policies.

The system uses machine learning algorithms to decide on the level of access granted to a TE. This decision is based on the user's role, the sensitivity of the requested service, and current network load. AI models can predict peak usage times and adjust access permissions dynamically to ensure optimal network performance and security. The AI system continuously updates its models based on new data, improving its accuracy in recognizing authorized users and detecting potential security threats. It adapts to changes in users' behavior and activities, ensuring that the authentication process remains secure and personalized over time. The system employs AI algorithms for real-time monitoring of network activities, enabling rapid detection and response to potential security threats. AI-driven monitoring tools analyze network traffic and user activities in real-time, identifying potential security breaches or unauthorized access attempts. The system automatically alerts network administrators to suspicious activities, facilitating swift response to mitigate threats. In case of detected anomalies or security breaches, the system can automatically initiate predefined response protocols, such as temporarily restricting access, requiring additional authentication, or isolating affected network segments.

By leveraging AI to enhance the security process, the system not only improves the accuracy and reliability of authentication but also offers a more dynamic and responsive approach to access management and security monitoring. This AI-enhanced system provides a robust framework for securing network access, adapting to evolving security threats, and ensuring a personalized and secure user experience.

In one implementation, a method for network access management leverages a decentralized authentication mechanism that does not rely on a management list for decision-making. The system uses blockchain and smart contracts for secure and transparent authentication processes. A Decentralized Authentication System Blockchain-Based Identity Verification utilizes a blockchain network to store and manage digital identities securely. Each TE is assigned a unique digital identity stored on the blockchain. When a TE requests access to the network, it submits its digital identity for verification. The system implements smart contracts on the blockchain that automatically execute access decisions based on predefined rules. These rules can include criteria such as device security status, user behavior patterns, and other relevant factors that do not rely on a centralized management list. Peer-to-Peer Identity Validation is used. Instead of the MT making the decision, the authentication request and validation process are distributed among multiple nodes in the blockchain network. This ensures a more robust and tamper-resistant verification process, as altering the access decision would require consensus among the majority of nodes. Dynamic Access Tokens are provided, where upon successful authentication, the TE is issued a dynamic access token by the smart contract. This token grants temporary access to the network and can be programmed to expire or renew based on specific conditions, enhancing security and control over network access. All transactions and access decisions made by the smart contracts are recorded on the blockchain, providing a transparent and immutable audit trail. This allows for easy monitoring and auditing of access requests and decisions, improving accountability and trust in the system.

In another aspect, a method for managing access of local Terminal Equipment (TE) to a network, emphasizing the role of a Mobile Terminal (MT) equipped with a user identity card. This method is structured around the use of a management list within the MT, which contains the identities of local TEs. The process unfolds as follows: Authentication Request Handling: Upon receiving an authentication request from a TE, which includes the TE's identity, the MT consults the management list to decide whether to grant access based on the TE's identity. Decision Making: If the TE's identity is found within the management list of allowed TEs, the MT retrieves the identity from the user identity card and shares it with the TE, enabling network access. Conversely, if the TE's identity is not authorized or is explicitly forbidden, the MT refuses to share the identity from the user identity card, effectively denying network access. Management List Configuration: The management list can be segmented into lists of TEs allowed and forbidden from accessing the network. The MT's decision to grant or deny access is influenced by which segment the TE's identity falls into. Service Authority Verification: For TEs granted access, the MT further checks if the requested service's authority identifier matches the TE's authority information in the management list. Access proceeds only if there's a match. Network Access Limitation: The method accounts for network limitations on the number of TEs that can concurrently access the network through an MT. The MT first checks if it's already serving the maximum number of TEs allowed before proceeding with the authentication process. Authentication and Network Access: The TE sends its identity to the network and, upon receiving an authentication request, acquires an authentication response through the MT. Successful authentication leads to the MT updating the TE's state to "online" in the management list and sending necessary keys for network access. If the service communication ends, the network sends a logoff notice to the TE, which is then forwarded to the MT. The MT updates the TE's state to "unused" in the management list. Inactive TE Handling: The MT modifies the state of TEs identified as online but inactive for a preset period to "unused," ensuring accurate management of network resources. Time-Stamped State Information: When modifying a TE's state to "online," the MT stamps the current time on the state information. This timestamp helps manage network access limitations by allowing the MT to assess the duration of a TE's online state. This method emphasizes a structured approach to managing TE access to a network, leveraging a management list within the MT to make informed decisions based on TE identities, service authority, and network access policies. The system applies AI into the authentication process for managing local Terminal Equipment (TE) access in 5G networks, and significantly enhances the system's security and efficiency. This method leverages AI to analyze a wide array of identity indicators beyond traditional management lists, including biometric data, typing dynamics, voice recognition, and unique user activities identifiable from the Mobile Terminal (MT). Here's a restated description of the process, integrating AI-based authentication-AI-Driven Identity Verification: Upon receiving an authentication request from a TE, the MT employs AI algorithms to analyze the request. These algorithms assess a combination of identity indicators such as facial recognition, voice patterns, typing dynamics, and behavioral patterns like login times and service usage. Multi-Factor Authentication (MFA) Process: The AI system evaluates the authentication request against a dynamic management list and additional identity indicators. This multi-factor authentication approach ensures a robust verification process, significantly reducing the risk of unauthorized access. AI-Based Decision Making: The MT, equipped with AI capabilities, makes an informed decision on whether to grant or deny the access request. This decision is based on a comprehensive analysis of the TE's identity indicators and the management list, which includes both authorized and unauthorized TEs. Within the MT, a management list is configured to contain the identities of local TEs. This list serves as a reference for the MT to verify the legitimacy of TEs attempting to access the network. The management list can include identities of TEs that are allowed or forbidden to access the network, providing a basis for the MT to make informed decisions about access requests. Dynamic Access Control: For TEs granted access, the AI system dynamically manages their access permissions. It adapts these permissions in real-time based on the user's profile, current network policies, and the TE's behavior, ensuring secure and efficient network utilization. When a TE initiates an authentication request to access the network, the request includes the identity of the TE. Upon receiving this request, the MT consults the management list to determine whether the TE's identity is recognized and whether it meets the criteria for network access. Decision Making Based on Management List as follows: If the TE's identity is found in the part of the management list that contains allowed TEs, the MT proceeds to acquire the identity of the user identity card inserted within it. This identity is then returned to the TE, enabling it to access the network using the credentials associated with the user identity card. Conversely, if the TE's identity is not found in the allowed section or is specifically listed in the forbidden section of the management list, the MT refuses to return the identity of the user identity card to the TE, effectively denying network access.

Continuous Monitoring and Anomaly Detection: After granting access, the AI system continuously monitors the TE's network activity. It employs anomaly detection algorithms to identify any unusual behavior, enabling real-time threat detection and prevention. Automated Logging and Reporting: All access events and decisions are logged by the AI system, providing a detailed audit trail. Advanced data analytics generate insights into network usage patterns and potential security risks. Learning and Adaptation: The AI system continuously learns from new data, improving its decision-making algorithms over time. This ensures that the authentication process remains secure and personalized, adapting to changes in user behavior and emerging security threats. Policy-Based Decision Making: In certain scenarios, the decision to grant or deny access may also be influenced by a policy set by the user. This policy can dictate alternative actions when a TE's identity does not straightforwardly match the criteria in the management list. Service Authority Verification: For TEs that are granted access, the MT further verifies if the requested network services align with the authority information specified for the TE in the management list. This ensures that TEs are only able to access services they are authorized for, enhancing security and resource management. Network Access and State Management: Successful authentication and service authority verification lead to the TE accessing the network. The MT then updates the current state information of the TE in the management list to reflect its online status. This state management is crucial for monitoring active connections and enforcing network policies, such as limiting the number of TEs that can access the network simultaneously. Authentication and Key Exchange: The process involves the TE sending its identity to the network, receiving an authentication challenge, and obtaining an authentication response through the MT. Upon successful authentication, the network sends a message of successful authentication to the TE, and the MT updates the TE's state in the management list and provides the necessary keys for network access. By leveraging AI for authentication in 5G networks, the system not only enhances security through accurate and dynamic verification of TEs but also improves operational efficiency by automating decision-making and adapting to evolving security landscapes.

FIG. 7A shows an exemplary process for network access by:

Detecting available WLANs by the user terminal, wherein the user terminal is within the coverage of one or more WLANs, each inter-working with a 3GPP system comprising multiple Public Land Mobile Networks (PLMNs), with one functioning as the HPLMN of the user terminal and others functioning as Visited PLMNs (VPLMNs);

Evaluating the detected WLANs based on a set of dynamic criteria, which may include real-time network conditions such as signal strength, bandwidth, latency, user preferences, or historical connection success rates in the current geolocation of the user terminal, or predictions made by a machine learning model based on historical data and user behavior;

Selecting a WLAN for connection from the evaluated WLANs based on the dynamic criteria, wherein the selection does not rely on pre-stored identifications of WLANs directly connecting with the HPLMN but on the optimal match with the dynamic criteria;

Accessing the HPLMN via the selected WLAN, wherein the user terminal utilizes the selected WLAN to establish a connection with its HPLMN, facilitating dynamic and efficient network access based on current conditions, preferences, or predictive analytics.

In one implementation, the following steps can be taken:

Detecting Available WLANs-Scanning for WLANs: The user terminal (UT) scans for available WLANs using its wireless interface. This can be done by listening for beacon frames or sending probe requests and collecting probe responses from nearby access points (APs). Identifying Inter-Working WLANs: The UT identifies which of the detected WLANs are capable of inter-working with the 3GPP system, which includes multiple Public Land Mobile Networks (PLMNs). This can be determined based on information elements in the beacon or probe response that indicate support for 3GPP inter-working. Determining HPLMN and VPLMNs: The UT determines which of the PLMNs function as its Home PLMN (HPLMN) and which function as Visited PLMNs (VPLMNs). This can be based on the UT's subscription information and the PLMN identifiers broadcasted by the WLANs.

Evaluating Detected WLANs-Gathering Real-Time Network Conditions: The UT collects real-time network conditions for each detected WLAN, such as signal strength, bandwidth, and latency. This can be done through active measurements or by analyzing the information provided by the WLANs. Considering User Preferences and Historical Data: The UT takes into account user preferences, such as preferred networks or service providers, and historical connection success rates in the current geolocation. This data can be stored and managed by the UT. Applying Machine Learning: A machine learning model on the UT can predict the performance of each WLAN based on historical data and user behavior. The model can be trained to recognize patterns and make predictions about network quality.

Selecting a WLAN for Connection-Dynamic Criteria Evaluation: The UT evaluates each WLAN against the dynamic criteria gathered in the previous step. This includes comparing real-time network conditions, user preferences, and predictions from the machine learning model. Optimal WLAN Selection: The UT selects the WLAN that best matches the dynamic criteria, ensuring the optimal balance between signal quality, network performance, and user preferences. Accessing the HPLMN via the Selected WLAN-Establishing Connection: The UT establishes a connection with the selected WLAN using standard wireless authentication and association procedures. Accessing HPLMN Services: Once connected to the WLAN, the UT accesses services from its HPLMN, which may involve additional authentication and authorization steps specific to the 3GPP system. Monitoring and Adjustment: The UT continuously monitors the connection quality. If the performance degrades, the UT can re-evaluate the available WLANs and switch to a better-performing network if necessary. This method allows for a dynamic and efficient network access strategy that adapts to changing conditions and user behavior, without relying on pre-stored identifications of WLANs directly connecting with the HPLMN. It utilizes a combination of real-time data, historical information, and predictive analytics to make informed decisions about WLAN selection.

Different Selection Criteria: Implement a selection mechanism that does not rely on pre-defined rules but uses real-time data such as signal strength, network congestion, or user preferences to choose the most suitable WLAN for connection. The process includes:

Detecting available WLANs by the user terminal, wherein the user terminal is within the coverage of one or more WLANs, each inter-working with a 3GPP system comprising multiple Public Land Mobile Networks (PLMNs), with one functioning as the HPLMN of the user terminal and others functioning as Visited PLMNs (VPLMNs);

Evaluating the detected WLANs based on a set of dynamic criteria, which may include real-time network conditions such as signal strength, bandwidth, latency, user preferences, or historical connection success rates in the current geolocation of the user terminal, or predictions made by a machine learning model based on historical data and user behavior;

Selecting a WLAN for connection from the evaluated WLANs based on the dynamic criteria, wherein the selection does not rely on pre-stored identifications of WLANs directly connecting with the HPLMN but on the optimal match with the dynamic criteria;

Accessing the HPLMN via the selected WLAN, wherein the user terminal utilizes the selected WLAN to establish a connection with its HPLMN, facilitating dynamic and efficient network access based on current conditions, preferences, or predictive analytics.

User Intervention: Allow the user to manually select the preferred WLAN from a list of available networks, thereby bypassing the automated comparison and selection process.

Network Aggregation: Instead of selecting a single WLAN, use technology that aggregates multiple WLAN connections to create a single virtual network, which could provide a better user experience without directly matching the stored identifications.

Geolocation-Based Access: Utilize the user terminal's geolocation data to determine the best WLAN to connect to, based on proximity or previously successful connections in the same location. The process includes:

Detecting available WLANs by the user terminal, wherein the user terminal is within the coverage of one or more WLANs, each inter-working with a 3GPP system comprising multiple Public Land Mobile Networks (PLMNs), with one functioning as the HPLMN of the user terminal and others functioning as Visited PLMNs (VPLMNs);

Determining the geolocation of the user terminal and identifying WLANs that are geographically proximate to the user terminal's current location;

Selecting a WLAN for connection from the identified geographically proximate WLANs based on the user terminal's geolocation and historical connection data, wherein the selection is made without the need for comparing the WLAN's identification with pre-stored identifications of WLANs directly connecting with the HPLMN;

Accessing the HPLMN via the selected WLAN, wherein the user terminal establishes a connection with its HPLMN through the geographically selected WLAN, thereby utilizing geolocation data to facilitate network access.

Machine Learning: Employ machine learning algorithms to predict the best WLAN for connection based on historical data and user behavior, rather than a static list of identifications.

Blockchain Technology: Use a decentralized approach with blockchain technology to securely manage and authenticate WLAN connections without the need for pre-stored identifications.

Virtual Private Network (VPN): Implement a VPN solution that allows users to connect to their home network securely over any WLAN without the need for identification matching.

In a blockchain implementation for managing local Terminal Equipment (TE) accessing a network, the management list containing the identity of the local TE is stored on a blockchain.

Blockchain-Based Management List: Instead of configuring the management list in the Mobile Terminal (MT), the list is stored on a blockchain. This list includes identities of TEs allowed or forbidden to access the network. The blockchain ensures that the list is tamper-proof and can be trusted by all parties involved.

Authentication Request: When a TE sends an authentication request to the MT, the MT retrieves the TE's identity and checks it against the blockchain-stored management list.

Blockchain Verification: The MT queries the blockchain to verify whether the TE's identity is on the allowed list or the forbidden list. This verification is done using smart contracts that execute predefined rules for access management.

Access Decision: If the TE's identity is on the allowed list and not on the forbidden list, the smart contract automatically allows the MT to acquire an identity from the user identity card and return it to the TE for network access. If the TE is on the forbidden list or not on any list, the smart contract enforces the policy set by the user, which could be to deny access.

Network Access Using Blockchain-Verified Identity: Once the TE's identity is verified and approved by the blockchain, the TE can access the network using the identity provided by the MT.

Updating the Blockchain: After successful authentication, the MT updates the current state information of the TE on the blockchain to indicate an online state. Similarly, when the TE logs off or is inactive for a preset period, the MT updates the blockchain to indicate an unused state.

Time Stamping: The blockchain records the time of each state change for the TE. This timestamp can be used to enforce policies such as session timeouts or to check the activity status of a TE.

Smart Contract Policy Enforcement: The smart contract on the blockchain can also enforce additional rules, such as checking the authority identifier of the service requested by the TE and ensuring it matches the authority information for the TE stored on the blockchain. The smart contract will manage a list of allowed and forbidden TEs, handle authentication requests, and enforce access policies based on the TE's identity and possibly additional criteria such as service authority identifiers. The exemplary smart contract includes the following functionalities:

Storage of TE Identities: Maintain two lists-one for allowed TEs and one for forbidden TEs.

Authentication Requests Handling: Process authentication requests from TEs, checking against the allowed and forbidden lists.

Access Decision: Make decisions on whether to grant or deny access based on the TE's identity and, if applicable, service authority identifiers.

State Management: Update and maintain the current state information of TEs (e.g., online, offline).

An exemplary Smart Contract in Solidity is provided in the provisional application for reference. This smart contract provides a basic framework for managing TE access control on a blockchain. It can be extended with additional features such as handling service authority identifiers, integrating with external systems, or adding event logging for transparency and auditability. By using blockchain technology, the system ensures a secure, transparent, and immutable record of TEs' identities and their access rights. Smart contracts automate the decision-making process based on the data stored on the blockchain, reducing the need for manual intervention and increasing the efficiency and security of the network access management process.

In another implementation, a method for managing a local Terminal Equipment (TE) accessing a network involves a Mobile Terminal (MT) with a management list containing the identity of the local TE and a user identity card inserted in the MT. The process includes steps for authentication, decision-making based on the management list, and network access or denial based on these decisions.

Step 1: Receiving Authentication Request: The MT receives an authentication request identity message from the local TE. This message contains the identity of the TE. The first critical step involves parsing this message to extract the TE's identity. This requires implementing a message parser that can handle various formats of identity messages and extract relevant information accurately.

Step 2: Decision Making Based on Management List: The MT then decides whether to accept the request based on the TE's identity information in the management list. This involves the AI searching the management list for the TE's identity to determine if it's allowed or forbidden access based on a number of variables including security considerations as detailed above. The AI data structure optimization for quick lookup, such as using hash tables or binary search trees, to manage the list of allowed and forbidden TEs efficiently.

Step 3: Acquiring and Returning Identity: If the decision is to accept the request, the MT acquires the identity of the user identity card and returns this identity to the TE. This step involves interfacing with the user identity card, which could be a SIM, USIM, or ISIM, to retrieve the user's identity.

Step 4: TE Accesses the Network: Upon receiving the identity from the MT, the TE uses this identity to access the network. This involves the TE sending the identity to the network side, performing authentication, and, upon successful authentication, receiving keys information from the MT to access the network. Implementing this step requires secure transmission of identity and keys information between the TE, MT, and the network.

Step 5: Handling Logoff Notices: The method also includes steps for handling logoff notices from the TE, updating the current state information of the TE in the management list, and dealing with TEs that have not sent a logoff notice within a preset period. Implementing these steps involves time-stamping state information changes and periodically checking the timestamps to update the state information as needed.

Figure 7B:
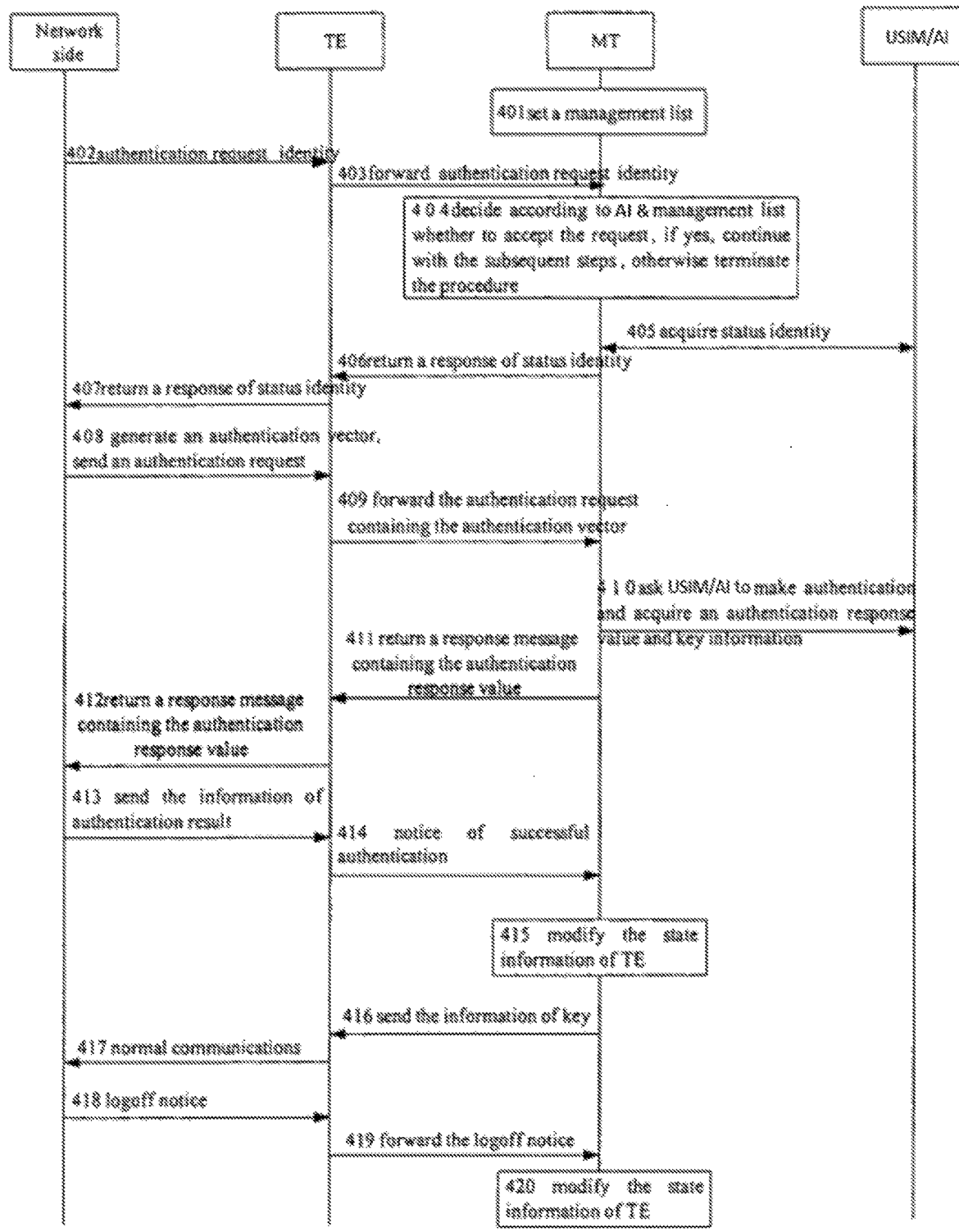
-FIG. 7B illustrates AI-authenticated network access.

FIG. 7B shows a diagram incorporating AI-based identity verification for managing local Terminal Equipment (TE) access in a 5G network involves enhancing the traditional method, which relies on a management list within the Mobile Terminal (MT) and a user identity card. The AI-enhanced process includes the following steps:

Step 401 Receiving Authentication Request: After the MT receives an authentication request identity message from the TE, the AI system begins its analysis.

Step 402: The MT employs AI algorithms to assess the identity of the TE using a variety of identity indicators, such as biometric data, typing dynamics, voice recognition, and behavioral patterns. The TE, when attempting to access the network and use its services, pairs with a nearby MT via a local transmission protocol such as Bluetooth or infrared. The TE uses the identity of the USIM or AI validation in the MT as its account for network access. The MT, with AI capabilities, decides whether to accept the request by comparing the TE's identity against the management list and the additional AI-derived identity indicators. Receiving an identity authentication signal from the TE involves the Mobile Terminal (MT) evaluating the TE's identity against a predefined list using statistical multifactor verification. This process typically includes multiple factors for authentication, such as something the user knows (like a password), something the user has (like a mobile device), and potentially something the user is (like biometric data). The statistical multifactor verification assesses the combination of these factors to determine the authenticity of the TE's identity. In one scenario, the MT would receive an authentication signal from the TE, which could be in the form of a request for access or a specific action that requires verification. The MT then initiates the evaluation process by comparing the TE's provided identity information with a predefined list of authorized identities. This list may include usernames, passwords, device identifiers, or biometric data associated with approved users. The statistical multifactor verification involves analyzing the combination of factors presented by the TE to establish a level of confidence in their identity. For example, if the TE provides a correct password and successfully completes a biometric scan that matches stored data, this strengthens the verification process. The statistical analysis considers the probability of each factor being accurate and combines them to make an overall assessment of identity authenticity. When applying AI to verify the identity authentication signal received from the TE, the process becomes more sophisticated and efficient. AI algorithms can enhance the verification process by analyzing and interpreting complex patterns in the authentication data provided by the TE. Here's how the scenario unfolds: Receiving Authentication Signal: The Mobile Terminal (MT) receives an identity authentication signal from the TE, triggering the verification process. AI-Powered Identity Evaluation: The MT leverages AI algorithms to evaluate the TE's identity against a predefined list using statistical multifactor verification. The AI system can process various forms of authentication data, such as passwords, biometric scans, device identifiers, or behavioral patterns. Multifactor Analysis: AI algorithms analyze multiple factors presented by the TE for identity verification. This could include analyzing keystroke dynamics, facial recognition, voice patterns, or other biometric data alongside traditional authentication methods. By comparing the TE's authentication data with historical patterns and known behaviors, AI can detect irregularities that human analysis might overlook. By integrating AI into the identity verification process, organizations can streamline authentication procedures, improve accuracy, and enhance security measures against unauthorized access attempts. The use of AI in identity verification adds a layer of intelligence and automation that complements traditional multifactor authentication methods, making the overall process more robust and efficient.

Step 403: Once linked with the MT, the TE forwards the authentication request identity message from the network to the MT. This message includes the TE's identity and the type of service requested, which is indicated through the local transmission protocol rather than directly in the message from the network.

Step 404: The MT, upon receiving the authentication request, decides based on the TE's identity in the management list whether to accept the request. If the TE is allowed access, the MT proceeds to Step 405; if forbidden, the MT rejects the request and terminates the procedure. If the TE's identity is neither explicitly allowed nor forbidden, the MT may reject the request, prompt the user for a decision, or decide based on a user policy. Granting or Denying Access:

If the AI system validates the TE's identity and it aligns with the management list of allowed TEs, the MT acquires the identity from the user identity card and returns it to the TE, allowing network access.

If the TE's identity is not validated or is on the list of forbidden TEs, the MT refuses to return the identity of the user identity card, and the procedure is terminated Step 405: If the request is accepted, the MT retrieves the user status identity information from the USIM, such as the IMSI or a pseudonym assigned by the network.

Step 406: The MT sends a response message containing the identity to the TE via the local transmission protocol.

Step 407: The TE forwards the response message with the identity to the network.

Step 408: The network generates an authentication vector based on the identity and sends an authentication request to the TE Step 409: The TE forwards the authentication request to the MT.

Step 410: The MT requests the USIM to calculate based on the authentication vector to verify the network's validity. Upon passing, the MT acquires the authentication response value and key(s) from the USIM.

Step 411: The MT sends an authentication response message containing the value to the TE.

Step 412: The TE forwards the authentication response message to the network.

Step 413: The network verifies the authentication response value. If it matches, the network sends a successful authentication message to the TE, allowing access. If not, it sends a failed authentication message.

Step 414: The TE determines whether the message received is a successful authentication or a failed one. If successful, it sends a notice to the MT; otherwise, the procedure ends.

Step 415: Upon receiving a successful authentication notice, the MT updates the TE's state in the management list to "online" if the TE is allowed access, then proceeds to Step 416.

Step 416: The MT sends the key(s) information to the TE, which the TE uses to access the network.

Step 417: The TE establishes a connection with the network and communicates normally.

Step 418: When service communication ends, the network sends a logoff notice to the TE.

Step 419: The TE forwards the logoff notice to the MT, which includes the type of authority being logged off.

Step 420: Upon receiving the logoff notice, the MT updates the TE's state in the management list to "unused" if the TE is allowed access, or terminates the procedure if not.

Step 421: If the MT does not receive a logoff notice from a TE that has been online for a preset period, the MT changes the TE's state to "unused."

Step 422: When the MT updates the TE's state to "online," it timestamps the state information. If a new authentication request is received and the MT is at its limit for serving TEs, it checks the timestamp. If the time exceeds a threshold, the MT changes the TE's state to "unused"; otherwise, it refuses the new request and ends the procedure.

Step 423: The TE authenticates with the network using the identity and decides based on the authentication response message. If successful, it notifies the MT, receives key(s) information, and accesses the network. If not, the procedure ends.

Step 424: The MT decides based on the authentication response message. If successful, it sends key(s) information to the TE for network access. If not, the procedure ends.

Step 425: Each MT has at least one management list corresponding to a user identity card, which may be a GSM SIM, a 3GPP USIM, or an IP multimedia subsystem ISIM.

This method outlines the steps for a TE to access a network using the identity from a user identity card in an MT, with decisions based on a management list and user policies, and includes steps for authentication, key exchange, and state management. Upon successful authentication and service authority verification, the TE accesses the network. The MT updates the TE's state in the management list to reflect its online status, and the necessary keys for network access are provided to the TE. If a TE remains in an online state without activity for a preset period, the AI system may change the state to "unused" to manage network resources efficiently. By integrating AI into the authentication process, the system can provide a more secure and efficient method for managing TE access to the network, leveraging advanced identity verification techniques and dynamic decision-making capabilities.

In a wireless communication network, a subscriber unit may transmit traffic data to the network on a first type of channel (e.g., a data traffic channel) and control information to the network on a second type of channel (e.g., a maintenance channel) that does not carry traffic data. The control information may be transmitted on the second type of channel during specific time periods that do not coincide with the transmission of traffic data on the first type of channel. To optimize this process, AI algorithms are employed to dynamically select the optimal channels for transmitting traffic data and control information based on real-time network conditions, historical data analysis, and predictive modeling. This ensures efficient use of network resources and minimizes interference.

FIG. 8 illustrates a wireless communication system (22) that incorporates the AI Power & Quality determination (AIPQ) module as detailed below. This system comprises multiple subscriber terminals (24), also known as access terminals, which establish wireless connections with a base station processor (26) via wireless links (30). The base station (26) is further connected to the Internet (28) through a wired link (32), serving as a gateway for the access terminals (24). These access terminals (24) facilitate wireless Internet access for various customer premises equipment (CPE) (32), including but not limited to desktop PCs (32a, 32c), personal digital assistants (PDAs) (32b), wireless phones (32d), and other devices such as laptops, pagers, and automotive telematics devices, which are not depicted. It's important to note that the wireless functionality provided by the access terminal (24) can be integrated into a standalone device, such as a subscriber access unit, or embedded within the CPE (32) unit. Regardless of the configuration, the CPE can communicate with the Internet (28) through the wireless link (30) and the base station (26).

The wireless links encompass both a forward link (34) and a reverse link (36) to enable duplex communication. The forward link (34) supports wireless channels for conveying messages from the base station (26) to the access terminal (24), while the reverse link (36) supports wireless channels for conveying messages from the access terminal (24) to the base station.

Each access terminal (24) periodically transmits a synchronization message via the reverse link (36) to the base station (26). This synchronization message contains time tracking and power control information sufficient to maintain the access terminal in at least an idle state, thereby ensuring synchronization with the base station (26). In response, the base station sends a power control message via the forward link (34). This message includes power control commands to direct the power level of subsequent messages, allowing the access terminal (24) to remain synchronized with the base station (26). The power level is determined by a power level controller (38) at the base station, which computes a target power level for both the idle and active data transmission states.

Furthermore, the forward (34) and reverse (36) links also comprise data traffic channels for transmitting wireless messages with a data payload. These data traffic channels are allocated by the base station (26) to an access terminal (24) when the access terminal is set to send or receive data. A data transmission state, further elaborated below, indicates whether the access terminal (24) is allocated a data traffic channel. When the data transmission state is active, the synchronization messages provide a phase reference for the messages transmitted on the data traffic channels, in addition to time tracking and power control.

The process of managing power levels for synchronization messages and data transmission involves a dynamic interaction between the base station and the access terminals. The base station, acting as the central control unit with learning machine detection of target power levels for both idle and active data transmission states to the access terminals. These power levels are crucial for maintaining efficient and reliable communication within the 5G network.

The base station AI determines these target power levels based on various factors, including the type of data transmission state (active or idle), the quality of the received signal, and the specific requirements of the network architecture. For instance, during periods of active data transmission, the base station may instruct the access terminal to transmit at a higher power level to ensure robust communication. Conversely, in idle states, lower power levels are used to conserve energy and reduce interference.

The access terminal, upon receiving power control messages from the base station, adjusts its transmission power accordingly. This adjustment is vital for optimizing the network's performance, ensuring that the transmitted signals are at the appropriate power level to reach the base station effectively without causing unnecessary interference to other users.

Moreover, the base station continuously monitors the received signal quality to make real-time adjustments to the power control messages. This monitoring helps to compensate for various factors that might affect the signal quality, such as the distance between the access terminal and the base station, physical obstructions, and interference from other sources.

In addition to managing power levels for synchronization messages, the base station and access terminals also coordinate the transmission of data packets. This coordination involves determining the optimal timing and power levels for data transmission, taking into account the network's current load, the quality of service requirements, and the specific characteristics of the 5G technology, such as beamforming and massive MIMO. The learning machine in this system performs the following:

Dynamic Power Level Management: AI algorithms analyze real-time network conditions, user demand, and device capabilities to dynamically adjust the power levels for synchronization messages and data transmission. This ensures optimal signal strength and minimizes interference, enhancing network performance and energy efficiency.

Intelligent Synchronization: Utilizing machine learning, the system predicts the most effective timing for synchronization messages, ensuring seamless coordination between the base station and access terminals. This improves the accuracy of time-sensitive operations and reduces latency.

Predictive Network Maintenance: By continuously monitoring network health and performance data, AI can predict potential failures or degradation in network components. This allows for proactive maintenance, reducing downtime and improving network reliability.

Optimized Resource Allocation: AI-driven algorithms dynamically allocate network resources, such as bandwidth and channels, based on real-time traffic patterns and user demand. This ensures efficient use of network resources, maximizing throughput and minimizing congestion.

Enhanced Security Measures: AI models detect and mitigate security threats in real-time by analyzing network traffic for anomalies. This proactive approach to security keeps the network safe from potential attacks and unauthorized access.

Adaptive Data Transmission: AI optimizes data transmission rates and protocols based on current network conditions, user equipment capabilities, and application requirements. This adaptive approach ensures high-quality service delivery across diverse scenarios.

Automated Network Slicing: Leveraging AI, the network can automatically create and manage virtual network slices tailored to specific service requirements. This enables efficient resource utilization and supports diverse use cases with varying performance needs.

Real-Time Interference Management: AI algorithms continuously monitor the network for sources of interference and dynamically adjust network parameters to mitigate their impact. This ensures consistent and reliable network performance.

Intelligent Traffic Management: By analyzing traffic flow and patterns. AI optimizes routing and load balancing, reducing latency and improving the overall user experience.

Self-Optimizing Networks (SON): AI enables networks to self-configure, self-optimize, and self-heal, significantly reducing the need for manual intervention and allowing the network to adapt to changing conditions autonomously.

By integrating AI into 5G networks, engineers can leverage these capabilities to enhance network performance, reliability, and security: paving the way for innovative services and applications that require high-speed, low-latency communication.

Overall, the dynamic management of power levels and data transmission in a 5G network is a complex process that requires sophisticated algorithms and real-time communication between the base station and access terminals. This process is essential for maximizing the efficiency, reliability, and performance of the 5G network, enabling it to support a wide range of applications and services with varying requirements for speed, latency, and connectivity.

Synchronization messages used solely for time tracking synchronization and power control require less power compared to those used to provide phase reference during the active data transmission state. Consequently, according to the present invention, synchronization messages are transmitted at a reduced power level in the idle data transmission state. Additional power is allocated for the synchronization message when it is also employed for phase reference. Thus, synchronization messages are transmitted at a lower power level in the idle data transmission state than in the active data transmission state.

Additionally: machine learning techniques are employed to predict the optimal time periods for transmitting control information and traffic data, thereby optimizing network capacity and reducing latency. The subscriber unit also transmits a quality level indicator on the second type of channel to assist in determining link quality. AI is deployed to analyze the transmitted quality level indicators in conjunction with real-time network performance data, dynamically adjusting the quality level indicators to enhance the accuracy of link quality assessments and enable more precise network adjustments.

The subscriber unit receives first power commands for the first type of channel from the network and second power commands for the second type of channel from the network. AI is integrated to intelligently interpret and respond to these power commands, predicting optimal power levels for future transmissions by analyzing past commands, current network conditions, and anticipated network demands. This integration of AI enhances energy efficiency while maintaining network performance.

Machine learning is further utilized to provide recommendations for adjusting transmission power levels on both types of channels, ensuring optimal signal strength and minimizing interference. The system can automatically signal when the subscriber unit has traffic data to send, based on predictive analytics considering past data transmission patterns and current network usage. This improves the timing and efficiency of data transmissions. Machine learning manages the maintenance channel more effectively, predicting when control information needs to be transmitted and scheduling transmissions at the most opportune times to reduce network congestion and optimize bandwidth usage. For channels not transmitted continuously: the system can schedule transmissions at the most opportune times, further reducing network congestion and optimizing bandwidth usage.

AI is incorporated to analyze received power commands before and after the transmission of the second type of channel, setting more accurate transmission power levels to improve network efficiency and reduce the risk of interference. The system manages multiple transmission intervals more effectively, determining the optimal duration and timing for each interval based on network traffic analysis and predictive modeling. Furthermore, the system optimizes the use of the data traffic channel, ensuring that traffic data is transmitted efficiently and without unnecessary delays, based on real-time network conditions and predictive analytics.

By integrating these AI-driven enhancements, the system and method become more adaptive, efficient, and capable of handling the complexities of modern communication networks, enabling informed decisions that optimize network performance, improve energy efficiency, and ensure high-quality communication services.

In one embodiment, the subscriber unit implements the AIPQ module in a circuit or system-on-chip (SoC) capable of handling the required processing power and memory for running AI/ML models. For example, the SoC can have hardware accelerators (e.g., GPUs, TPUs) for efficient AI/ML computations. The circuit has the necessary RF components (e.g., transceivers, antennas) to transmit and receive data on the first and second types of channels. The Develop or train AI/ML models for channel selection, time period prediction, quality level indicator adjustment, and power command management.

The AI Channel Management module utilizes the AI/ML models to dynamically select the optimal channels for transmitting traffic data and control information based on real-time network conditions, historical data analysis, and predictive modeling. The system transmits control information on the second type of channel during specific time periods that do not coincide with the transmission of traffic data on the first type of channel. The AI/ML models predict the best time periods for transmitting control information and traffic data to optimize network capacity and reduce latency.

Quality Level Indicator module transmits quality level indicators on the second type of channel. The AI/ML models analyze the transmitted quality level indicators in conjunction with real-time network performance data. The module can dynamically adjust the quality level indicators based on the AI/ML model's recommendations to improve the accuracy of link quality assessments.

Power Command Management module receives first power commands for the first type of channel and second power commands for the second type of channel from the network. The AI/ML models interpret and respond to these power commands. The module sets the transmission power level for the first type of channel in response to the first power commands and not the second power commands, and vice versa, based on the AI/ML model's predictions. The AI/ML models predict optimal power levels for future transmissions by analyzing past commands, current network conditions, and anticipated network demands.

With the above, the subscriber unit circuit leverages AI/ML techniques to optimize channel selection, time period prediction, quality level indicator management, and power command handling, ultimately improving network performance, efficiency, and reliability.

In one implementation, the system performs the following:

Step 1: AI-Driven Channel Selection and Time Period Prediction

First, utilize AI algorithms to dynamically select the optimal channels for transmitting traffic data and control information. This involves analyzing real-time network conditions, historical data, and predictive modeling to minimize interference and optimize network capacity.

```
def select_optimal_channels (real_time_data):
    #Analyze real-time network data and historical performance
    optimal_traffic_channel,
        optimal_control_channel=AI_model.predict_
        channels (real_time_data)
    return optimal_traffic_channel, optimal_control_channel
def predict_optimal_time_periods ( ):
    #Predict the best time periods for data transmission
    optimal_time_periods=AI_model.predict_time_periods
        ( )
    return optimal_time_periods
```

Step 2: Quality Level Indicator Optimization

Implement AI to dynamically adjust quality level indicators based on real-time network performance data. This ensures accurate link quality assessments and enables precise network adjustments.

```
def adjust_quality_level_indicator (real_time_data):
    #Analyze quality level indicators and network performance
    adjusted_quality_level=AI_model.adjust_quality_
        indicator (real_time_data)
    return adjusted_quality_level
```

Step 3: Intelligent Power Command Management

Use AI to intelligently interpret and respond to power commands for both types of channels. AI can predict optimal power levels for future transmissions by analyzing past commands, current network conditions, and anticipated network demands.

```
def manage_power_commands (first_power_commands,
    second_power_commands):
    #Predict optimal power levels for both channels
    optimal_power_level_traffic=AI_model.predict_
        power_level (first_power_commands)
    optimal_power_level_control=AI_model.predict_
        power_level (second_power_commands)
    return    optimal_power_level_traffic,    optimal_
        power_level_control
```

Step 4: Enhanced Communication with Indications

Leverage AI to automatically signal when the subscriber unit has traffic data to send. This can be based on predictive analytics, considering past data transmission patterns and current network usage.

```
def signal_traffic_data_availability ( ):
    #Use AI to predict when to signal traffic data availability
    if AI_model.predict_data_availability ( )
        transmit_signal ( )
```

Step 5: Maintenance and Non-Continuous Channel Management

Apply AI to predict when control information needs to be transmitted and schedule transmissions at the most opportune times to reduce network congestion and optimize bandwidth usage.

```
def manage_maintenance_channel ( ):
    #Predict and schedule control information transmission
    if AI_model.predict_control_transmission ( )
        schedule_transmission ( )
```

The method includes Dynamically Determining Optimal Timing for Transmitting Control Information. The preferred embodiment dynamically optimizes the timing for transmitting control information on a secondary channel to minimize interference and maximize network capacity. This process involves several steps:

Data Collection and Analysis: AI systems continuously collect and analyze data from various sources within the network, including traffic patterns, channel conditions, and interference levels. This data serves as the foundation for making informed decisions.

Prediction Models: Using historical data and real-time inputs, AI models predict future network conditions and traffic demands. These predictions help in identifying the best times to transmit control information, avoiding peak traffic periods and reducing the likelihood of interference.

Optimization Algorithms: AI employs optimization algorithms to determine the optimal timing for control information transmission. These algorithms consider multiple factors, including predicted network conditions, the urgency of the control information, and the impact on overall network performance.

Adaptive Scheduling: The AI system dynamically adjusts the transmission schedule based on ongoing analysis and predictions. This adaptive approach ensures that the network can respond to changing conditions in real-time, maintaining optimal performance.

The method also includes Dynamically Adjusting Quality Level Indicators where the AI dynamically adjusts quality level indicators based on real-time network performance data, ensuring accurate reflection of link quality. This involves:

Real-Time Monitoring: AI systems continuously monitor network performance, including signal strength, latency, packet loss, and other key metrics that influence link quality:

Quality Assessment: Using the collected performance data, AI algorithms assess the current quality of the network link. This assessment considers both quantitative metrics and qualitative factors, such as user experience and application requirements.

Indicator Adjustment: Based on the quality assessment, AI dynamically adjusts the quality level indicators. These adjustments are made in real-time, ensuring that the indicators accurately reflect the current state of the network link.

Feedback Loops: The adjusted quality level indicators are fed back into the network management system, informing decisions about resource allocation, power control, and other aspects of network optimization. This creates a feedback loop that continuously improves network performance. Predictive Maintenance and Anomaly Detection: Beyond immediate adjustments, AI analyzes trends in quality level indicators to predict potential issues before they impact network performance. This predictive capability enables proactive maintenance and anomaly detection, further enhancing network reliability and user satisfaction.

```
#Pseudocode for dynamically determining optimal timing
    for control information transmission
#and adjusting quality level indicators
#Import necessary AI and machine learning libraries
import AI_Model
#Initialize AI model for predicting optimal transmission
    timing and adjusting quality level indicators
    model=AI_Model.initialize ( )
#Function to collect real-time network data
def collect network_data ( )
    #Collect data such as traffic patterns, channel conditions, interference levels, etc.
    return network_data
#Function to dynamically determine optimal timing for
    control information transmission
def determine_optimal_timing (network_data):
    optimal_timing=model.predict_optimal_timing (network_data)
    return optimal_timing
#Function to adjust quality level indicators based on
    real-time network performance
def adjust_quality_level_indicators (network_data):
    adjusted_quality_level=model.adjust_quality_indicator (network_data)
    return adjusted_quality_level
#Main loop for network operation
while True:
    #Collect real-time network data
    network_data=collect_network_data ( )
    #Determine optimal timing for transmitting control
        information
    optimal_timing=determine_optimal_timing (network_data)
    #Adjust quality level indicators
    adjusted_quality_level=adjust_quality_level_indicators (network_data)
    #Transmit control information at the determined optimal timing
    transmit_control_information (optimal_timing)
    #Update quality level indicators in the network
    update_quality_level_indicators (adjusted_quality_level)
    #Wait for the next cycle
    wait_for_next_cycle ( )
```

This pseudocode outlines a high-level approach for integrating AI into the management of 5G networks. The AI_Model represents a placeholder for the actual AI and machine learning models that would be developed and trained to predict optimal transmission timings and adjust quality level indicators based on real-time network data. These models could leverage techniques such as reinforcement learning, deep learning, or other suitable machine learning algorithms tailored to the specific characteristics and requirements of the 5G network.

In one embodiment, during operation, a power control loop for managing transmission power in a wireless communication system. The process is as follows: Receiving Synchronization Messages: The base station receives synchronization messages from the access terminal. These messages are used for maintaining synchronization between the access terminal and the base station, and they carry information about the current data transmission state of the access terminal. Determining Data Transmission State: The base station uses specific metrics to determine the data transmission state (active or idle) of the access terminal. This determination is based on the content of the synchronization messages received as managed by the AI. The data transmission state influences the power level at which the access terminal should transmit. Setting Target Power Levels: Based on the determined data transmission state and AI optimization, the base station sets target power levels for the access terminal's transmissions. These target levels are communicated back to the access terminal via power control messages. The goal is to ensure that transmissions from the access terminal are received at a consistent quality; regardless of the current data transmission state. Adjusting for Quality: The base station assesses the quality of the received synchronization message and apply the AI to determined the power level at which it was sent. The AI assessment helps in understanding whether the access terminal is in an idle or active state. The base station AI considers various factors, including noise, interference, and signal reflection, to accurately determine the transmission power level and adjust the target power level accordingly. Periodic Data Transmission State Indication: In some scenarios, the base station AI receives a separate indication of the data transmission state at predetermined intervals. This can be based on a gating rate or a mutually agreed interval between the base station and the access terminal, facilitating more precise power level adjustments. Using MAC State for Determination: Another method involves employing the Media Access Control (MAC) state to ascertain the data transmission state. Changes in the MAC state, indicated within the synchronization message, prompt the base station AI to adjust the target power level to match the new state. Employing Various Metrics for Power Level Determination: The base station AI uses different metrics, such as Carrier to Interference (C/I) ratio or Signal-to-Noise Ratio (SNR), in addition to the received power level, to fine-tune the target power level for both idle and active states.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method comprising:
  transmitting traffic data to a network on a first type of channel and control information to the network on a second type of channel, wherein the control information is transmitted on the second type of channel in at least one second time period between a first time period in which traffic data is being transmitted on the first type of channel and a third time period in which traffic data is being transmitted on the first type of channel;
  dynamically determining with statistics, artificial intelligence (AI) or a learning machine timing for transmitting control information on the second type of channel to minimize interference and optimize network capacity:
  dynamically adjusting a quality level indicator based on real-time network performance data to reflect link quality:
  transmitting, by the subscriber unit, the quality level indicator on the second type of channel to assist in determining link quality:
  receiving, by the subscriber unit, first power commands for the first type of channel from the network and second power commands for the second type of channel from the network; and
  setting, by the subscriber unit, a transmission power level for the first type of channel in response to the first power commands and a transmission power level for the second type of channel in response to the second power commands.

2. The method of claim 1, further comprising transmitting, by the subscriber unit, an indication on the second type of channel that the subscriber unit has traffic data to send on the first type of channel.

3. The method of claim 1, wherein the second type of channel is a maintenance channel or wherein the second type of channel is not transmitted continuously.

4. The method of claim 1, wherein the transmission power level of the first type of channel after transmission of the second type of channel is based on first power commands received before and after transmission of the second type of channel.

5. The method of claim 1, wherein statistics, artificial intelligence (AI) or machine learning techniques are employed to predict optimal time periods for transmitting control information and traffic data to optimize network capacity and reduce latency.

6. The method of claim 1, comprising deploying statistics, learning machine, or AI to analyze transmitted quality level indicators in conjunction with real-time network performance data to dynamically adjust the quality level indicators.

7. The method of claim 1, comprising using statistics, learning machine, or AI to interpret and respond to first and second power commands, wherein AI predicts optimal power levels for future transmissions by analyzing past commands, current network conditions, and anticipated network demands.

8. The method of claim 1, comprising using statistics, learning machine, or AI to a) provide recommendations for adjusting transmission power levels on both types of channels to ensure optimal signal strength and minimize interference, b) signal when the subscriber unit has traffic data to send based on predictive analytics, c) predict when control information needs to be transmitted and scheduling transmissions at predetermined times to reduce network congestion and optimize bandwidth usage, d) analyze received power commands before and after the transmission of the second type of channel to set more accurate transmission power levels, e) determine the optimal duration and timing for each interval based on network traffic analysis and predictive modeling, or f) ensure that traffic data is transmitted without delays based on real-time network conditions and predictive analytics.

9. A method of claim 1, comprising:
  registering caching wireless resources along with capacities and latency characteristics:
  receiving caching requests from applications, each request including a required data size and a latency requirement:
  selecting a caching resource for each request based on the resource's capacity, latency characteristic, and a latency requirement; and
  allocating selected caching resource to fulfill the caching request.

10. The method of claim 9, comprising sorting the caching requests by their latency requirements in descending order before allocating the caching resources.

11. The method of claim 9, comprising prioritizing the caching resources based on their ability to meet or exceed the latency requirements specified in the requests.

12. The method of claim 9, comprising updating an available capacity of the selected caching resource after allocating the resource.

13. The method of claim 9, comprising reallocating caching resources from lower priority requests to higher priority requests to satisfy latency requirements.

14. The method of claim 9, comprising queueing the caching requests when immediate allocation is not feasible, and processing the queued requests based on priority as caching resources become available.

15. The method of claim 9, wherein the selecting comprises employing a machine learning algorithm to predict an optimal allocation of the caching resources based on historical allocation data and network conditions.

16. The method of claim 9, wherein the registering comprises dynamically updating available capacities of the caching resources as current allocations change.

17. A method of claim 1 for optimizing beamforming in a wireless communication network, comprising:
collecting data from a variety of user equipment (UE) and base stations (BS) within a Radio Access Network (RAN) including Received Signal Strength Indicator (RSSI), channel state information (CSI), and synchronization signals including Primary Synchronization Signal (PSS) and Secondary Synchronization Signal (SSS):
processing the collected data to identify beamforming features to identify patterns and characteristics for beamforming:
using the identified features to predict optimal beamforming parameters:
implementing the predicted beamforming parameters in real-time within the RAN; and
adjusting the communication beams between BSs and UEs based on the predictions.

18. A method of claim 1 for managing beamforming in a 5G New Radio (NR) system, comprising:
broadcasting synchronization signals and system information from a BS to UEs using beam-sweeping to ensure efficient coverage,
selecting downlink and uplink transmit and receive beams for communication with UEs:
implementing beamforming for uplink and downlink channels, including PUCCH and PDSCH; and
adjusting the beamforming parameters in response to changes in channel conditions and UE mobility.

19. The method of claim 18, comprising determining with statistics, machine learning or artificial intelligence s to maintain predetermined communication quality and network throughput.

20. A method of claim 1 for establishing a virtual user-specific serving gateway (v-u-SGW) in a wireless network, the method comprising:
based on predicted network service demand, instantiating a first v-u-SGW on a network device:
assigning a first local v-u-SGW ID to the first v-u-SGW, wherein the first local v-u-SGW ID is unique within the network device:
assigning a host identifier (ID) to the network device:
configuring routing parameters in the network to forward packets specifying both the host ID and the first local v-u-SGW ID to the first v-u-SGW; and
dynamically adjusting the instantiation of v-u-SGWs based on real-time network conditions.

21. A method of claim 1, comprising:
receiving at a network application entity communication service quality information from user equipment:
applying predictive analytics to determine service quality trends and mitigate quality issues:
providing communication service quality information to a network management or control entity, wherein the information includes end-to-end delay, jitter, quality of service (QOS) class, session, or flow associated with the communication service quality information to the network management or control entity.

22. A method of claim 1 for managing caching resources in a network to meet Quality of Service (QoS) requirements, comprising: a resource registry configured to store information about caching resources, including their capacities and latency characteristics: a request handler configured to process caching requests from applications, each request specifying a required data size and a latency requirement: a resource allocator configured to select and allocate caching resources to applications based on the resources' capacities, their latency characteristics, and the applications' latency requirements.

23. A method of claim 1 for optimizing resource allocation in a 5G network, comprising:
monitoring network traffic and resource usage across a plurality of network nodes:
analyzing the monitored data to identify patterns of resource demand:
determining optimal resource allocation strategies based on the identified patterns, wherein the strategies aim to balance load across the network nodes and minimize energy consumption; and
implementing the determined resource allocation strategies by dynamically adjusting resource distribution among the network nodes.

24. A method of claim 1 for optimizing resource allocation in a 5G network, comprising:
monitoring network traffic and resource usage across a plurality of network nodes:
analyzing the monitored data to identify patterns of resource demand:
determining optimal resource allocation strategies based on the identified patterns, wherein the strategies aim to balance load across the network nodes; and
implementing the determined resource allocation strategies by dynamically adjusting resource distribution among the network nodes.

25. A method comprising:
transmitting traffic data to a network on a first type of channel and control information to the network on a second type of channel, wherein the control information is transmitted on the second type of channel in at least one second time period between a first time period in which traffic data is being transmitted on the first type of channel and a third time period in which traffic data is being transmitted on the first type of channel;
dynamically determining timing for transmitting control information on the second type of channel to minimize interference and optimize network capacity:
dynamically adjusting a quality level indicator based on real-time network performance data to reflect link quality;

transmitting, by the subscriber unit, the quality level indicator on the second type of channel to assist in determining link quality;

receiving, by the subscriber unit, first power commands for the first type of channel from the network and second power commands for the second type of channel from the network; and setting, by the subscriber unit, a transmission power level for the first type of channel in response to the first power commands and a transmission power level for the second type of channel in response to the second power commands;

providing a massive MIMO transceiver channel estimation by:

identifying a specific sector from multiple sectors, where the identified sector covers a subset of the transceiver's total coverage area; and transmitting a set of random beams towards user equipment (UE) located within the identified sector, where the random beams are generated through spatial filtering of a random beam pattern.

26. The method of claim 25, wherein sectors are formed and adjusted based on frequency division duplex (FDD) reciprocity, comprising applying statistics, artificial intelligence (AI) or learning machine to enhance sector definition and improve system performance; and generating random beams based on spatial filter coefficients that are optimized using AI techniques to improve the efficiency and accuracy of beam generation.

27. The method of claim 25, comprising applying statistics, artificial intelligence (AI) or learning machine to allocate different random beams to distinct pilot subcarriers, ensuring that each random beam is uniquely associated with a specific pilot subcarrier to increase multiplexing and reduce interference or applying a learning machine to determine the portion of the spatial spectrum that the random beams should occupy, maximizing coverage and minimizing interference within the identified sector.

28. The method of claim 25, comprising applying statistics, artificial intelligence (AI) or learning machine to aggregate the random beams into a single orthogonal frequency-division multiplexing (OFDM) symbol, optimizing the spectral efficiency and reducing the overhead associated with transmitting multiple beams separately.

29. The method of claim 25, comprising applying statistics, artificial intelligence (AI) or learning machine to analyze uplink sounding signals from the UE to dynamically determine the most appropriate sectors for beam transmission, enhancing the adaptability of the system to changing conditions or applying a learning machine to process out-of-band information to assist in the determination of sectors, enabling more accurate and efficient sector selection based on external data sources.

30. A method, comprising:

transmitting traffic data to a network on a first type of channel and control information to the network on a second type of channel, wherein the control information is transmitted on the second type of channel in at least one second time period between a first time period in which traffic data is being transmitted on the first type of channel and a third time period in which traffic data is being transmitted on the first type of channel;

determining timing for transmitting control information on the second type of channel to minimize interference and optimize network capacity;

dynamically adjusting a quality level indicator based on real-time network performance data to reflect link quality;

transmitting, by the subscriber unit, the quality level indicator on the second type of channel to assist in determining link quality;

receiving, by the subscriber unit, first power commands for the first type of channel from the network and second power commands for the second type of channel from the network; and setting, by the subscriber unit, a transmission power level for the first type of channel in response to the first power commands and a transmission power level for the second type of channel in response to the second power commands;

transmitting traffic data to a network on a first type of channel and control information on a second type of channel and wherein the control information is transmitted during specific time periods that do not coincide with the transmission of traffic data on the first type of channel:

determining timing for transmitting control information on the second type of channel to minimize interference and optimize network capacity.

31. The method of claim 30, further comprising transmitting an indication on the second type of channel, using statistics, learning machine or artificial intelligence to predict when the subscriber unit has traffic data to send on the first type of channel, thereby improving the efficiency of data transmission scheduling.

32. The method of claim 30, wherein the second type of channel is designated as a maintenance channel, with statistics, learning machine or artificial intelligence optimizing the scheduling of control information transmission to ensure network reliability without disrupting traffic data transmission.

33. The method of claim 30, wherein he transmission power level for the first type of channel, following the transmission on the second type of channel, is adjusted based on a combination of first power commands received before and after the transmission on the second type of channel, with statistics, learning machine or artificial intelligence algorithms analyzing historical and current power command data to set an optimal transmission power level.

34. The method of claim 30, wherein at least one second time period includes one or more continuous transmission intervals, with statistics, learning machine or artificial intelligence determining the duration of these intervals based on network traffic analysis and predictive modeling to optimize network capacity and reduce latency.

35. The method of claim 30, comprising optimizing data traffic transmission based on real-time network conditions, user demand predictions, and historical traffic data to enhance network throughput and user experience.

* * * * *